(12) United States Patent
Nakazawa

(10) Patent No.: US 12,418,046 B2
(45) Date of Patent: Sep. 16, 2025

(54) NONAQUEOUS ELECTROLYTE SOLUTION

(71) Applicants: Mitsubishi Chemical Corporation, Tokyo (JP); MU Ionic Solutions Corporation, Tokyo (JP)

(72) Inventor: Eiji Nakazawa, Tokyo (JP)

(73) Assignees: Mitsubishi Chemical Corporation, Tokyo (JP); MU Ionic Solutions Corporation, Tokyo (JP)

( * ) Notice: Subject to any disclaimer, the term of this patent is extended or adjusted under 35 U.S.C. 154(b) by 669 days.

(21) Appl. No.: 17/591,329

(22) Filed: Feb. 2, 2022

(65) Prior Publication Data

US 2022/0158244 A1 May 19, 2022

Related U.S. Application Data

(63) Continuation of application No. PCT/JP2020/030504, filed on Aug. 7, 2020.

(30) Foreign Application Priority Data

| Aug. 8, 2019 | (JP) | 2019-146414 |
| Aug. 8, 2019 | (JP) | 2019-146415 |
| Nov. 28, 2019 | (JP) | 2019-215635 |

(51) Int. Cl.
 *H01M 10/056* (2010.01)
 *H01M 10/0567* (2010.01)

(52) U.S. Cl.
 CPC .................. *H01M 10/0567* (2013.01)

(58) Field of Classification Search
 CPC ......... H01M 10/0567; H01M 10/0566; H01M 10/0568; H01M 10/0569; H01M 10/0564; H01M 10/0525; H01M 10/052
 See application file for complete search history.

(56) References Cited

U.S. PATENT DOCUMENTS

| 6,235,431 | B1 * | 5/2001 | Takechi | H01M 10/0567 |
| | | | | 429/302 |
| 9,160,032 | B2 * | 10/2015 | Schroedle | H01M 10/058 |
| 2012/0219868 | A1 * | 8/2012 | Saisho | H01M 10/0525 |
| | | | | 429/188 |
| 2015/0118580 | A1 | 4/2015 | Kondo et al. | |
| 2015/0171475 | A1 | 6/2015 | Kondo et al. | |
| 2016/0248121 | A1 | 8/2016 | Uematsu et al. | |
| 2018/0026304 | A1 | 1/2018 | Yokomizo et al. | |
| 2019/0312307 | A1 | 10/2019 | Itabashi et al. | |
| 2020/0203766 | A1 | 6/2020 | Park et al. | |

FOREIGN PATENT DOCUMENTS

| CN | 103401019 A | 11/2013 |
| CN | 104380518 A | 2/2015 |
| CN | 107910591 A | 4/2018 |
| CN | 109776596 A | 5/2019 |
| JP | 2003-007332 A | 1/2003 |
| JP | 2004-071458 A | 3/2004 |
| JP | 2012-160316 A | 8/2012 |
| JP | 2015-005328 A | 1/2015 |
| JP | 2015-191807 A | 11/2015 |
| JP | 2016-189327 A | 11/2016 |
| JP | 2018-014319 A | 1/2018 |
| JP | 6260735 B1 | 1/2018 |
| JP | 2018-172356 A | 11/2018 |
| KR | 10-2013-0098704 A | 9/2013 |
| KR | 10-2016-0040708 A | 4/2016 |
| KR | 10-2017-0128218 A | 11/2017 |

(Continued)

OTHER PUBLICATIONS

Extended European Search Report issued in corresponding European Patent Application No. 20850586.7 dated Sep. 5, 2022.
Office Action issued in the corresponding Indian Patent Application No. 202348001980 on Feb. 9, 2023.
Office Action issued in the corresponding Malaysian Patent Application No. PI2022000674 on Feb. 24, 2023.
Office Action issued in the corresponding Indonesian Patent Application No. P00202203056 on Mar. 30, 2023.
Office Action issued in corresponding Indian Patent Application No. 202247010259 dated Jul. 13, 2022.

(Continued)

*Primary Examiner* — Raymond Alejandro
(74) *Attorney, Agent, or Firm* — Morgan, Lewis & Bockius LLP

(57) ABSTRACT

A non-aqueous electrolyte solution includes a positive electrode and a negative electrode that are capable of occluding and releasing metal ions, and the non-aqueous electrolyte solution is characterized by containing an alkali metal salt, a non-aqueous solvent, at least one Si—O structure-containing compound represented by Formula (A) or (B), and a compound represented by Formula ($\alpha$).

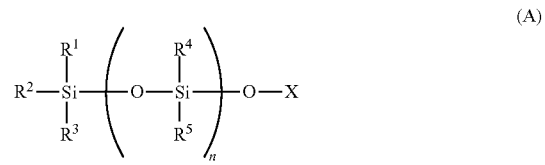

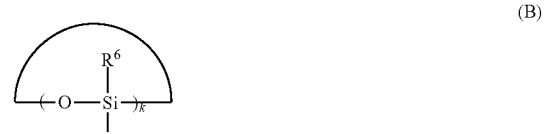

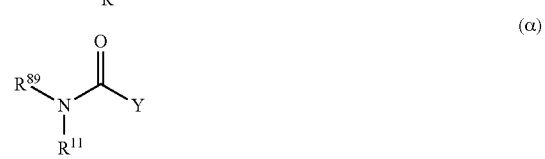

19 Claims, No Drawings

(56) References Cited

FOREIGN PATENT DOCUMENTS

WO  2015/098471 A1  7/2015
WO  2019/035575 A1  2/2019

OTHER PUBLICATIONS

Office Action and Search Report issued in corresponding Chinese Patent Application No. 202080056205.5 dated Sep. 5, 2023.
Office Action issued in corresponding Korean Patent Application No. 10-2022-7005631 dated Jul. 11, 2024.
Office Action issued in corresponding Japanese Patent Application No. 2021-537411 dated Jul. 30, 2024.
International Preliminary Report on Patentability and Written Opinion issued in related International Patent Application No. PCT/JP2020/030504 dated Feb. 17, 2022.
International Search Report issued in related International Patent Application No. PCT/JP2020/030504 dated Oct. 27, 2020.
Office Action issued in corresponding Indonesian Patent Application No. P00202305713, dated Jan. 22, 2025.
Decision of Rejection issued in corresponding Korean Patent Application No. 10-2022-7005631, dated Mar. 11, 2025.

\* cited by examiner

NONAQUEOUS ELECTROLYTE SOLUTION

CROSS-REFERENCE TO RELATED APPLICATION

This is a continuation of International Application PCT/JP2020/030504, filed on Aug. 7, 2020, and designated the U.S., (and claims priority from Japanese Patent Application 2019-146414 which was filed on Aug. 8, 2019, Japanese Patent Application 2019-146415 which was filed on Aug. 8, 2019 and Japanese Patent Application 2019-215635 which was filed on Nov. 28, 2019) the entire contents of which are incorporated herein by reference.

TECHNICAL FIELD

The present invention relates to a non-aqueous electrolyte solution and a non-aqueous electrolyte battery, more particularly a non-aqueous electrolyte solution containing a specific compound, and a non-aqueous electrolyte battery including the non-aqueous electrolyte solution.

BACKGROUND ART

Non-aqueous electrolyte solution batteries such as lithium secondary batteries have been put into practical use in a wide range of applications including power sources for so-called consumer small hardware, for example, portable phones such as smartphones and laptop computers, as well as vehicle-mounted power sources for driving electric vehicles and the like.

As means for improving the properties of a non-aqueous electrolyte battery, numerous studies have been conducted in the fields of the active materials of positive and negative electrodes as well as the additives of non-aqueous electrolyte solutions.

For example, Patent Document 1 discloses an effort of reducing the internal resistance of a battery by adding an organosilicon compound typified by 1,1,3,3,5,5-hexamethylcyclotrisilazane to the battery after it is charged at least once, specifically after conditioning.

Patent Document 2 discloses a study where not only the storage stability of a silyl group-containing compound is improved but also the cycle capacity retention rate at a high voltage of 4.9 V and the amount of gas generation during battery operation are improved by incorporating a trialkylsilyl compound of a protonic acid having a phosphorus atom and/or a boron atom, a sulfonic acid, or a carboxylic acid, and a basic compound or a specific silicon compound into a non-aqueous electrolyte solution.

RELATED ART DOCUMENTS

Patent Documents

[Patent Document 1] Japanese Laid-open Patent Application (Kokai) No. 2003-7332
[Patent Document 2] WO 2015/098471

SUMMARY OF THE INVENTION

Problems to be Solved by the Invention

In recent years, improvement in the capacities of lithium batteries has been accelerated for power sources to be mounted on electric vehicles and power sources for portable phones such as smart phones, and the ratio of voids inside these batteries has been reduced as compared to before. Therefore, the generation of a large amount of gas during initial conditioning is a crucial drawback.

An object of the present invention is to provide a non-aqueous electrolyte solution which can reduce the amount of gas generation during initial conditioning of a non-aqueous electrolyte battery. Another object of the present invention is to provide a non-aqueous electrolyte battery in which the amount of gas generation during initial conditioning is reduced.

Means for Solving the Problems

The present inventor intensively studied to solve the above-described problems and consequently discovered that that the amount of gas generation during initial conditioning is small when a battery has a high open-circuit voltage (OCV) after an injection of an electrolyte solution thereinto. The present inventor also discovered that, by using a non-aqueous electrolyte solution that contains a compound represented by Formula (A) or (B), namely at least one selected from a compound represented by Formula (A) and a compound represented by Formula (B), along with a compound represented by Formula (a), the battery OCV is increased after an injection of the electrolyte solution. Based on these discoveries, the present inventor arrived at reducing the amount of gas generation during initial conditioning after the injection, thereby completing an invention A. The present invention A provides, for example, the following specific modes.

<A1> A non-aqueous electrolyte solution including a positive electrode and a negative electrode which are capable of occluding and releasing metal ions, wherein the non-aqueous electrolyte solution contains: an alkali metal salt; a non-aqueous solvent; at least one Si—O structure-containing compound represented by Formula (A) or (B); and a compound represented by Formula (α):

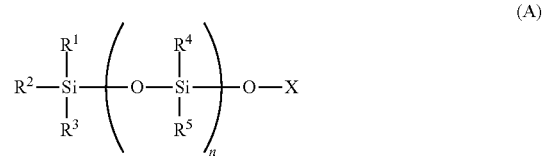

(A)

(wherein, in Formula (A), $R^1$ to $R^5$ each independently represents a hydrogen atom, a halogen atom, an optionally substituted hydrocarbon group having 1 to 12 carbon atoms, or an optionally substituted alkoxy group having 1 to 12 carbon atoms;

X represents an optionally substituted hydrocarbon group having 1 to 12 carbon atoms, or a silyl group represented by —SiR$^o$R$^p$R$^q$, wherein R$^o$ to R$^q$ each independently represents a hydrogen atom, a halogen atom, an optionally substituted hydrocarbon group having 1 to 12 carbon atoms, or an optionally substituted alkoxy group having 1 to 12 carbon atoms;

n represents an integer of 0 to 5; and when n is 2 or larger, plural $R^4$s in Formula (A) are the same or different from each other, and plural $R^5$s in Formula (A) are the same or different from each other)

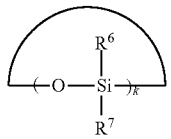

(wherein, in Formula (B),
R⁶ and R⁷ each independently represents a hydrogen atom, a halogen atom, an optionally substituted hydrocarbon group having 1 to 12 carbon atoms, or an optionally substituted alkoxy group having 1 to 12 carbon atoms;
k represents an integer of 3 to 6;
plural R⁶s in Formula (B) are the same or different from each other; and
plural R⁷s in Formula (B) are the same or different from each other)

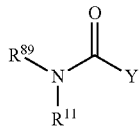

(wherein, in Formula (α),
$R^{89}$ represents a hydrogen atom or a silyl group represented by —SiR⁸R⁹R¹⁰, wherein R⁸ to R¹⁰ each independently represents a hydrogen atom, a halogen atom, an optionally substituted hydrocarbon group having 1 to 12 carbon atoms, or an optionally substituted alkoxy group having 1 to 12 carbon atoms;
R¹¹ represents a hydrogen atom, an optionally substituted hydrocarbon group having 1 to 12 carbon atoms, or a silyl group represented by —SiR$^d$R$^e$R$^f$, wherein R$^d$ to R$^f$ each independently represents a hydrogen atom, a halogen atom, an optionally substituted hydrocarbon group having 1 to 12 carbon atoms, or an optionally substituted alkoxy group having 1 to 12 carbon atoms;
Y represents a hydrogen atom, a halogen atom, an optionally substituted hydrocarbon group having 1 to 12 carbon atoms, an optionally substituted alkoxy group having 1 to 12 carbon atoms, a group represented by —NR$^g$—SiR$^h$R$^i$R$^j$, or a group represented by —NR$^g$—H, wherein R$^g$ represents a hydrogen atom or an optionally substituted hydrocarbon group having 1 to 12 carbon atoms, and R$^h$ to R$^j$ each independently represents a hydrogen atom, a halogen atom, an optionally substituted hydrocarbon group having 1 to 12 carbon atoms, or an optionally substituted alkoxy group having 1 to 12 carbon atoms; and
R¹¹ and R$^g$ are optionally bound with each other to form a ring).

<A2> The non-aqueous electrolyte solution according to <A1>, wherein a content of the Si—O structure-containing compound represented by Formula (A) or (B) is 0.001% by mass to 10% by mass with respect to a total amount of the non-aqueous electrolyte solution.

<A3> The non-aqueous electrolyte solution according to <A1> or <A2>, wherein a content of the compound represented by Formula (α), which has an Si—N structure, is 0.01 ppm by mass to 0.5% by mass with respect to the total amount of the non-aqueous electrolyte solution.

<A4> The non-aqueous electrolyte solution according to any one of <A1> to <A3>, wherein a mass ratio of a content of the Si—O structure-containing compound represented by Formula (A) or (B) with respect to a content of the compound represented by Formula (α) is 1.0 to 10,000.

<A5> The non-aqueous electrolyte solution according to any one of <A1> to <A4>, wherein at least one of R¹ to R³ is a hydrocarbon group having 2 to 12 carbon atoms and an unsaturated carbon-carbon bond.

<A6> The non-aqueous electrolyte solution according to any one of <A1> to <A5>, further containing at least one selected from a fluorinated salt, a fluorosilane compound, an unsaturated cyclic carbonate, a fluorine atom-containing cyclic carbonate, and an oxalate salt.

<A7> A non-aqueous electrolyte battery, including:
a positive electrode and a negative electrode which are capable of occluding and releasing metal ions; and
a non-aqueous electrolyte solution,
according to any one of <A1> to <A6>.

Further, the present inventor intensively studied to solve the above-described problems and consequently discovered that that gas generation during initial conditioning is limited when a battery has a high open-circuit voltage (OCV) after an injection of an electrolyte solution thereinto. The present inventor also discovered that, by using a non-aqueous electrolyte solution that contains a compound represented by Formula (A2) or (B2) and a compound represented by Formula (Z) or (Y), the battery OCV is increased after an injection of the electrolyte solution. The present inventor found that the amount of gas generation during initial conditioning after the injection can be reduced as a result, thereby arriving at an invention B. The present invention B provides, for example, the following specific modes.

<B1> A non-aqueous electrolyte solution including a positive electrode and a negative electrode which are capable of occluding and releasing metal ions,
wherein the non-aqueous electrolyte solution contains: an alkali metal salt; a non-aqueous solvent; at least one Si—O structure-containing compound represented by Formula (A2) or (B2); and at least one Si—N structure-containing compound represented by Formula (Z) or (Y):

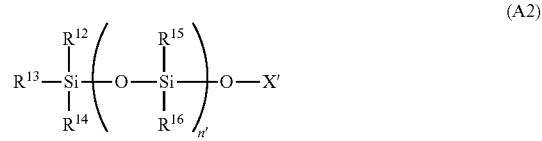

(wherein, in Formula (A2),
R¹² to R¹⁶ each independently represents a hydrogen atom, a halogen atom, an optionally substituted hydrocarbon group having 1 to 12 carbon atoms, or an optionally substituted alkoxy group having 1 to 12 carbon atoms;
X' represents an optionally substituted hydrocarbon group having 1 to 12 carbon atoms, or a silyl group represented by —SiR$^{o2}$R$^{p2}$R$^{q2}$, wherein R$^{o2}$ to R$^{q2}$ each independently represents a hydrogen atom, a halogen atom, an optionally substituted hydrocarbon group having 1 to 12 carbon atoms, or an optionally substituted alkoxy group having 1 to 12 carbon atoms;
n' represents an integer of 0 to 5;

at least one of $R^{12}$ to $R^{14}$ represents a hydrocarbon group having 2 to 12 carbon atoms and an unsaturated carbon-carbon bond; and when n' is 2 or larger, plural $R^{15}$s in Formula (A2) are the same or different from each other, and plural $R^{16}$s in Formula (A2) are the same or different from each other)

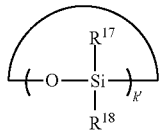
(B2)

(wherein, in Formula (B2), $R^{17}$ and $R^{18}$ each independently represents a hydrogen atom, a halogen atom, an optionally substituted hydrocarbon group having 1 to 12 carbon atoms, or an optionally substituted alkoxy group having 1 to 12 carbon atoms;

k' represents an integer of 3 to 6;

at least one of $R^{17}$ or $R^{18}$ represents a hydrocarbon group having 2 to 12 carbon atoms and an unsaturated carbon-carbon bond;

plural $R^{17}$s in Formula (B2) are the same or different from each other; and plural $R^{18}$s in Formula (B2) are the same or different from each other)

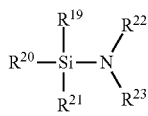
(Z)

(wherein, in Formula (Z), $R^{19}$ to $R^{21}$ each independently represents a hydrogen atom, a halogen atom, an optionally substituted hydrocarbon group having 1 to 12 carbon atoms, or an optionally substituted alkoxy group having 1 to 12 carbon atoms;

$R^{22}$ and $R^{23}$ each independently represents a hydrogen atom, an optionally substituted hydrocarbon group having 1 to 12 carbon atoms, or a silyl group represented by $-SiR^xR^yR^z$; $R^x$ to $R^z$ each independently represents a hydrogen atom, a halogen atom, an optionally substituted hydrocarbon group having 1 to 12 carbon atoms, or an optionally substituted alkoxy group having 1 to 12 carbon atoms; and $R^{22}$ and $R^{23}$ are optionally bound with each other to form a ring)

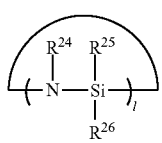
(Y)

(wherein, in Formula (Y), $R^{24}$ represents a hydrogen atom, an optionally substituted hydrocarbon group having 1 to 12 carbon atoms, or a silyl group represented by $-SiR^aR^bR^c$, wherein $R^a$ to $R^c$ each independently represents a hydrogen atom, a halogen atom, an optionally substituted hydrocarbon group having 1 to 12 carbon atoms, or an optionally substituted alkoxy group having 1 to 12 carbon atoms;

$R^{25}$ and $R^{26}$ each independently represents a hydrogen atom, a halogen atom, an optionally substituted hydrocarbon group having 1 to 12 carbon atoms, or an optionally substituted alkoxy group having 1 to 12 carbon atoms;

l represents an integer of 3 to 6;

plural $R^{25}$s in Formula (Y) are the same or different from each other; and plural $R^{26}$s in Formula (Y) are the same or different from each other).

<B2> The non-aqueous electrolyte solution according to <B1>, wherein a content of the Si—O structure-containing compound represented by Formula (A2) or (B2) is 0.001% by mass to 10% by mass with respect to a total amount of the non-aqueous electrolyte solution.

<B3> The non-aqueous electrolyte solution according to <B1> or <B2>, wherein a content of the Si—N structure-containing compound represented by Formula (Z) or (Y) is 0.01 ppm by mass to less than 0.5% by mass with respect to a total amount of the non-aqueous electrolyte solution.

<B4> The non-aqueous electrolyte solution according to any one of <B1> to <B3>, wherein a mass ratio of a content of a compound represented by Formula (A2) or (B2) with respect to the content of the Si—N structure-containing compound represented by Formula (Z) or (Y) is 1.0 to 10,000.

<B5> The non-aqueous electrolyte solution according to any one of <B1> to <B4>, wherein
the non-aqueous electrolyte solution contains the compound represented by Formula (A2), and
at least one of $R^{12}$ to $R^{14}$ in Formula (A2) is a vinyl group or an allyl group.

<B6> The non-aqueous electrolyte solution according to any one of <B1> to <B5>, wherein
the non-aqueous electrolyte solution contains the compound represented by Formula (B2), and
at least one of $R^{17}$ or $R^{18}$ in Formula (B2) is a vinyl group or an allyl group.

<B7> The non-aqueous electrolyte solution according to any one of <B1> to <B6>, wherein at least one of $R^{22}$ or $R^{23}$ in Formula (Z) is a silyl group represented by $-SiR^xR^yR^z$.

<B8> The non-aqueous electrolyte solution according to any one of <B1> to <B7>, further containing at least one selected from a fluorinated salt, a fluorosilane compound, an unsaturated cyclic carbonate, a fluorine atom-containing cyclic carbonate, and an oxalate salt.

<B9> A non-aqueous electrolyte battery, including:
a positive electrode and a negative electrode which are capable of occluding and releasing metal ions; and
the non-aqueous electrolyte solution according to any one of <B1> to <B8>.

Effects of the Invention

According to the present invention, a non-aqueous electrolyte solution that is excellent in reducing the amount of gas generation during initial conditioning of a non-aqueous electrolyte battery, and a non-aqueous electrolyte battery having a small amount of gas generation during initial conditioning can be obtained.

MODE FOR CARRYING OUT THE INVENTION

Embodiments of the present invention will now be described in detail. The below-described embodiments are merely examples (representative examples) of the present invention, and the present invention is not restricted thereto. Further, modifications can be arbitrarily made to carry out the present invention, without departing from the gist of the present invention.

[Invention A]

The non-aqueous electrolyte solution according to the present invention A is a non-aqueous electrolyte solution for a non-aqueous electrolyte battery including a positive electrode and a negative electrode which are capable of occluding and releasing metal ions. This non-aqueous electrolyte solution is characterized by containing: an alkali metal salt; a non-aqueous solvent; at least one Si—O structure-containing compound represented by Formula (A) or (B); and a compound represented by Formula (α):

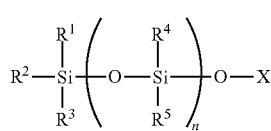

(A)

(wherein, in Formula (A), $R^1$ to $R^5$ each independently represents a hydrogen atom, a halogen atom, an optionally substituted hydrocarbon group having 1 to 12 carbon atoms, or an optionally substituted alkoxy group having 1 to 12 carbon atoms; X represents an optionally substituted hydrocarbon group having 1 to 12 carbon atoms, or a silyl group represented by —SiR$^o$R$^p$R$^q$, wherein R$^o$ to R$^q$ each independently represents a hydrogen atom, a halogen atom, an optionally substituted hydrocarbon group having 1 to 12 carbon atoms, or an optionally substituted alkoxy group having 1 to 12 carbon atoms; n represents an integer of 0 to 5; and when n is 2 or larger, plural $R^4$s in Formula (A) are the same or different from each other, and plural $R^5$s in Formula (A) are the same or different from each other)

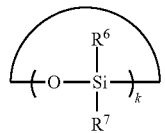

(B)

(wherein, in Formula (B), $R^6$ and $R^7$ each independently represents a hydrogen atom, a halogen atom, an optionally substituted hydrocarbon group having 1 to 12 carbon atoms, or an optionally substituted alkoxy group having 1 to 12 carbon atoms; k represents an integer of 3 to 6; plural $R^6$s in Formula (B) are the same or different from each other; and plural $R^7$s in Formula (B) are the same or different from each other)

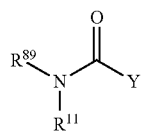

(α)

(wherein, in Formula (α), $R^{89}$ represents a hydrogen atom or a silyl group represented by —SiR$^8$R$^9$R$^{10}$, wherein $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms; $R^{11}$ represents a hydrogen atom, an optionally substituted hydrocarbon group having 1 to 12 carbon atoms, or a silyl group represented by —SiR$^d$R$^e$R$^f$, wherein R$^d$ to R$^f$ each independently represents a hydrogen atom, a halogen atom, an optionally substituted hydrocarbon group having 1 to 12 carbon atoms, or an optionally substituted alkoxy group having 1 to 12 carbon atoms; Y represents a hydrogen atom, a halogen atom, an optionally substituted hydrocarbon group having 1 to 12 carbon atoms, an optionally substituted alkoxy group having 1 to 12 carbon atoms, a group represented by —NR$^g$—SiR$^h$R$^i$R$^j$, or a group represented by —NR$^g$—H, wherein R$^g$ represents a hydrogen atom or an optionally substituted hydrocarbon group having 1 to 12 carbon atoms, and R$^h$ to R$^j$ each independently represents a hydrogen atom, a halogen atom, an optionally substituted hydrocarbon group having 1 to 12 carbon atoms, or an optionally substituted alkoxy group having 1 to 12 carbon atoms; and $R^{11}$ and R$^g$ are optionally bound with each other to form a ring).

<1-A. Non-Aqueous Electrolyte Solution>

The non-aqueous electrolyte solution according to the present invention A contains: the below-described at least one Si—O structure-containing compound selected from a compound represented by Formula (A) and a compound represented by Formula (B) (hereinafter, also referred to as "compound represented by Formula (A) or (B)"); and the below-described compound which is represented by Formula (α) and has an Si—N—C=O structure or a H—N—C=O structure (hereinafter, also referred to as "compound represented by Formula (α)").

The mechanism in which the OCV upon an injection of an electrolyte solution is increased by using a non-aqueous electrolyte solution that contains at least one Si—O structure-containing compound selected from a compound represented by Formula (A) and a compound represented by Formula (B), and a compound represented by Formula (α) is not clear; however, it is presumed as follows.

The compound represented by Formula (A) or (B) has a polar structure (—Si—O—) and a nonpolar structure (e.g., —SiR$^1$R$^2$R$^3$) in its molecule. Similarly, the compound represented by Formula (α) also has a polar structure (—N—(C=O)—) in its molecule, and further has a nonpolar structure (—SiR$^8$R$^9$R$^{10}$) or a hydrogen bond-forming moiety (—N—H). Therefore, these compounds tend to interact with the surface of a negative electrode active material such as carbon and/or the surface of a positive electrode active material such as a transition metal oxide and be thereby localized in the vicinity of the surface(s). Further, it is presumed that the compound represented by Formula (A) or (B) and the compound represented by Formula (α), which are localized on the active material surface(s), also interact with each other, whereby the amount of these compounds thus localized and fixed on the surface of the positive electrode active material and/or the surface of the negative electrode active material is increased. Particularly, since the Si—N—(C=O)—Y structure and the H—N—(C=O)—Y structure of the compound represented by Formula (α) are highly adsorptive to an electrode surface, the fixation of the compound represented by Formula (A) or (B) onto an electrode is facilitated based on the fixation of the compound represented by Formula (α) onto the electrode. As a result, the compound represented by Formula (α) and the compound represented by Formula (A) or (B) that have been localized on the electrode are electrochemically degraded during initial charging to form a composite insulating coating film. This composite coating film is presumed to inhibit a side reaction of the electrolyte solution during initial conditioning and thereby inhibit gas generation.

The "OCV" is a potential difference between a positive electrode and a negative electrode. The potential of an electrode is modified when a large amount of a compound contained in an electrolyte solution adheres to the electrode. A high OCV upon injection of the electrolyte solution is believed to indicate that the amount of the compound constituting the electrolyte solution and adsorbing to the electrode is large. In the electrolyte solution according to one embodiment of the present invention, the amount of a compound adsorbing to an electrode after the injection of the electrolyte solution is large; therefore, the battery OCV is presumed to be high after the injection. Based on this, the present inventor found that the amount of gas generation during initial conditioning can be estimated by checking the OCV upon the injection. In the below-described Examples, the value of the OCV and the amount of gas generation did not necessarily conform to one another; however, they were observed to correlate with each other. It is believed that the properties of a composite coating film to be generated vary depending on the compounds that are used in combination.

<1-A1. Compound Having Si—O Structure>

The non-aqueous electrolyte solution according to one embodiment of the present invention is characterized by containing at least one Si—O structure-containing compound represented by the following Formula (A) or (B), i.e. at least one Si—O structure-containing compound selected from a compound represented by Formula (A) and a compound represented by Formula (B).

<1-A1-1. Compound Represented by Formula (A)>

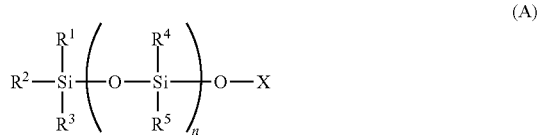

(A)

(wherein, in Formula (A), $R^1$ to $R^5$ each independently represents a hydrogen atom, a halogen atom, an optionally substituted hydrocarbon group having 1 to 12 carbon atoms, or an optionally substituted alkoxy group having 1 to 12 carbon atoms; X represents an optionally substituted hydrocarbon group having 1 to 12 carbon atoms, or a silyl group represented by $—SiR^oR^pR^q$, wherein $R^o$ to $R^q$ each independently represents a hydrogen atom, a halogen atom, an optionally substituted hydrocarbon group having 1 to 12 carbon atoms, or an optionally substituted alkoxy group having 1 to 12 carbon atoms; n represents an integer of 0 to 5; and when n is 2 or larger, plural $R^4$s in Formula (A) are the same or different from each other, and plural $R^5$s in Formula (A) are the same or different from each other)

$R^1$ to $R^5$ according to Formula (A) each independently represents a hydrogen atom, a halogen atom, an optionally substituted hydrocarbon group having 1 to 12 carbon atoms, or an optionally substituted alkoxy group having 1 to 12 carbon atoms. Particularly, $R^1$ to $R^5$ are each preferably a halogen atom, an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms, or an optionally substituted alkoxy group having 1 to 12 carbon atoms. In the present specification, a "hydrocarbon group" may have a branched structure and/or a cyclic structure, and may be any of a saturated hydrocarbon group, an unsaturated hydrocarbon group, an aromatic hydrocarbon group and the like. When a hydrocarbon group has a substituent, the number of carbon atoms contained in the substituent is not included in the number of carbon atoms of the hydrocarbon group.

Further, at least one of $R^1$ to $R^3$ is preferably a hydrocarbon group having 2 to 12 carbon atoms and an unsaturated carbon-carbon bond since this makes the compound represented by Formula (A) tend to be localized on the electrode surface in a preferred manner. Examples of the hydrocarbon group having 2 to 12 carbon atoms and an unsaturated carbon-carbon bond include the below-described alkenyl groups having 2 to 12 carbon atoms, alkynyl groups having 2 to 12 carbon atoms, and aryl groups having 6 to 12 carbon atoms, among which an alkenyl group having 2 to 12 carbon atoms or an alkynyl group having 2 to 12 carbon atoms is preferred since it makes the compound represented by Formula (A) tend to be localized on the electrode surface in a more preferred manner. An alkenyl group having 2 to 12 carbon atoms is particularly preferred.

$R^1$ to $R^3$ according to Formula (A) are optionally the same or different from each other; however, it is preferred that at least two of $R^1$ to $R^3$ be the same from the standpoint of the ease of synthesizing the compound, and it is more preferred that all three of $R^1$ to $R^3$ be the same from the aforementioned standpoint.

$R^4$ and $R^5$ according to Formula (A) are optionally the same or different from each other; however, $R^4$ and $R^5$ are preferably the same from the standpoint of the ease of synthesizing the compound.

Further, when n is 2 or larger, i.e. when there are plural $R^4$s and $R^5$s, the $R^4$s are optionally the same or different from each other; however, they are preferably the same from the standpoint of the ease of synthesizing the compound. The $R^5$s are also optionally the same or different from each other; however, they are preferably the same from the standpoint of the ease of synthesizing the compound.

Examples of the halogen atom include a fluorine atom, a chlorine atom, and a bromine atom. The halogen atom is preferably a fluorine atom since it hardly causes an electrochemical side reaction.

The hydrocarbon group having 1 to 12 carbon atoms is preferably a hydrocarbon group having 1 to 6 carbon atoms, particularly preferably a hydrocarbon group having 1 to 4 carbon atoms.

The hydrocarbon group is specifically, for example, an alkyl group, an alkenyl group, an alkynyl group, an aralkyl group, or an aryl group.

Specific examples of the alkyl group include a methyl group, an ethyl group, an n-propyl group, an iso-propyl group, an n-butyl group, a tert-butyl group, an n-pentyl group, a hexyl group, a heptyl group, an octyl group, a nonyl group, and a decyl group. Thereamong, the alkyl group is, for example, preferably a methyl group, an ethyl group, an n-propyl group, an n-butyl group, a tert-butyl group, an n-pentyl group, or a hexyl group, more preferably a methyl group, an ethyl group, an n-propyl group, an n-butyl group, a tert-butyl group, or an n-pentyl group, particularly preferably a methyl group, an ethyl group, an n-butyl group, or a tert-butyl group. When the hydrocarbon group is any of the above-exemplified alkyl groups, the compound represented by Formula (A) tends to be localized in the vicinity of the surface of a positive electrode active material and/or the surface of a negative electrode active material, which is preferred.

Specific examples of the alkenyl group include a vinyl group, an allyl group, a methallyl group, a 2-butenyl group, a 3-methyl-2-butenyl group, a 3-butenyl group, and a 4-pentenyl group. Thereamong, the alkenyl group is, for example, preferably a vinyl group, an allyl group, a methallyl group, or a 2-butenyl group, more preferably a vinyl group, an allyl group, or a methallyl group, particularly preferably a vinyl group or an allyl group. When the hydrocarbon group is any of the above-exemplified alkenyl groups, the compound represented by Formula (A) tends to be localized in the vicinity of the surface of a positive electrode active material and/or the surface of a negative electrode active material, which is preferred.

Specific examples of the alkynyl group include an ethynyl group, a 2-propynyl group, a 2-butynyl group, a 3-butynyl group, a 4-pentynyl group, and 5-hexynyl group. Thereamong, the alkynyl group is, for example, preferably an ethynyl group, a 2-propynyl group, a 2-butynyl group, or a 3-butynyl group, more preferably a 2-propynyl group or a 3-butynyl group, particularly preferably a 2-propynyl group. When the hydrocarbon group is any of the above-exemplified alkynyl groups, the compound represented by Formula (A) tends to be localized in the vicinity of the surface of a positive electrode active material and/or the surface of a negative electrode active material, which is preferred.

Specific examples of the aryl group include a phenyl group and a tolyl group. Thereamong, a phenyl group is preferred since it makes the compound represented by Formula (A) tend to be localized in the vicinity of the surface of a positive electrode active material and/or the surface of a negative electrode active material.

Specific examples of the aralkyl group include a benzyl group and a phenethyl group.

The alkoxy group having 1 to 12 carbon atoms is preferably an alkoxy group having 1 to 6 carbon atoms, particularly preferably an alkoxy group having 1 to 4 carbon atoms.

Specific examples of the alkoxy group having 1 to 12 carbon atoms include a methoxy group, an ethoxy group, a propoxy group, a butoxy group, and an isopropoxy group. Thereamong, a methoxy group and an ethoxy group are preferred since these groups allow the compound represented by Formula (A) to have a small steric hindrance and be concentrated on the active material surface in a preferred manner.

Examples of the above-described substituent include a cyano group, an isocyanate group, an acyl group (—(C=O)—$R^r$), an acyloxy group (—O(C=O)—$R^r$), an alkoxycarbonyl group (—(C=O)O—$R^r$), a sulfonyl group (—$SO_2$—$R^r$), a sulfonyloxy group (—O($SO_2$)—$R^r$), an alkoxysulfonyl group (—($SO_2$)—O—$R^r$), an alkoxysulfonyloxy group (—O—($SO_2$)—O—$R^r$), an alkoxycarbonyloxy group (—O—(C=O)—O—$R^r$), an ether group (—O—$R^r$), a halogen atom (preferably a fluorine atom), and a trifluoromethyl group. $R^r$ represents an alkyl group having 1 to 10 carbon atoms, an alkylene group having 1 to 10 carbon atoms, an alkoxy group having 1 to 10 carbon atoms, an alkenyl group having 2 to 10 carbon atoms, or an alkynyl group having 2 to 10 carbon atoms. When $R^r$ is an alkylene group, it may be bound with a portion of the hydrocarbon group being substituted to form a ring.

Among these substituents, a cyano group, an isocyanate group, an acyloxy group (—O(C=O)—$R^r$), a halogen atom (preferably a fluorine atom), and a trifluoromethyl group are preferred; an isocyanate group, an acyloxy group (—O(C=O)—$R^r$), a halogen atom (preferably a fluorine atom), and a trifluoromethyl group are more preferred; and an acyloxy group (—O(C=O)—$R^r$), a halogen atom (preferably a fluorine atom), and a trifluoromethyl group are particularly preferred.

X according to Formula (A) represents an optionally substituted hydrocarbon group having 1 to 12 carbon atoms, or a silyl group represented by —$SiR^oR^pR^q$.

Examples of the hydrocarbon group having 1 to 12 carbon atoms include the same ones as those described above for $R^1$ to $R^5$.

In the silyl group represented by —$SiR^oR^pR^q$, $R^o$ to $R^q$ each independently represents a hydrogen atom, a halogen atom, an optionally substituted hydrocarbon group having 1 to 12 carbon atoms, or an optionally substituted alkoxy group having 1 to 12 carbon atoms. Particularly, $R^o$ to $R^q$ are each preferably an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for $R^1$ to $R^5$. Further, their preferred modes are also the same.

Specific examples of the silyl group represented by —$SiR^oR^pR^q$ include —$Si(CH_3)_3$, —$Si(CH_3)_2(C_2H_5)$, —$Si(CH_3)_2(CH=CH_2)$, —$Si(CH_3)_2(CH_2CH_2CH_3)$, —$Si(CH_3)_2(CH_2CH=CH_2)$, —$Si(CH_3)_2[CH(CH_3)_2]$, —$Si(CH_3)_2[(CH_2)_3CH_3]$, —$Si(CH_3)_2[CH_2CH(CH_3)_2]$, —$Si(CH_3)_2[C(CH_3)_3]$, —$Si(CH_3)_2(C_6H_5)$, —$Si(CH_3)(C_6H_5)_2$, —$Si(C_6H_5)_3$, —$Si(C_2H_5)_3$, —$Si(CH=CH_2)_3$, —$Si(CH_2CH_2CH_3)_3$, —$Si[CH(CH_3)_2]_3$, —$Si(CH_2CH=CH_2)_3$, —$Si(CH_3)(C_6H_5)(CH=CH_2)$, —$Si(C_6H_5)_2(CH=CH_2)$, and —$Si(CF_3)_3$. Thereamong, —$Si(CH_3)_3$, —$Si(CH_3)_2(CH=CH_2)$, —$Si(CH_3)_2(CH_2CH=CH_2)$, —$Si(C_2H_5)_3$, —$Si(CH_3)(C_6H_5)(CH=CH_2)$, and —$Si(C_6H_5)_2(CH=CH_2)$ are preferred, and —$Si(CH_3)_2(CH=CH_2)$ and —$Si(CH_3)_2(CH_2CH=CH_2)$ are particularly preferred.

In Formula (A), n represents an integer of 0 to 5. From the standpoint of the ease of synthesizing the compound, n is preferably 0 to 2. Particularly, a compound represented by Formula (A1) in which n=0 or n=1 is preferred.

A compound represented by Formula (A1) in which n=0 in Formula (A) is preferred since it has an excellent effect of inhibiting gas generation during initial conditioning.

(A1)

(wherein, in Formula (A1), $R^1$ to $R^3$ each independently represents a hydrogen atom, a halogen atom, an optionally substituted hydrocarbon group having 1 to 12 carbon atoms, or an optionally substituted alkoxy group having 1 to 12 carbon atoms; X represents an optionally substituted hydrocarbon group having 1 to 12 carbon atoms, or a silyl group represented by —$SiR^oR^pR^q$, wherein and $R^o$ to $R^q$ each independently represents a hydrogen atom, a halogen atom, an optionally substituted hydrocarbon group having 1 to 12 carbon atoms, or an optionally substituted alkoxy group having 1 to 12 carbon atoms)

The above-described $R^1$ to $R^3$ and X correspond to $R^1$ to $R^3$ and X of Formula (A), respectively.

Further, a compound of Formula (A) in which n=1 is also preferred since it has an excellent effect of inhibiting gas generation during initial conditioning.

<1-A1-2. Compound Represented by Formula (B)>

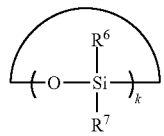

(B)

(wherein, in Formula (B), $R^6$ and $R^7$ each independently represents a hydrogen atom, a halogen atom, an optionally substituted hydrocarbon group having 1 to 12 carbon atoms, or an optionally substituted alkoxy group having 1 to 12 carbon atoms; k represents an integer of 3 to 6; plural $R^6$s in Formula (B) are the same or different from each other; and plural $R^7$s in Formula (B) are the same or different from each other)

$R^6$ and $R^7$ according to Formula (B) each independently represents a hydrogen atom, a halogen atom, an optionally substituted hydrocarbon group having 1 to 12 carbon atoms, or an optionally substituted alkoxy group having 1 to 12 carbon atoms. Plural $R^6$s are optionally the same or different from each other, and plural $R^7$s are optionally the same or different from each other.

$R^6$ and $R^7$ according to Formula (B) are optionally the same or different from each other; however, they are preferably the same from the standpoint of the ease of synthesizing the compound.

Plural $R^6$s ($R^6$s existing in repeating units) are optionally the same or different from each other; however, from the standpoint of the ease of synthesizing the compound, all of 3 to 6 $R^6$s existing in one molecule are preferably the same. Plural $R^7$s ($R^7$s existing in repeating units) are also optionally the same or different from each other; however, from the standpoint of the ease of synthesizing the compound, all of 3 to 6 $R^7$s existing in one molecule are preferably the same.

It is noted here that the halogen atom, the optionally substituted hydrocarbon group having 1 to 12 carbon atoms, and the optionally substituted alkoxy group having 1 to 12 carbon atoms all have the same meanings as those defined above for $R^1$ to $R^5$.

In Formula (B), k is usually an integer of 3 to 6, preferably 3 or 4.

In one embodiment of the present invention, at least one selected from the compound represented by Formula (A) and the compound represented by Formula (B) is used, and specific examples of the compound represented by Formula (A) or (B) include compounds having the following structures.

(Specific Examples of Compound Represented by Formula (A))

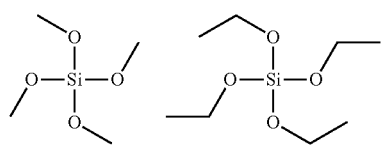

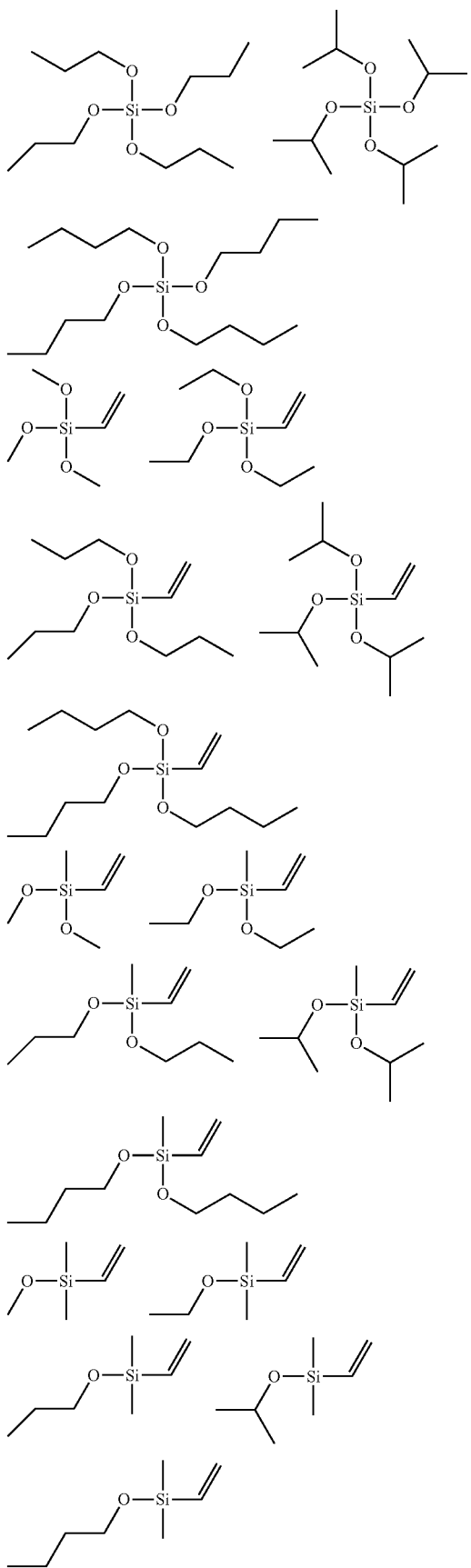

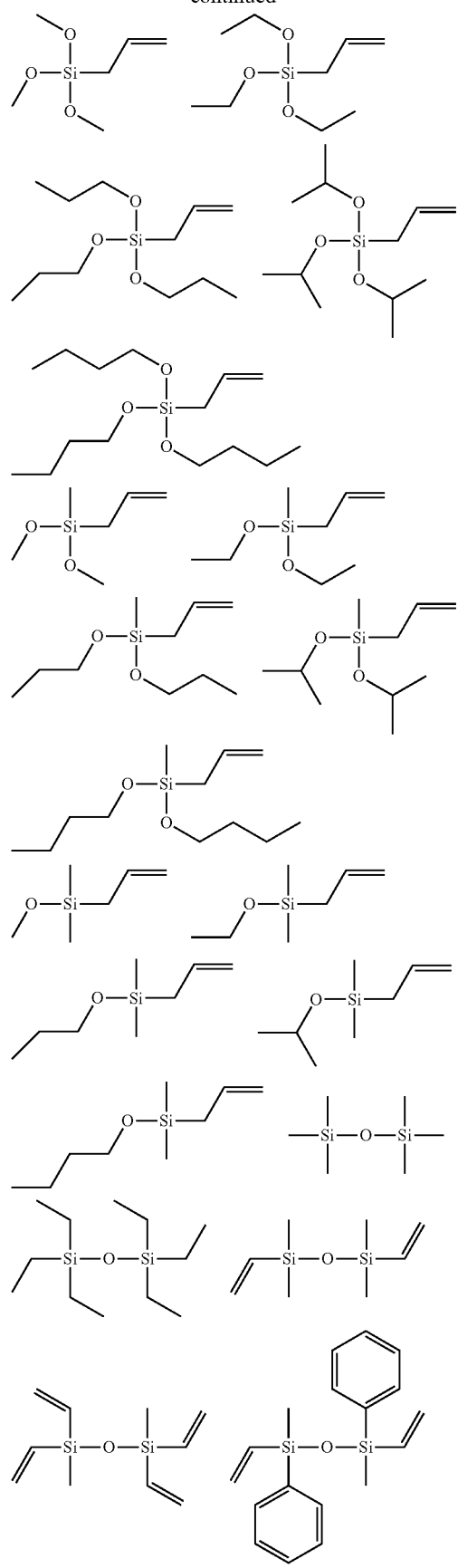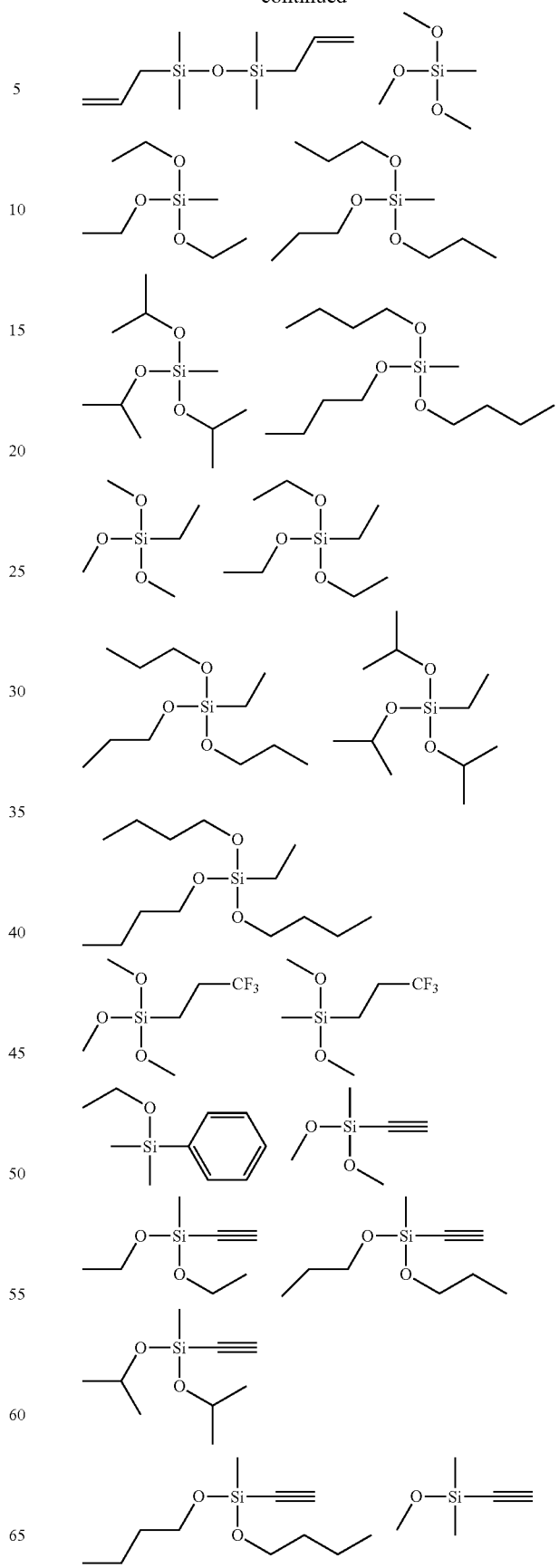

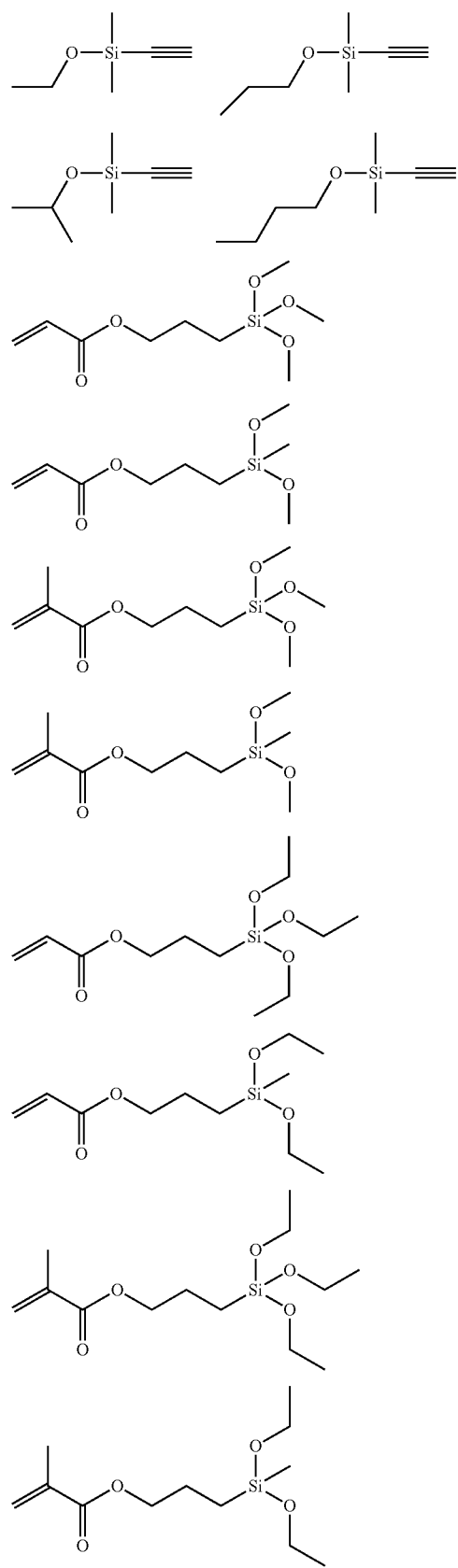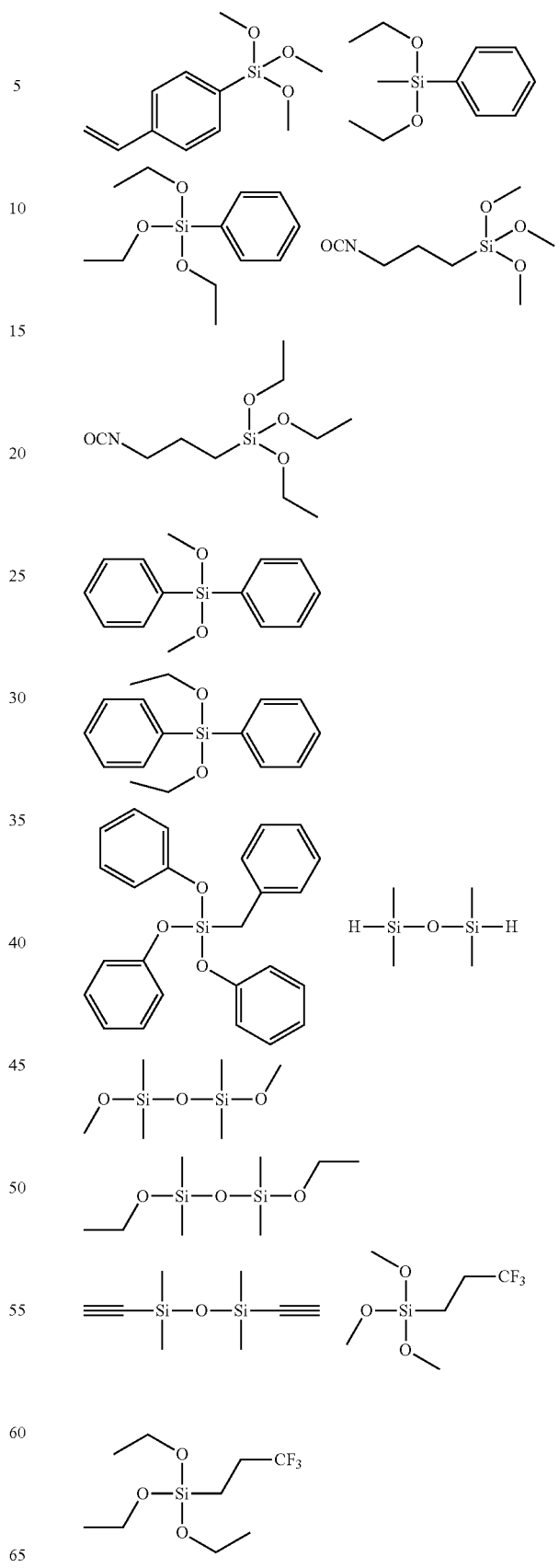

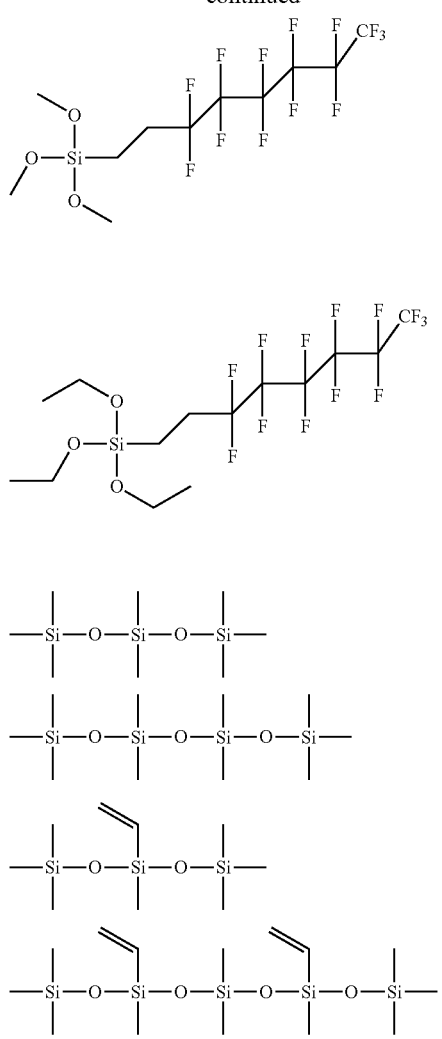
(Specific Examples of Compound Represented by Formula (B))
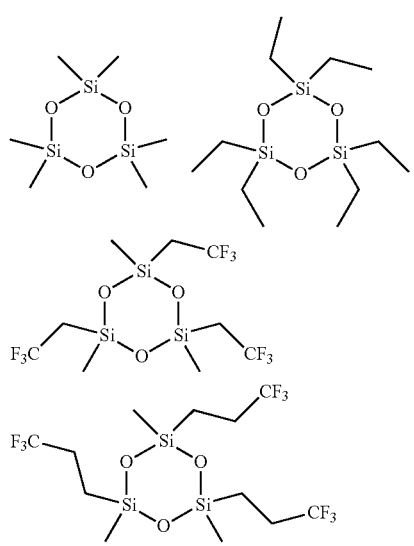
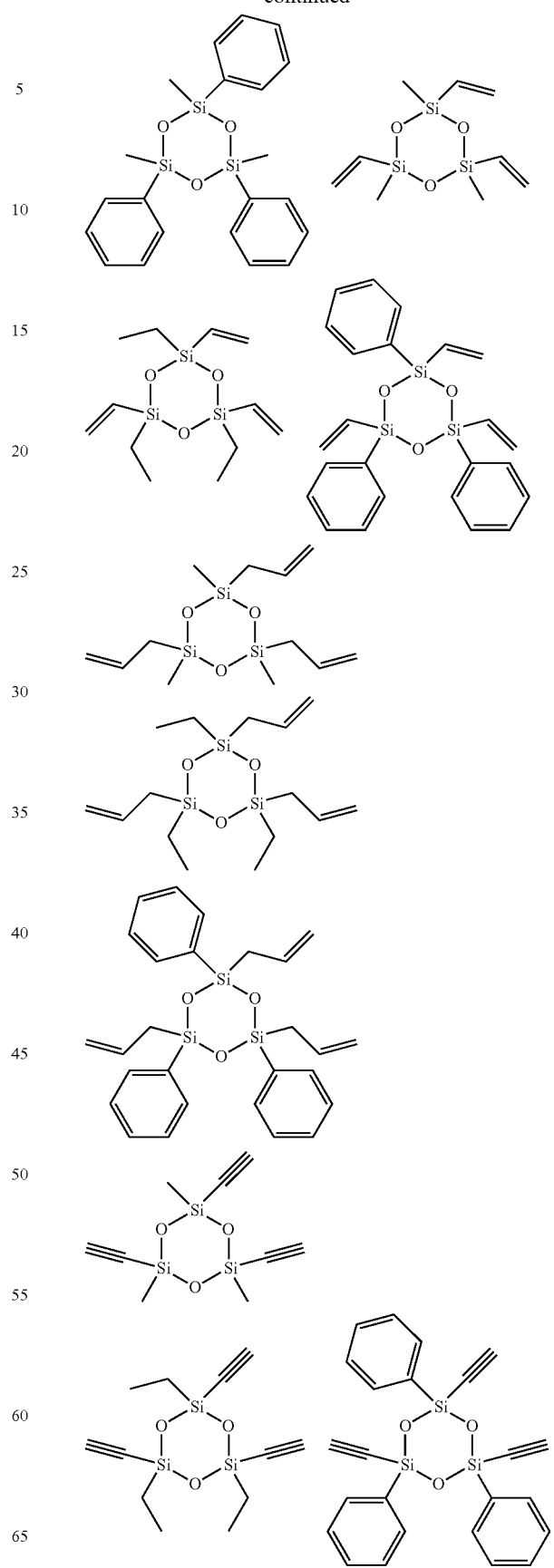

-continued
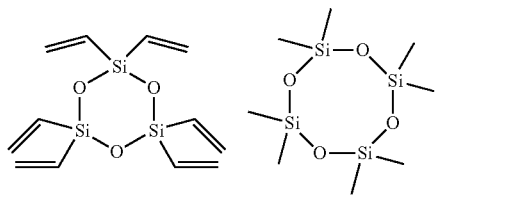
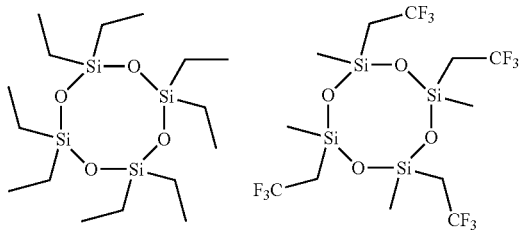
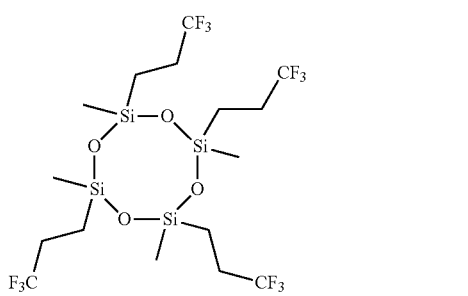
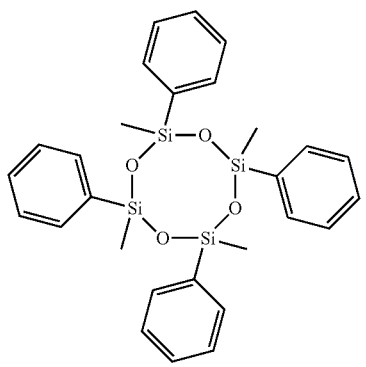
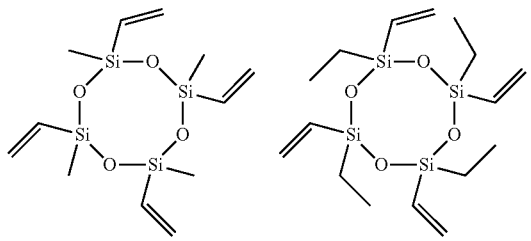
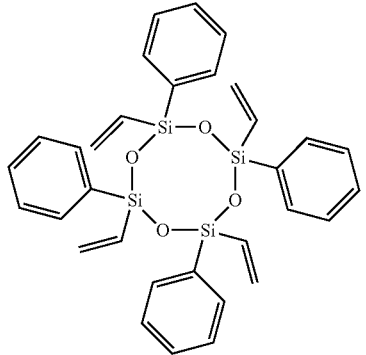
-continued
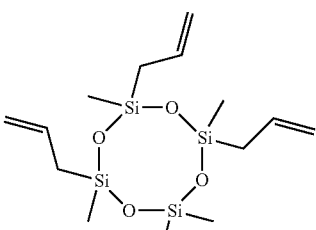
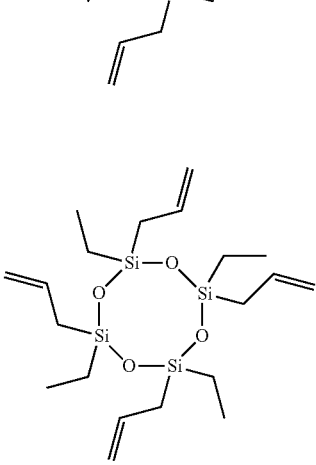
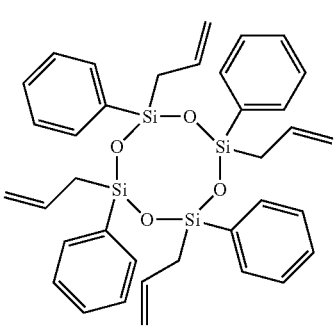
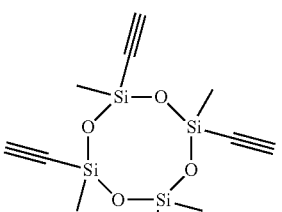
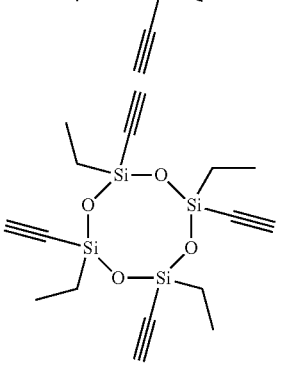

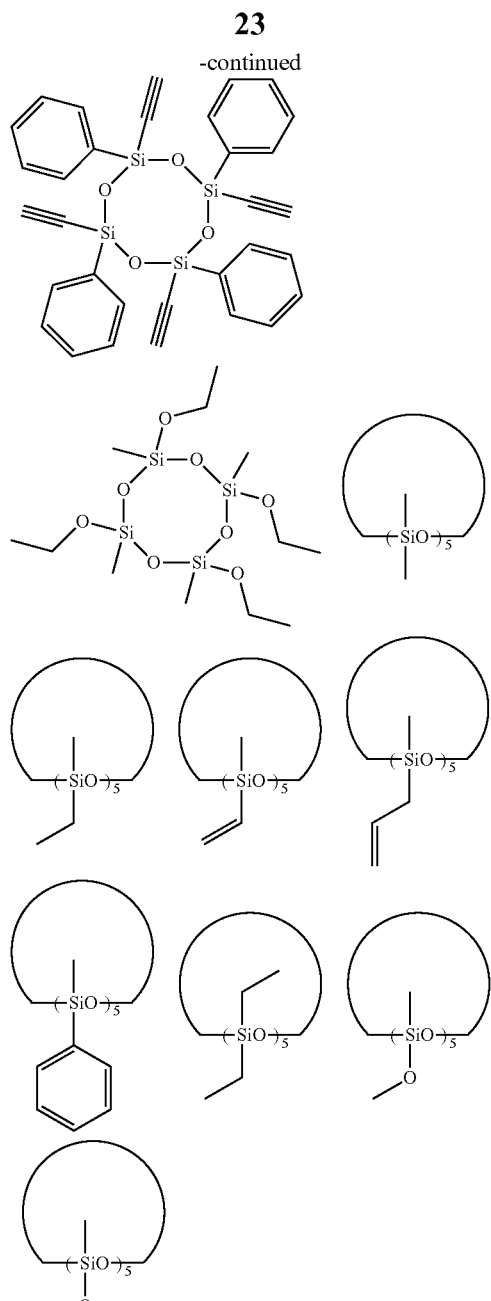
Preferred examples of the compound represented by Formula (A) or (B) include the following compounds.
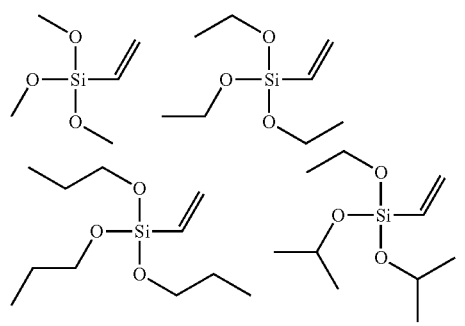
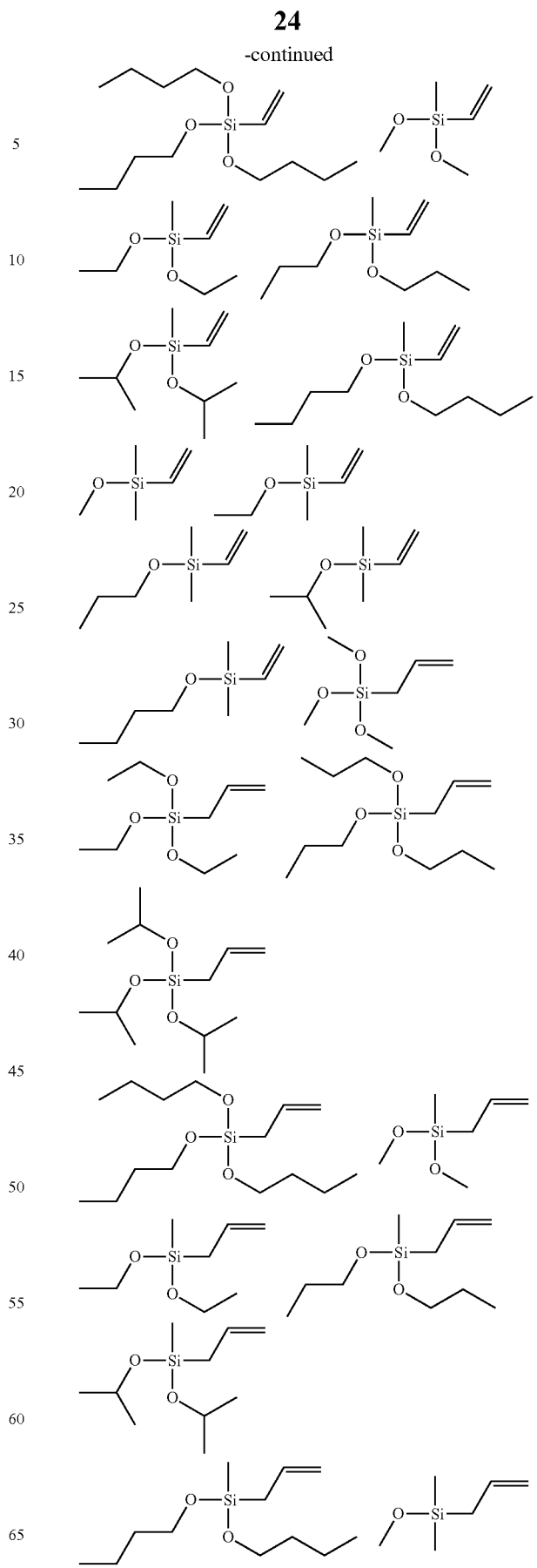

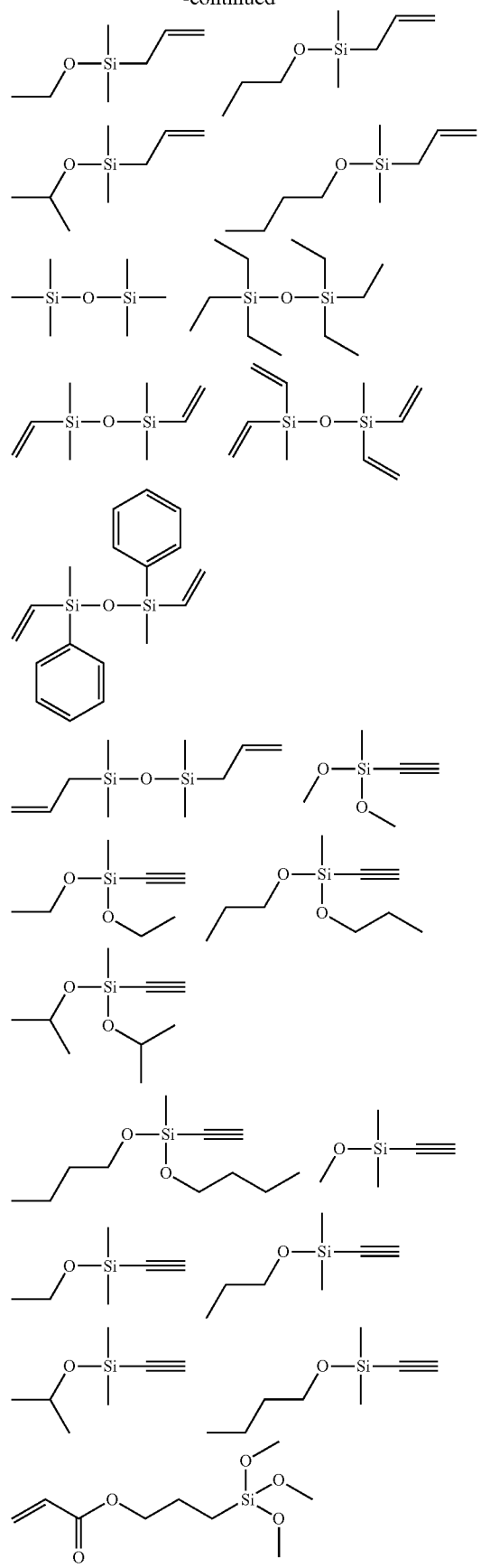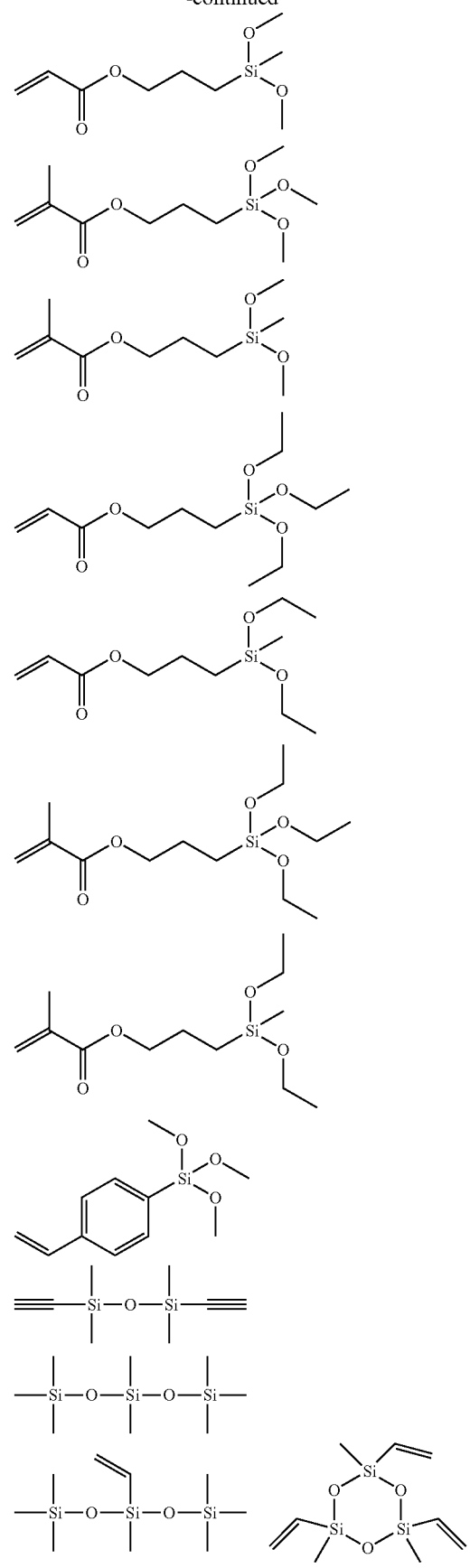

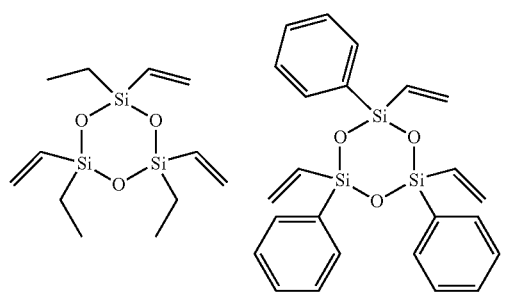
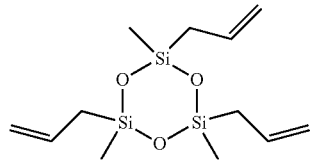
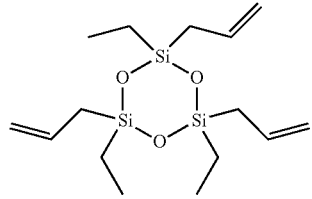
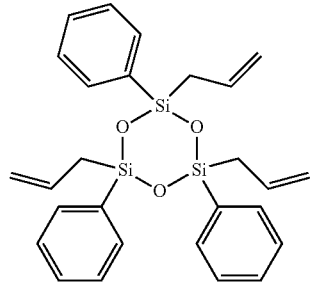
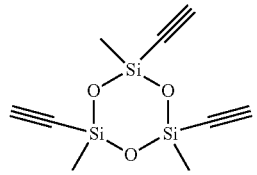
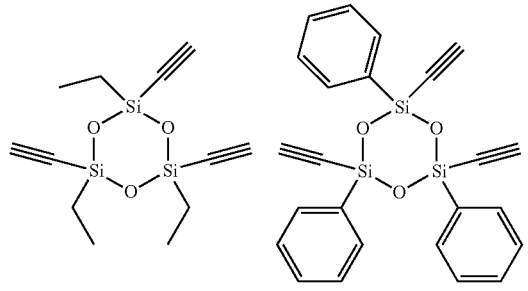
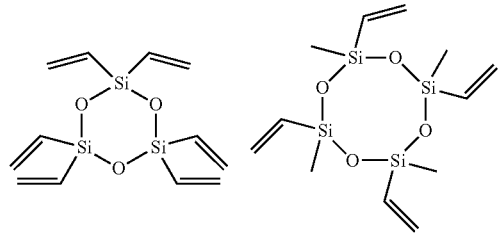
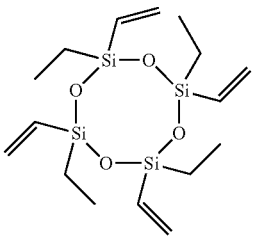
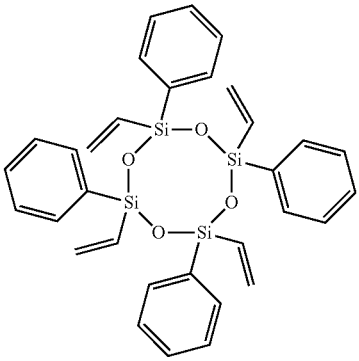
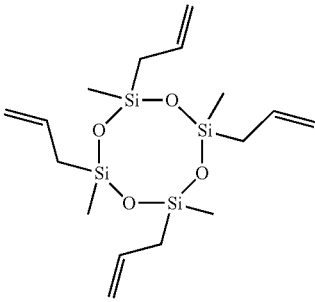
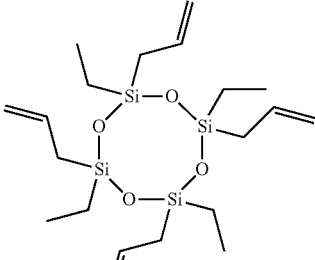
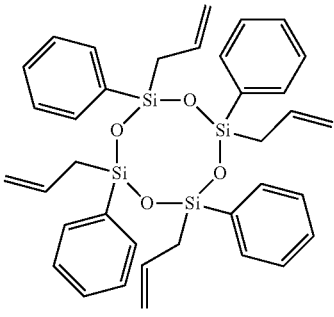

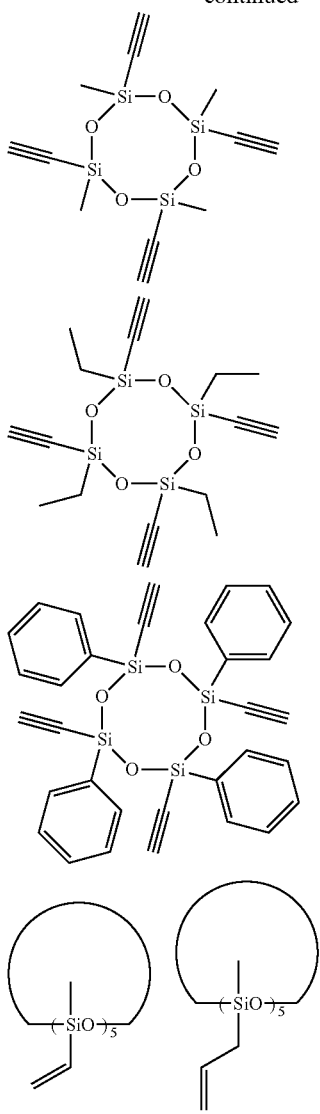
More preferred examples of the compound represented by Formula (A) or (B) include the following compounds.
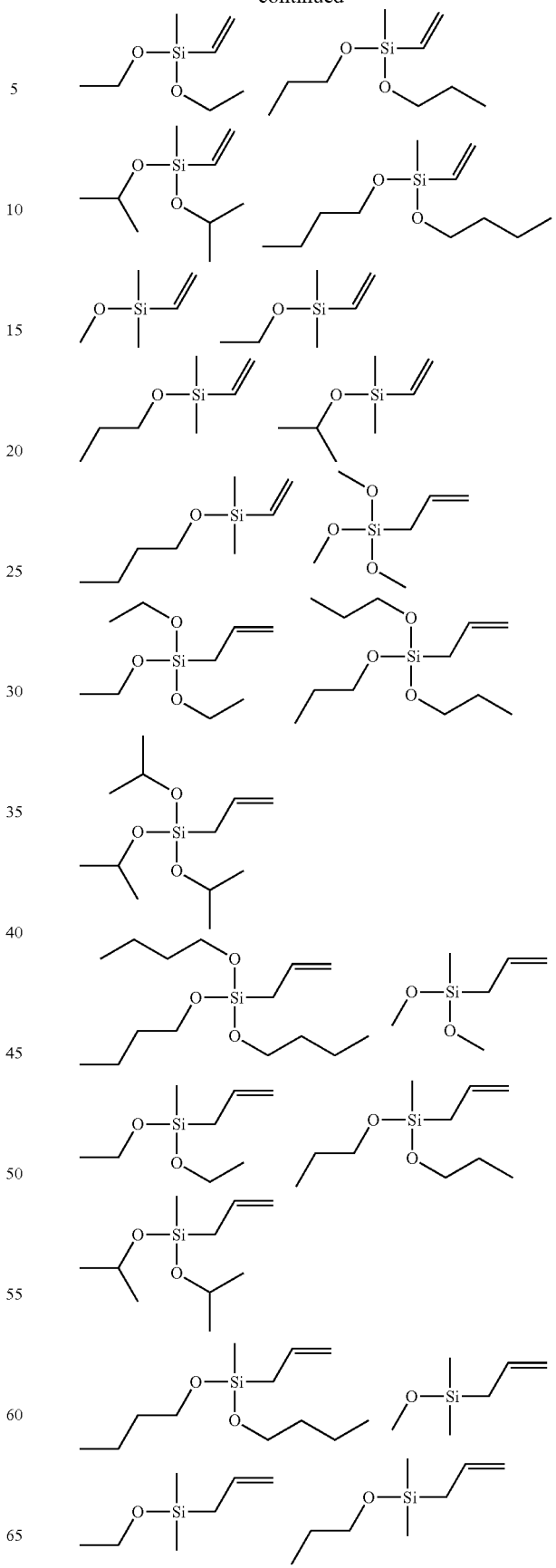

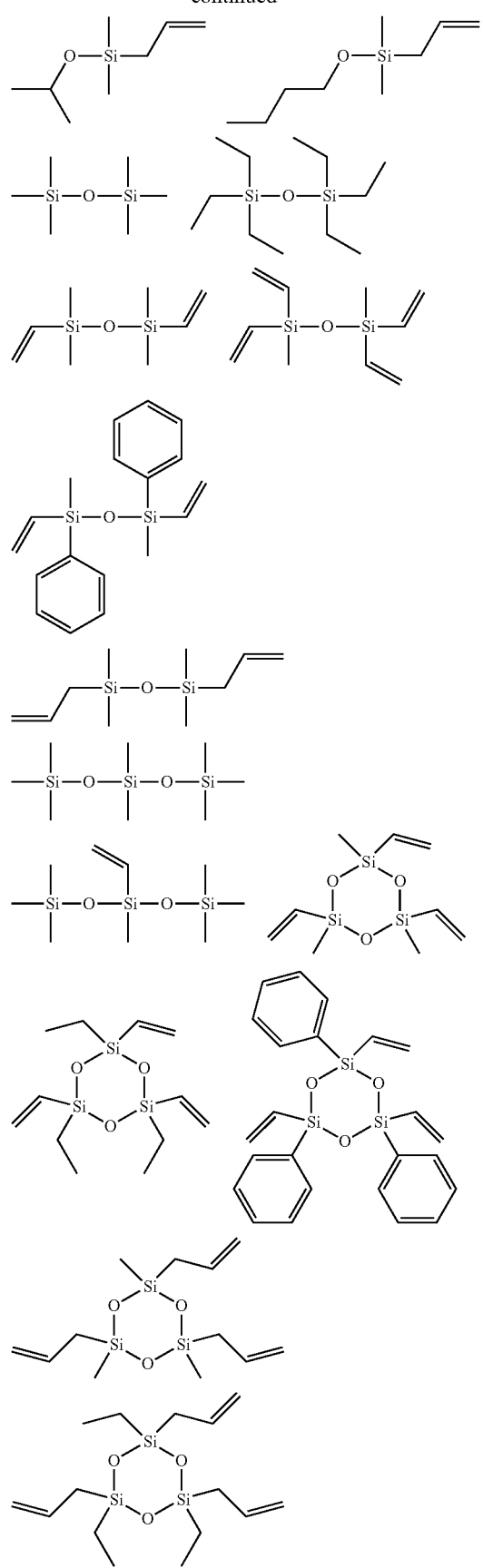
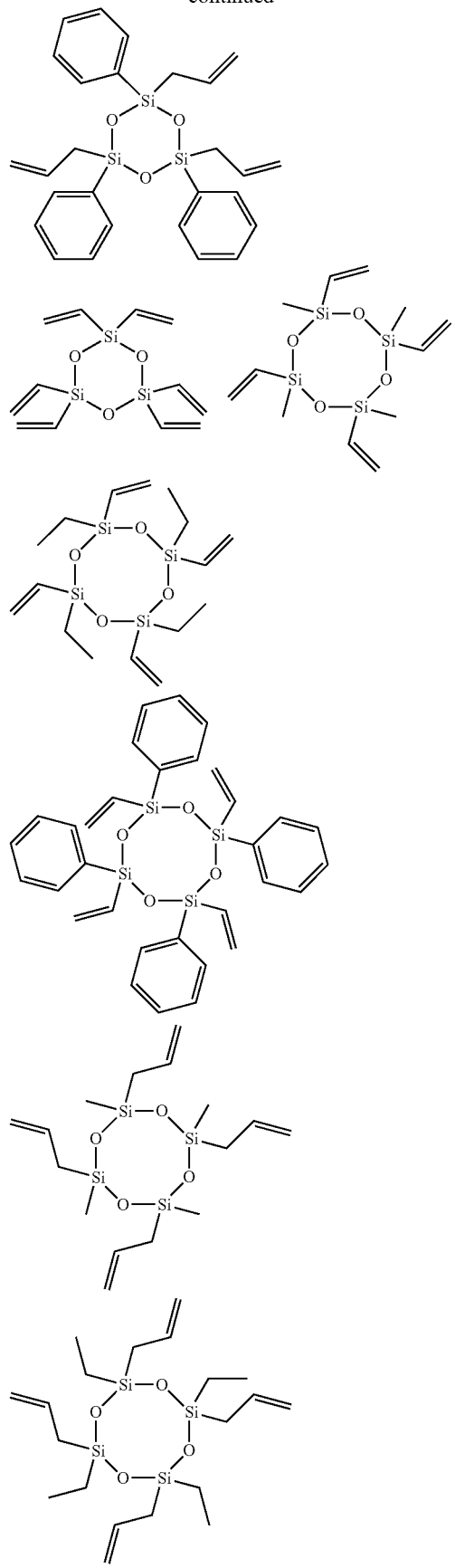

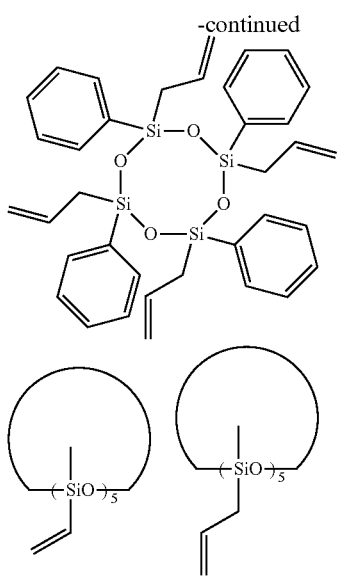
Particularly preferred examples of the compound represented by Formula (A) or (B) include the following compounds.
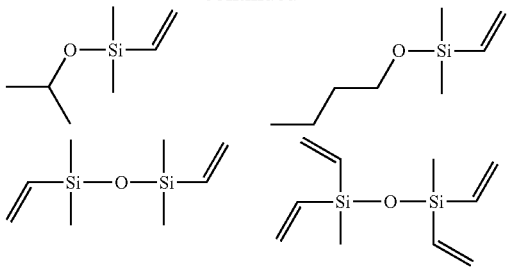
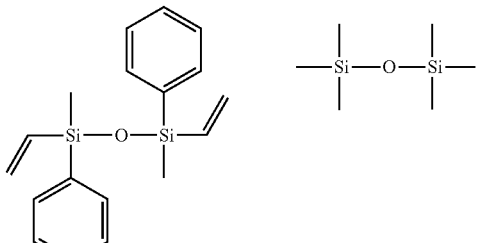
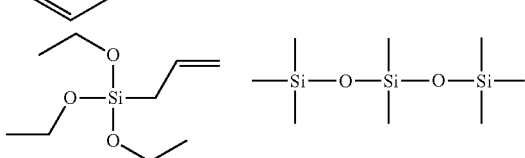
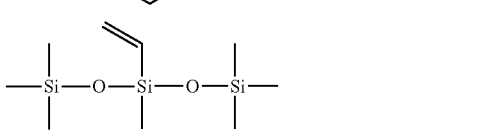
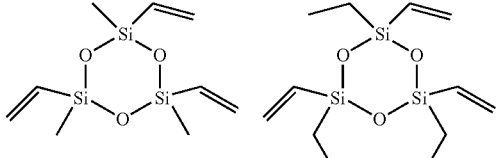
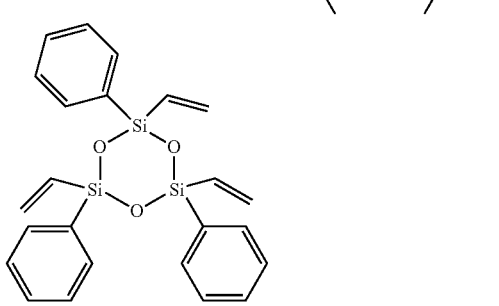
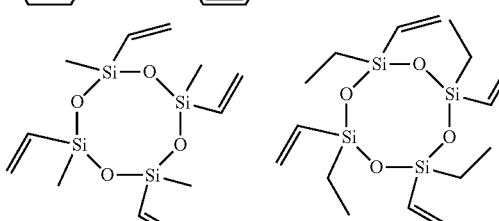
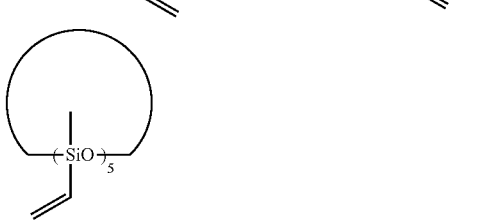

In the non-aqueous electrolyte solution according to one embodiment of the present invention, the Si—O structure-containing compound represented by Formula (A) or (B) may be contained singly, or two or more thereof may be contained in combination.

A total content of Si—O structure-containing compounds represented by Formula (A) or (B) is usually not less than 0.001% by mas, preferably not less than 0.01% by mass, more preferably not less than 0.1% by mass, still more preferably not less than 0.2% by mass, but usually 10% by mass or less, preferably 8% by mass or less, more preferably 6.0% by mass or less, still more preferably 4.0% by mass or less, especially preferably 3.0% by mass or less, particularly preferably 2.5% by mass or less, most preferably 2.0% by mass or less, with respect to a total amount of the non-aqueous electrolyte solution according to one embodiment of the present invention.

When the total content of Si—O structure-containing compounds represented by Formula (A) or (B) with respect to a total amount of the non-aqueous electrolyte solution is in the above-described range, concentration of the compounds into active materials progresses in a preferred manner, so that a battery having a small amount of gas generation during initial conditioning can be produced.

In the non-aqueous electrolyte solution, the Si—O structure-containing compounds represented by Formula (A) or (B) are identified and the content thereof is measured by nuclear magnetic resonance (NMR) spectroscopy.

<1-A2. Compound Represented by Formula (α)>

The non-aqueous electrolyte solution according to one embodiment of the present invention is characterized by containing a compound which is represented by the following Formula (α) and has an Si—N—C=O structure or a H—N—C= structure:

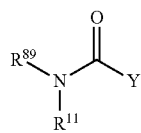

(α)

(wherein, in Formula (α), $R^{89}$ represents a hydrogen atom or a silyl group represented by —$SiR^8R^9R^{10}$, wherein $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms; $R^{11}$ represents a hydrogen atom, an optionally substituted hydrocarbon group having 1 to 12 carbon atoms, or a silyl group represented by —$SiR^dR^eR^f$, wherein $R^d$ to $R^f$ each independently represents a hydrogen atom, a halogen atom, an optionally substituted hydrocarbon group having 1 to 12 carbon atoms, or an optionally substituted alkoxy group having 1 to 12 carbon atoms; Y represents a hydrogen atom, a halogen atom, an optionally substituted hydrocarbon group having 1 to 12 carbon atoms, an optionally substituted alkoxy group having 1 to 12 carbon atoms, a group represented by —$NR^g$—$SiR^hR^iR^j$, or a group represented by —$NR^g$—H, wherein $R^g$ represents a hydrogen atom or an optionally substituted hydrocarbon group having 1 to 12 carbon atoms, and $R^h$ to $R^j$ each independently represents a hydrogen atom, a halogen atom, an optionally substituted hydrocarbon group having 1 to 12 carbon atoms, or an optionally substituted alkoxy group having 1 to 12 carbon atoms; and $R^{11}$ and $R^g$ are optionally bound with each other to form a ring).

$R^{89}$, $R^8$ to $R^{11}$, $R^g$, Y and the like will now be described.

$R^{89}$ according to Formula (α) represents a hydrogen atom or a silyl group represented by —$SiR^8R^9R^{10}$, and $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms.

In the silyl group represented by —$SiR^8R^9R^{10}$, $R^8$ to $R^{10}$ are each preferably an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms. It is noted here that, when the hydrocarbon group has a substituent, the number of carbon atoms contained in the substituent is not included in the number of carbon atoms of the hydrocarbon group.

Further, at least one of $R^8$ to $R^{10}$ is preferably an alkyl group having 1 to 12 carbon atoms since this makes the compound of Formula (α) tend to be localized on the electrode surface in a preferred manner. It is particularly preferred that all of $R^8$ to $R^{10}$ be alkyl groups having 1 to 12 carbon atoms.

$R^8$ to $R^{10}$ according to Formula (α) are optionally the same or different from each other; however, it is preferred that at least two of $R^8$ to $R^{10}$ be the same from the standpoint of the ease of synthesizing the compound, and it is more preferred that all three of $R^8$ to $R^{10}$ be the same from the aforementioned standpoint.

Examples of the halogen atom include a fluorine atom, a chlorine atom, and a bromine atom. The halogen atom is preferably a fluorine atom since it hardly causes an electrochemical side reaction.

The hydrocarbon group having 1 to 12 carbon atoms is preferably a hydrocarbon group having 1 to 6 carbon atoms, particularly preferably a hydrocarbon group having 1 to 4 carbon atoms.

The hydrocarbon group is specifically, for example, an alkyl group, an alkenyl group, an alkynyl group, an aralkyl group, or an aryl group.

Specific examples of the alkyl group include a methyl group, an ethyl group, an n-propyl group, an iso-propyl group, an n-butyl group, a tert-butyl group, an n-pentyl group, a hexyl group, a heptyl group, an octyl group, a nonyl group, and a decyl group. Thereamong, the alkyl group is, for example, preferably a methyl group, an ethyl group, an n-propyl group, an n-butyl group, a tert-butyl group, an n-pentyl group, or a hexyl group, more preferably a methyl group, an ethyl group, an n-propyl group, an n-butyl group, a tert-butyl group, or an n-pentyl group, particularly preferably a methyl group, an ethyl group, an n-butyl group, or a tert-butyl group. When the hydrocarbon group is any of the above-exemplified alkyl groups, the compound represented by Formula (α) tends to be localized in the vicinity of the surface of a positive electrode active material and/or the surface of a negative electrode active material, which is preferred.

Specific examples of the alkenyl group include a vinyl group, an allyl group, a methallyl group, a 2-butenyl group, a 3-methyl-2-butenyl group, a 3-butenyl group, and a 4-pentenyl group. Thereamong, the alkenyl group is, for example, preferably a vinyl group, an allyl group, a methallyl group, or a 2-butenyl group, more preferably a vinyl group, an allyl group, or a methallyl group, particularly preferably a vinyl group or an allyl group. When the hydrocarbon group is any of the above-exemplified alkenyl groups, the compound represented by Formula (α) tends to be localized in the vicinity of the surface of a positive electrode active material and/or the surface of a negative electrode active material, which is preferred.

Specific examples of the alkynyl group include an ethynyl group, a 2-propynyl group, a 2-butynyl group, a 3-butynyl group, a 4-pentynyl group, and 5-hexynyl group. Thereamong, the alkynyl group is, for example, preferably an ethynyl group, a 2-propynyl group, a 2-butynyl group, or a 3-butynyl group, more preferably a 2-propynyl group or a 3-butynyl group, particularly preferably a 2-propynyl group. When the hydrocarbon group is any of the above-exemplified alkynyl groups, the compound represented by Formula (α) tends to be localized in the vicinity of the surface of a positive electrode active material and/or the surface of a negative electrode active material, which is preferred.

Specific examples of the aryl group include a phenyl group and a tolyl group. Thereamong, a phenyl group is preferred since it makes the compound represented by Formula (α) tend to be localized in the vicinity of the surface of a positive electrode active material and/or the surface of a negative electrode active material.

Specific examples of the aralkyl group include a benzyl group and a phenethyl group.

The alkoxy group having 1 to 12 carbon atoms is preferably an alkoxy group having 1 to 6 carbon atoms, particularly preferably an alkoxy group having 1 to 4 carbon atoms.

Specific examples of the alkoxy group having 1 to 12 carbon atoms include a methoxy group, an ethoxy group, a propoxy group, a butoxy group, and an isopropoxy group. Thereamong, a methoxy group and an ethoxy group are preferred since these groups allow the compound to have a small steric hindrance and be concentrated on the active material surface in a preferred manner.

Examples of the above-described substituent include a cyano group, an isocyanate group, an acyl group (—(C=O)—$R^s$), an acyloxy group (—O(C=O)—$R^s$), an alkoxycarbonyl group (—(C=O)O—$R^s$), a sulfonyl group (—$SO_2$—$R^s$), a sulfonyloxy group (—O($SO_2$)—$R^s$), an alkoxysulfonyl group (—($SO_2$)—O—$R^s$), an alkoxysulfonyloxy group (—O—($SO_2$)—O—$R^s$), an alkoxycarbonyloxy group (—O—(C=O)—O—$R^s$), an ether group (—O—$R^s$), an acryl group, a methacryl group, a halogen atom (preferably a fluorine atom), and a trifluoromethyl group. $R^s$ represents an alkyl group having 1 to 10 carbon atoms, an alkylene group having 1 to 10 carbon atoms, an alkoxy group having 1 to 10 carbon atoms, an alkenyl group having 2 to 10 carbon atoms, or an alkynyl group having 2 to 10 carbon atoms. When $R^s$ is an alkylene group, it may be bound with a portion of the hydrocarbon group being substituted to form a ring.

Among these substituents, a cyano group, an isocyanate group, an acyloxy group (—O(C=O)—$R^s$), a halogen atom (preferably a fluorine atom), and a trifluoromethyl group are preferred; an isocyanate group, an acyloxy group (—O(C=O)—$R^s$), a halogen atom (preferably a fluorine atom), and a trifluoromethyl group are more preferred; and an acyloxy group (—O(C=O)—$R^s$), a halogen atom (preferably a fluorine atom), and a trifluoromethyl group are particularly preferred.

$R^{11}$ according to Formula (α) represents a hydrogen atom, an optionally substituted hydrocarbon group having 1 to 12 carbon atoms, or a silyl group represented by —$SiR^dR^eR^f$.

It is noted here that the optionally substituted hydrocarbon group having 1 to 12 carbon atoms has the same meaning as the one defined above for $R^8$ to $R^{10}$.

Further, in the silyl group represented by —$SiR^dR^eR^f$, $R^d$ to $R^f$ each independently represents a hydrogen atom, a halogen atom, an optionally substituted hydrocarbon group having 1 to 12 carbon atoms, or an optionally substituted alkoxy group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for $R^8$ to $R^{10}$.

When the hydrocarbon group has a substituent, the number of carbon atoms contained in the substituent is not included in the number of carbon atoms of the hydrocarbon group.

Y according to Formula (α) represents a hydrogen atom, a halogen atom, an optionally substituted hydrocarbon group having 1 to 12 carbon atoms, an optionally substituted alkoxy group having 1 to 12 carbon atoms, a group represented by —$NR^g$—$SiR^hR^iR^j$, or a group represented by —$NR^g$—H. $R^g$ represents a hydrogen atom or an optionally substituted hydrocarbon group having 1 to 12 carbon atoms, and $R^h$ to $R^j$ each independently represents a hydrogen atom, a halogen atom, an optionally substituted hydrocarbon group having 1 to 12 carbon atoms, or an optionally substituted alkoxy group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for $R^8$ to $R^{10}$.

In the group represented by —$NR^g$—$SiR^hR^iR^j$, $R^g$ has the same meaning as $R^{11}$. Further, the group represented by —$SiR^hR^iR^j$ has the same meaning as the group represented by —$SiR^dR^eR^f$.

In the group represented by —$NR^g$—H, $R^g$ is a hydrogen atom or an optionally substituted hydrocarbon group having 1 to 12 carbon atoms. The optionally substituted hydrocarbon group having 1 to 12 carbon atoms has the same meaning as the one defined above for $R^{11}$. Particularly, $R^g$ is preferably a hydrogen atom or an optionally substituted hydrocarbon group having 1 to 12 carbon atoms, more preferably a hydrogen atom or a hydrocarbon group having 1 to 12 carbon atoms, still more preferably a hydrogen atom or a hydrocarbon group having 1 to 6 carbon atoms, particularly preferably a hydrogen atom or a hydrocarbon group having 1 to 4 carbon atoms.

The compound represented by Formula (α) is preferably the below-described compound represented by Formula (α1) or compound represented by Formula (α2).

(Compound Represented by Formula (α1))

(α1)

(wherein, in Formula (α1), $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms; $R^{11}$ represents a hydrogen atom, an optionally substituted hydrocarbon group having 1 to 12 carbon atoms, or a silyl group represented by —SiR$^d$R$^e$R$^f$, wherein R$^d$ to R$^f$ each independently represents a hydrogen atom, a halogen atom, an optionally substituted hydrocarbon group having 1 to 12 carbon atoms, or an optionally substituted alkoxy group having 1 to 12 carbon atoms; Y' represents a hydrogen atom, a halogen atom, an optionally substituted hydrocarbon group having 1 to 12 carbon atoms, an optionally substituted alkoxy group having 1 to 12 carbon atoms, or a group represented by —NR$^g$—SiR$^h$R$^i$R$^j$; R$^g$ represents a hydrogen atom or an optionally substituted hydrocarbon group having 1 to 12 carbon atoms, and R$^h$ to R$^j$ each independently represents a hydrogen atom, a halogen atom, an optionally substituted hydrocarbon group having 1 to 12 carbon atoms, or an optionally substituted alkoxy group having 1 to 12 carbon atoms; and $R^{11}$ and R$^g$ are optionally bound with each other to form a ring)

In this Formula, $R^8$ to $R^{11}$ and R$^g$ to R$^j$ correspond to $R^8$ to $R^{11}$ and R$^g$ to R$^j$ of Formula (α), respectively, and Y' corresponds to Y of Formula (α), representing a hydrogen atom, a halogen atom, an optionally substituted hydrocarbon group having 1 to 12 carbon atoms, an optionally substituted alkoxy group having 1 to 12 carbon atoms, or an group represented by —NR$^g$—SiR$^h$R$^i$R$^j$.

Specific examples of the compound represented by Formula (α1) which has an Si—N structure include compounds having the following structures.

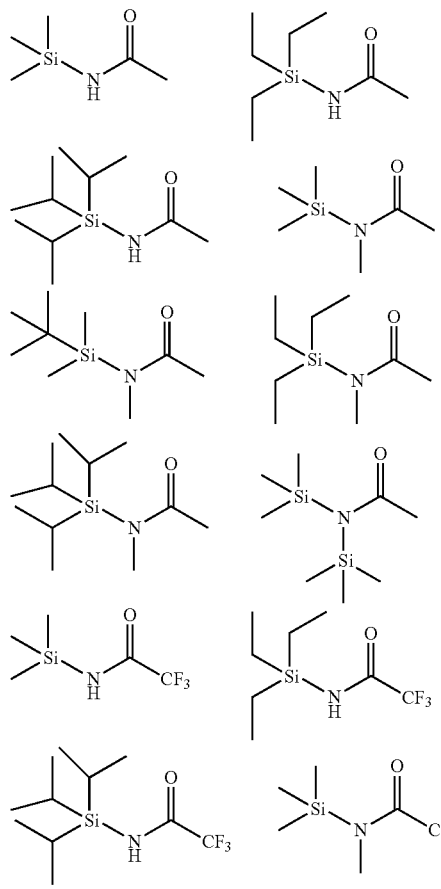

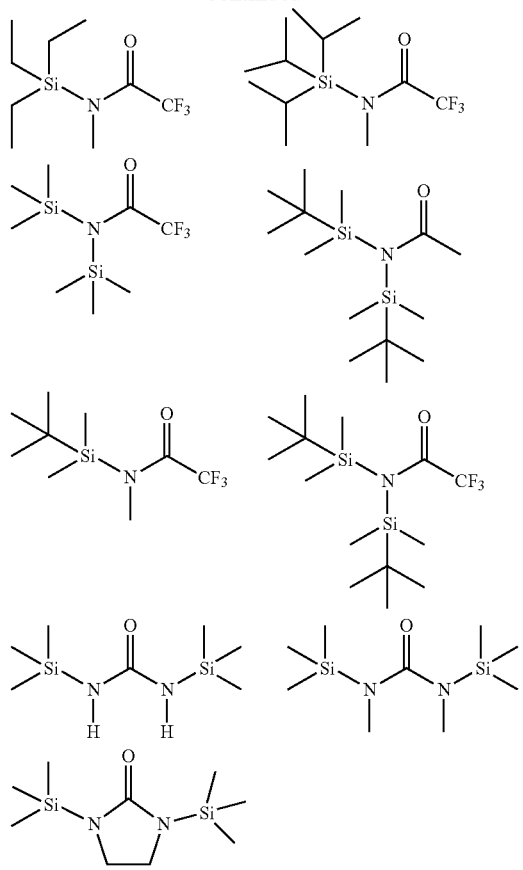

Preferred examples include the following compounds.

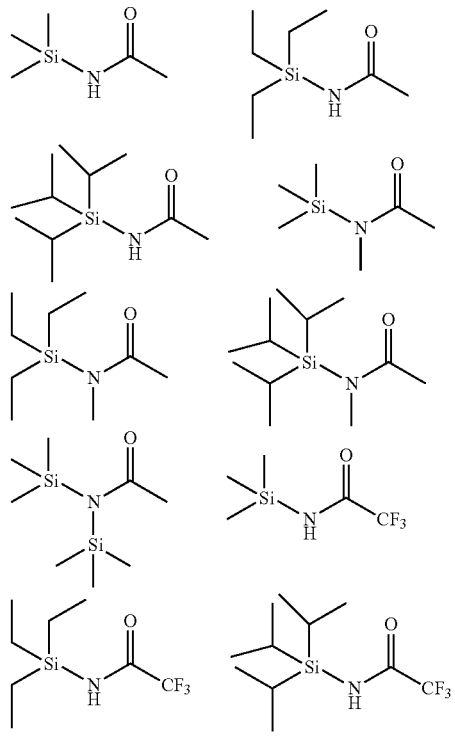

-continued

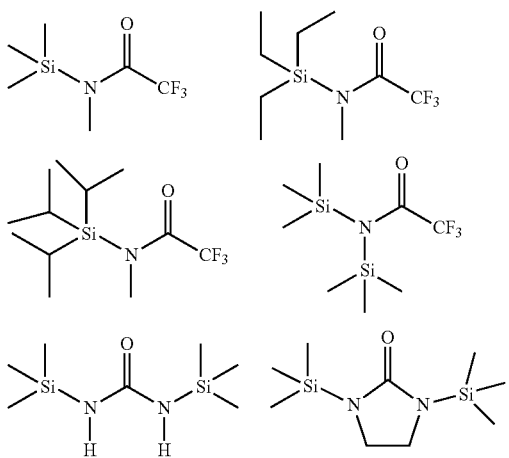

More preferred examples include the following compounds.

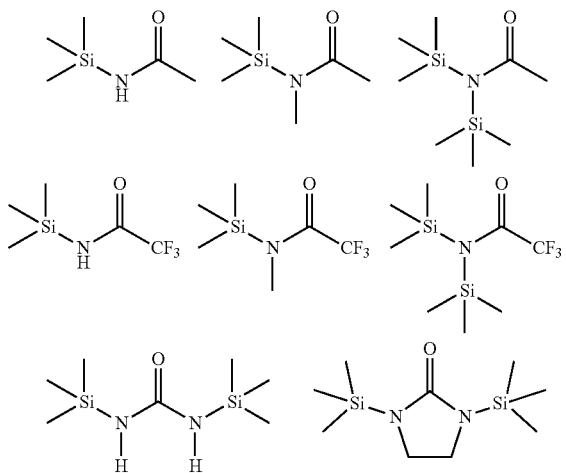

Particularly preferred examples include the following compounds.

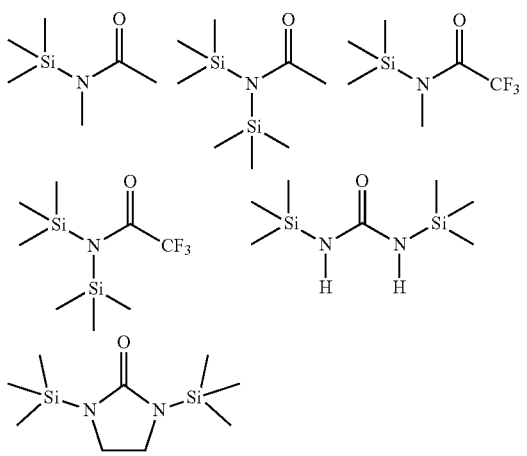

(Compound Represented by Formula (α2))

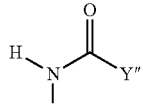

(wherein, in Formula (α2), $R^{111}$ represents a hydrogen atom, an optionally substituted hydrocarbon group having 1 to 12 carbon atoms; Y″ represents a hydrogen atom, a halogen atom, an optionally substituted hydrocarbon group having 1 to 12 carbon atoms, an optionally substituted alkoxy group having 1 to 12 carbon atoms, or a group represented by —$NR^g$—H, wherein and $R^g$ represents a hydrogen atom, an optionally substituted hydrocarbon group having 1 to 12 carbon atoms)

In this Formula, Rill corresponds to $R^{11}$ of Formula (α), representing a hydrogen atom or an optionally substituted hydrocarbon group having 1 to 12 carbon atoms; $R^g$ corresponds to $R^g$ of Formula (α); and Y″ corresponds to Y of Formula (α), representing a hydrogen atom, a halogen atom, an optionally substituted hydrocarbon group having 1 to 12 carbon atoms, an optionally substituted alkoxy group having 1 to 12 carbon atoms, or a group represented by —$NR^g$—H. $R^{111}$ according to Formula (α2) is preferably a hydrogen atom or an optionally substituted hydrocarbon group having 1 to 12 carbon atoms, more preferably a hydrogen atom or a hydrocarbon group having 1 to 12 carbon atoms, still more preferably a hydrogen atom or a hydrocarbon group having 1 to 6 carbon atoms, particularly preferably a hydrogen atom or a hydrocarbon group having 1 to 4 carbon atoms.

Specific examples of the compound represented by Formula (α2) include compounds having the following structures.

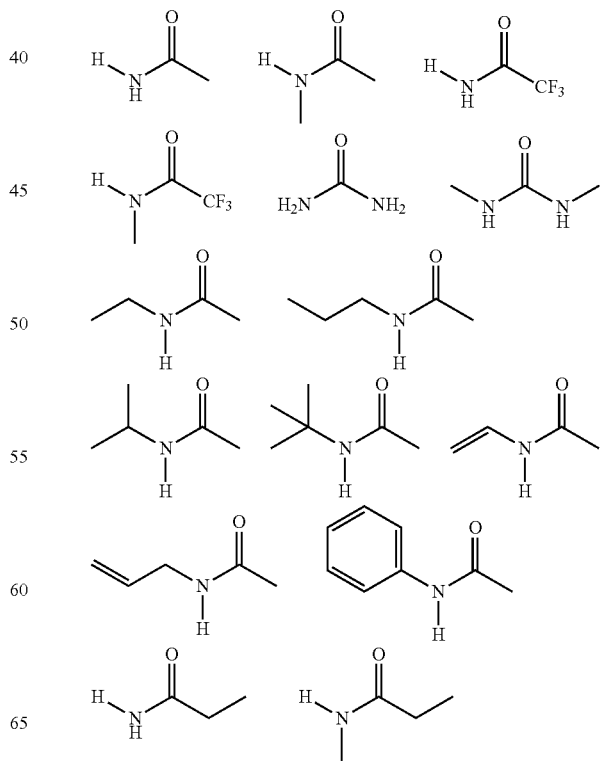

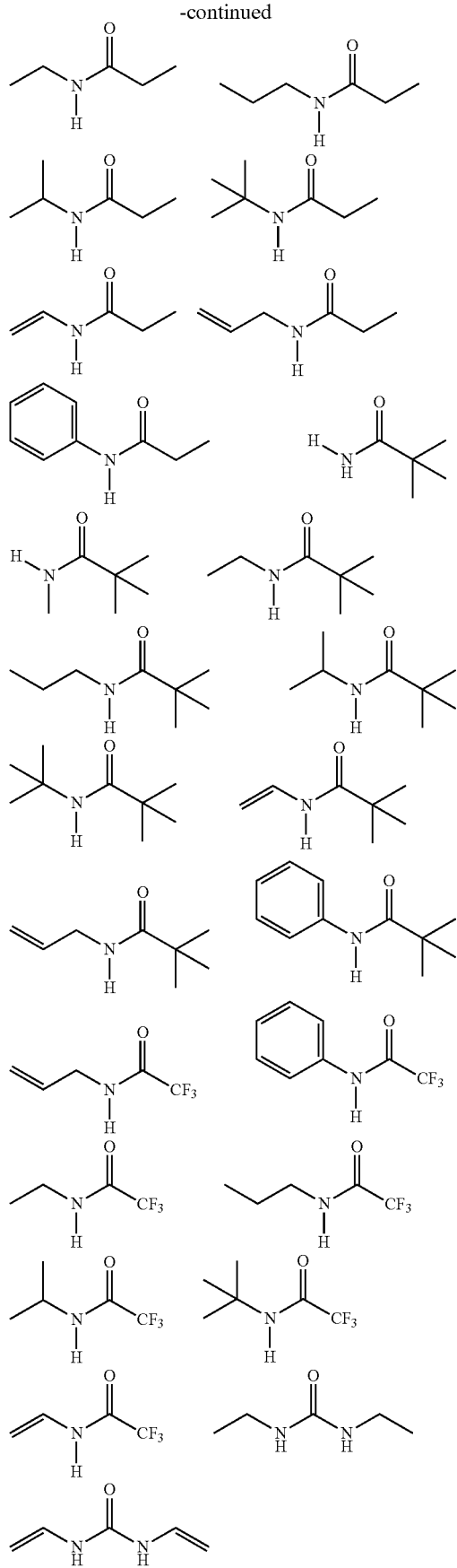
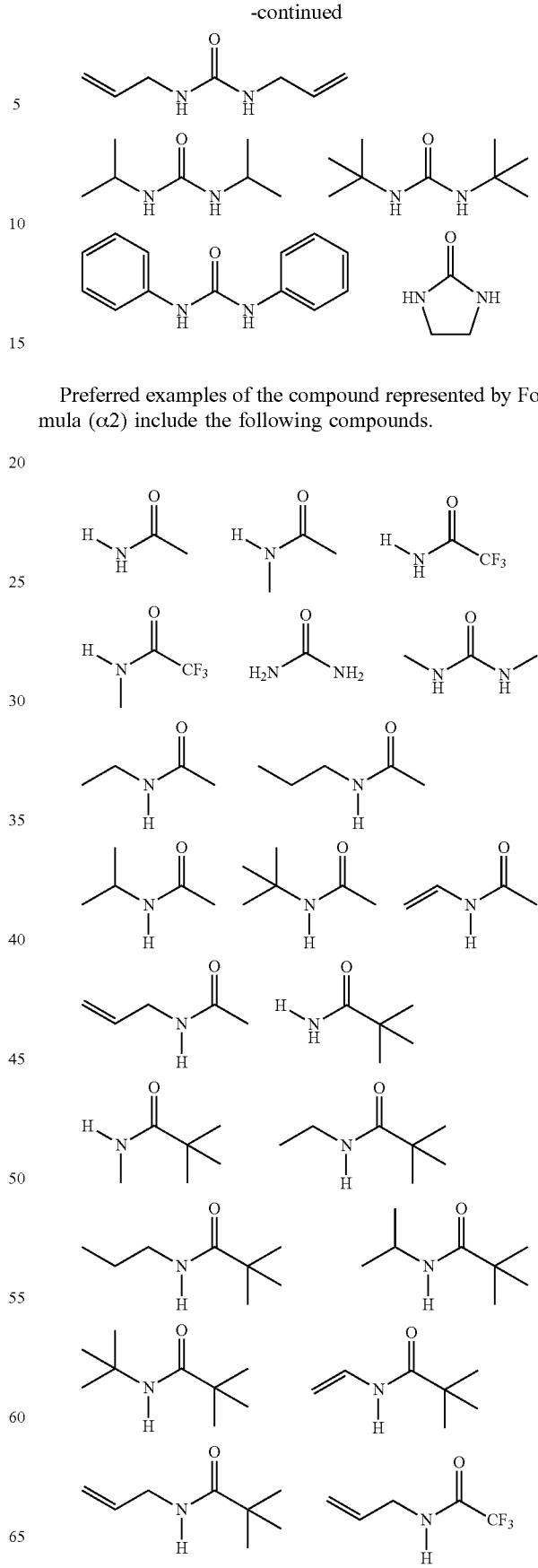
Preferred examples of the compound represented by Formula (α2) include the following compounds.

-continued

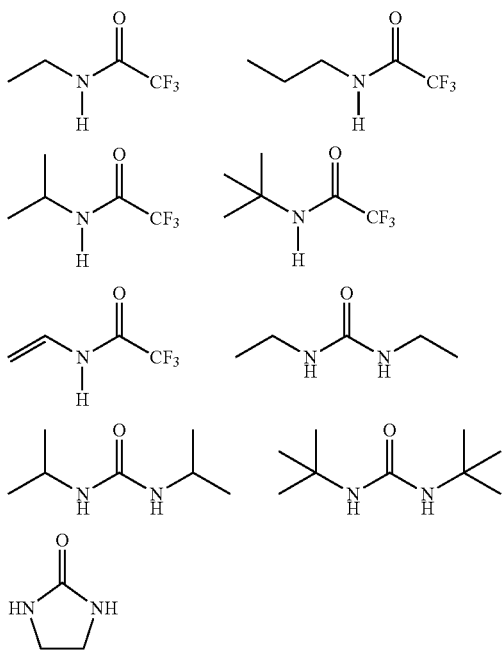

More preferred examples of the compound represented by Formula (α2) include the following compounds.

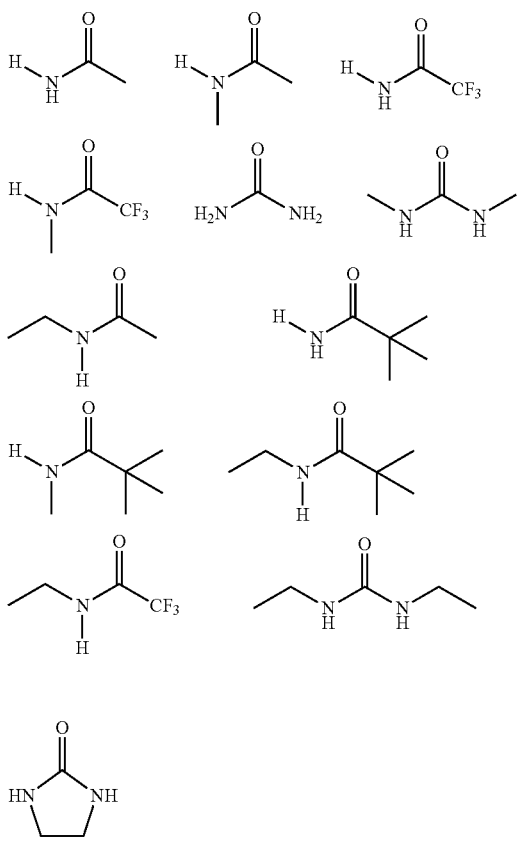

Particularly preferred examples of the compound represented by Formula (α2) include the following compounds.

The compound represented by Formula (α) may be used singly, or two or more thereof may be used in combination. When two or more compounds represented by Formula (α) are used, it is preferred that at least one each of the compound represented by Formula (α1) and the compound represented by Formula (α2) be contained therein since this improves the fixation rate on an electrode. The content (mass) ratio of the compound represented by Formula (α1) and the compound represented by Formula (α2) is not particularly restricted; however, it is usually in a range of 10,000:1 to 1:10,000.

A total content of the compounds represented by Formula (α) with respect to a total amount of the non-aqueous electrolyte solution according to one embodiment of the present invention is not particularly restricted; however, it is preferably not less than 0.01 ppm by mass, more preferably not less than 0.1 ppm by mass, still more preferably not less than 1.0 ppm by mass, particularly preferably not less than 10 ppm by mass, but preferably 0.5% by mass or less, more preferably less than 0.5% by mass, still more preferably 0.4% by mass or less, yet still more preferably 0.3% by mass or less, yet still more preferably 0.2% by mass or less, yet still more preferably 0.1% by mass or less, yet still more preferably 0.05% by mass or less, yet still more preferably 0.03% by mass or less.

When the total content of the compounds represented by Formula (α) with respect to a total amount of the non-aqueous electrolyte solution is in the above-described range, concentration of the compounds represented by Formula (α) into active materials progresses in a preferred manner, so that a battery with reduced gas generation during initial conditioning can be produced.

It is noted here that, when two or more compounds represented by Formula (α) are used, a total amount thereof is defined as "content of the compound represented by Formula (α)".

In the non-aqueous electrolyte solution, a mass ratio of the content of the compound represented by Formula (A) or (B) with respect to the content of the compound represented by Formula (α) is not particularly restricted; however, it is usually 1.0 or higher, preferably 2.0 or higher, particularly preferably 3.0, but usually 10,000 or lower, preferably 7,000 or lower, more preferably 4,000 or lower, still more preferably 2,000 or lower, especially preferably 1,000 or lower, particularly preferably 500 or lower. When the non-aqueous electrolyte solution contains both the compound represented by Formula (A) and the compound represented by Formula (B), the above-described ratio indicates a ratio of a total content of the compound represented by Formula (A) and the compound represented by Formula (B) with respect to the content of the compound represented by Formula (α) (Total content of compound represented by Formula (A) and compound represented by Formula (B)/Total content of compounds represented by Formula (α)).

A total content of compounds represented by Formula (α1) with respect to a total amount of the non-aqueous electrolyte solution according to one embodiment of the present invention is not particularly restricted; however, it is preferably not less than 0.01 ppm by mass, more preferably not less than 0.1 ppm by mass, still more preferably not less than 1.0 ppm by mass, particularly preferably not less than 10 ppm by mass, but usually 0.5% by mass or less, preferably less than 0.5% by mass, more preferably 0.4% by mass or less, still more preferably 0.3% by mass or less, especially preferably 0.2% by mass or less, particularly preferably 0.1% by mass or less.

When the total content of the compounds represented by Formula (α1) with respect to a total amount of the non-aqueous electrolyte solution is in the above-described range, concentration of the compounds represented by Formula (α1) into active materials progresses in a preferred manner, so that a battery with reduced gas generation during initial conditioning can be produced.

In the non-aqueous electrolyte solution, a mass ratio of the content of the compound represented by Formula (A) or (B) with respect to the content of the compound represented by Formula (α1) is not particularly restricted; however, it is usually 1.0 or higher, preferably 2.0 or higher, particularly preferably 3.0 or higher, but usually 10,000 or lower, preferably 7,000 or lower, more preferably 4,000 or lower, still more preferably 2,000 or lower, especially preferably 1,000 or lower, particularly preferably 500 or lower. When the non-aqueous electrolyte solution contains both the compound represented by Formula (A) and the compound represented by Formula (B), the above-described ratio indicates a ratio of a total content of the compound represented by Formula (A) and the compound represented by Formula (B) with respect to the content of the compound represented by Formula (α1) (Total content of compound represented by Formula (A) and compound represented by Formula (B)/ Total content of compounds represented by Formula (α1)).

A total content of compounds represented by Formula (α2) with respect to a total amount of the non-aqueous electrolyte solution according to one embodiment of the present invention is not particularly restricted; however, it is preferably not less than 0.01 ppm by mass, more preferably not less than 0.1 ppm by mass, still more preferably not less than 1.0 ppm by mass, particularly preferably not less than 10 ppm by mass, but preferably 0.50% by mass or less, more preferably 0.2% by mass or less, still more preferably 0.1% by mass or less, especially preferably 0.05% by mass or less, particularly preferably 0.03% by mass or less.

When the total content of the compounds represented by Formula (α2) with respect to a total amount of the non-aqueous electrolyte solution is in the above-described range, concentration of the compounds represented by Formula (α2) into active materials progresses in a preferred manner, so that a battery having a small amount of gas generation during initial conditioning can be produced.

In the non-aqueous electrolyte solution, a mass ratio of the content of the compound represented by Formula (A) or (B) with respect to the content of the compound represented by Formula (α2) is not particularly restricted; however, it is usually 1.0 or higher, preferably 2.0 or higher, particularly preferably 3.0 or higher, but usually 10,000 or lower, preferably 7,000 or lower, more preferably 4,000 or lower, still more preferably 2,000 or lower, especially preferably 1,000 or lower, particularly preferably 500 or lower.

When the non-aqueous electrolyte solution contains both the compound represented by Formula (A) and the compound represented by Formula (B), the above-described ratio indicates a ratio of a total content of the compound represented by Formula (A) and the compound represented by Formula (B) with respect to the content of the compound represented by Formula (α2) (Total content of compound represented by Formula (A) and compound represented by Formula (B)/Total content of compounds represented by Formula (α2)).

In the non-aqueous electrolyte solution, the compound represented by Formula (α) is identified and the content thereof is measured by nuclear magnetic resonance (NMR) spectroscopy.

A method of incorporating the compound represented by Formula (α) and the compound represented by Formula (A) or (B) into an electrolyte solution is not particularly restricted. Examples thereof include a method of directly adding the respective compounds to the electrolyte solution, and a method of generating the respective compounds in a battery or the electrolyte solution.

In the present specification, "content" of a compound means the content measured at any one of time points when a non-aqueous electrolyte solution is produced, when the non-aqueous electrolyte solution is injected into a battery, and when the battery is shipped out as a product.

[Invention B]

The non-aqueous electrolyte solution according to the present invention B is a non-aqueous electrolyte solution for a non-aqueous electrolyte battery including a positive electrode and a negative electrode which are capable of occluding and releasing metal ions. This non-aqueous electrolyte solution is characterized by containing: an alkali metal salt; a non-aqueous solvent; at least one Si—O structure-containing compound represented by Formula (A2) or (B2); and at least one Si—N structure-containing compound represented by Formula (Z) or (Y):

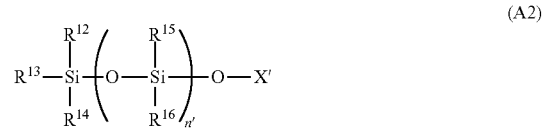

(wherein, in Formula (A2), $R^{12}$ to $R^{16}$ each independently represents a hydrogen atom, a halogen atom, an optionally substituted hydrocarbon group having 1 to 12 carbon atoms, or an optionally substituted alkoxy group having 1 to 12 carbon atoms; X' represents an optionally substituted hydrocarbon group having 1 to 12 carbon atoms, or a silyl group represented by $—SiR^{o2}R^{p2}R^{q2}$, wherein $R^{o2}$ to $R^{q2}$ each independently represents a hydrogen atom, a halogen atom, an optionally substituted hydrocarbon group having 1 to 12 carbon atoms, or an optionally substituted alkoxy group having 1 to 12 carbon atoms; n' represents an integer of 0 to 5; at least one of $R^{12}$ to $R^{14}$ represents a hydrocarbon group having 2 to 12 carbon atoms and an unsaturated carbon-carbon bond; and when n' is 2 or larger, plural $R^{15}$s in Formula (A2) are the same or different from each other, and plural $R^{16}$s in Formula (A2) are the same or different from each other)

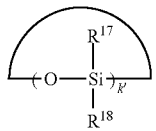

(B2)

(wherein, in Formula (B2), $R^{17}$ and $R^{18}$ each independently represents a hydrogen atom, a halogen atom, an optionally substituted hydrocarbon group having 1 to 12 carbon atoms, or an optionally substituted alkoxy group having 1 to 12 carbon atoms; k' represents an integer of 3 to 6; at least one of $R^{17}$ or $R^{18}$ represents a hydrocarbon group having 2 to 12 carbon atoms and an unsaturated carbon-carbon bond; plural $R^{17}$s in Formula (B2) are the same or different from each other; and plural $R^{18}$s in Formula (B2) are the same or different from each other)

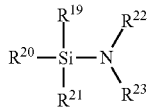

(Z)

(wherein, in Formula (Z), $R^{19}$ to $R^{21}$ each independently represents a hydrogen atom, a halogen atom, an optionally substituted hydrocarbon group having 1 to 12 carbon atoms, or an optionally substituted alkoxy group having 1 to 12 carbon atoms; $R^{22}$ and $R^{23}$ each independently represents a hydrogen atom, an optionally substituted hydrocarbon group having 1 to 12 carbon atoms, or a silyl group represented by —SiR$^x$R$^y$R$^z$; RX to R$^z$ each independently represents a hydrogen atom, a halogen atom, an optionally substituted hydrocarbon group having 1 to 12 carbon atoms, or an optionally substituted alkoxy group having 1 to 12 carbon atoms; and $R^{22}$ and $R^{23}$ are optionally bound with each other to form a ring)

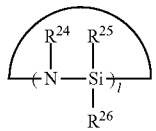

(Y)

(wherein, in Formula (Y), $R^{24}$ represents a hydrogen atom, an optionally substituted hydrocarbon group having 1 to 12 carbon atoms, or a silyl group represented by —SiR$^a$R$^b$R$^c$, wherein R$^a$ to R$^c$ each independently represents a hydrogen atom, a halogen atom, an optionally substituted hydrocarbon group having 1 to 12 carbon atoms, or an optionally substituted alkoxy group having 1 to 12 carbon atoms; $R^{25}$ and $R^{26}$ each independently represents a hydrogen atom, a halogen atom, an optionally substituted hydrocarbon group having 1 to 12 carbon atoms, or an optionally substituted alkoxy group having 1 to 12 carbon atoms; l represents an integer of 3 to 6; plural $R^{25}$s in Formula (Y) are the same or different from each other; and plural $R^{26}$s in Formula (Y) are the same or different from each other).

<1-B. Non-Aqueous Electrolyte Solution>

The non-aqueous electrolyte solution according to the present invention B contains the below-described at least one Si—O structure-containing compound represented by Formula (A2) or (B2), and the below-described at least one Si—N structure-containing compound represented by Formula (Z) or (Y).

The mechanism in which the OCV upon an injection of an electrolyte solution is increased by using a non-aqueous electrolyte solution that contains an Si—O structure-containing compound represented by Formula (A2) or (B2) and an Si—N structure-containing compound represented by Formula (Z) or (Y) is not clear; however, it is presumed as follows.

The compound represented by Formula (A2) or (B2) has a polar structure (—Si—O—) and a nonpolar structure (e.g., —SiR$^{12}$R$^{13}$R$^{14}$) in its molecule. Similarly, the compound represented by Formula (Z) or (Y) also has a polar structure (—Si—N—) and a nonpolar structure (e.g., —SiR$^{19}$R$^{20}$R$^{21}$ or —Si(R$^{25}$R$^{26}$)—) in its molecule. Therefore, these compounds tend to interact with the surface of a negative electrode active material such as carbon and/or the surface of a positive electrode active material such as a transition metal oxide and be thereby localized in the vicinity of the surface(s). Further, it is presumed that the compound represented by Formula (A2) or (B2) and the compound represented by Formula (Z) or (Y), which are localized on the active material surface(s), also interact with each other, whereby the amount of these compounds thus localized and fixed on the surface of the positive electrode active material and/or the surface of the negative electrode active material is increased. Particularly, since the nitrogen atom of the compound represented by Formula (Z) or (Y) is highly adsorptive to an electrode surface, the fixation of the compound represented by Formula (A2) or (B2) onto an electrode is facilitated based on the fixation of the compound represented by Formula (Z) or (Y) onto the electrode. As a result, the compound represented by Formula (Z) or (Y) and the compound represented by Formula (A2) or (B2) that have been localized on the electrode are electrochemically degraded during initial charging to form a composite insulating coating film. This composite coating film is presumed to inhibit a side reaction of the electrolyte solution during initial conditioning and thereby inhibit gas generation.

The "OCV" is a potential difference between a positive electrode and a negative electrode. The potential of an electrode is modified when a large amount of a compound contained in an electrolyte solution adheres to the electrode. A high OCV upon injection of the electrolyte solution is believed to indicate that the amount of the compound constituting the electrolyte solution and adsorbing to the electrode is large. In the electrolyte solution according to one embodiment of the present invention, the amount of a compound adsorbing to an electrode after the injection of the electrolyte solution is large; therefore, the battery OCV is presumed to be high after the injection. Based on this, the present inventor found that the amount of gas generation during initial conditioning can be estimated by checking the OCV upon the injection. In the below-described Examples, the value of the OCV and the amount of gas generation did not necessarily conform to one another; however, they were observed to correlate with each other. It is believed that the properties of a composite coating film to be generated vary depending on the compounds that are used in combination.

<1-B1. Compound Having Si—O Structure>

The non-aqueous electrolyte solution of the present invention is characterized by containing an Si—O structure-containing compound represented by the following Formula (A2) or (B2).

<1-B1-1. Compound Represented by Formula (A2)>

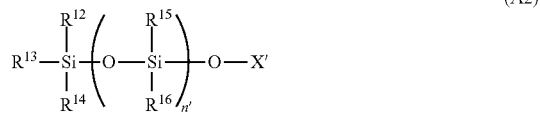

(A2)

(wherein, in Formula (A2), $R^{12}$ to $R^{16}$ each independently represents a hydrogen atom, a halogen atom, an optionally substituted hydrocarbon group having 1 to 12 carbon atoms, or an optionally substituted alkoxy group having 1 to 12 carbon atoms; X' represents an optionally substituted hydrocarbon group having 1 to 12 carbon atoms, or a silyl group represented by $—SiR^{o2}R^{p2}R^{q2}$, wherein $R^{o2}$ to $R^{q2}$ each independently represents a hydrogen atom, a halogen atom, an optionally substituted hydrocarbon group having 1 to 12 carbon atoms, or an optionally substituted alkoxy group having 1 to 12 carbon atoms; n' represents an integer of 0 to 5; at least one of $R^{12}$ to $R^{14}$ represents a hydrocarbon group having 2 to 12 carbon atoms and an unsaturated carbon-carbon bond; and when n' is 2 or larger, plural $R^{15}$s in Formula (A2) are the same or different from each other, and plural $R^{16}$s in Formula (A2) are the same or different from each other)

$R^{12}$ to $R^{16}$ according to Formula (A2) each independently represents a hydrogen atom, a halogen atom, an optionally substituted hydrocarbon group having 1 to 12 carbon atoms, or an optionally substituted alkoxy group having 1 to 12 carbon atoms. Particularly, $R^{12}$ to $R^{16}$ are each preferably a halogen atom, an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms, or an optionally substituted alkoxy group having 1 to 12 carbon atoms. It is noted here that, when the hydrocarbon group has a substituent, the number of carbon atoms contained in the substituent is not included in the number of carbon atoms of the hydrocarbon group.

At least one of $R^{12}$ to $R^{14}$ is preferably a hydrocarbon group having 2 to 12 carbon atoms and an unsaturated carbon-carbon bond since this makes the compound represented by Formula (A2) tend to be localized on the electrode surface in a preferred manner. Examples of the hydrocarbon group having 2 to 12 carbon atoms and an unsaturated carbon-carbon bond include the below-described alkenyl groups having 2 to 12 carbon atoms, alkynyl groups having 2 to 12 carbon atoms, and aryl groups having 6 to 12 carbon atoms, among which an alkenyl group having 2 to 12 carbon atoms or an alkynyl group having 2 to 12 carbon atoms is preferred since it makes the compound represented by Formula (A2) tend to be localized on the electrode surface in a preferred manner. An alkenyl group having 2 to 12 carbon atoms is particularly preferred.

$R^{12}$ to $R^{14}$ according to Formula (A2) are optionally the same or different from each other; however, it is preferred that at least two of $R^{12}$ to $R^{14}$ be the same from the standpoint of the ease of synthesizing the compound, and it is more preferred that all three of $R^{12}$ to $R^{14}$ be the same from the aforementioned standpoint.

$R^{15}$ and $R^{16}$ according to Formula (A2) are optionally the same or different from each other; however, $R^{15}$ and $R^{16}$ are preferably the same from the standpoint of the ease of synthesizing the compound.

Further, when n' is 2 or larger, i.e. when there are plural $R^{15}$s and $R^{16}$s, the $R^{15}$s are optionally the same or different from each other; however, they are preferably the same from the standpoint of the ease of synthesizing the compound. The $R^{16}$s are also optionally the same or different from each other; however, they are preferably the same from the standpoint of the ease of synthesizing the compound.

Examples of the halogen atom include a fluorine atom, a chlorine atom, and a bromine atom. The halogen atom is preferably a fluorine atom since it hardly causes an electrochemical side reaction.

The hydrocarbon group having 1 to 12 carbon atoms is preferably a hydrocarbon group having 1 to 6 carbon atoms, particularly preferably a hydrocarbon group having 1 to 4 carbon atoms.

The hydrocarbon group is specifically, for example, an alkyl group, an alkenyl group, an alkynyl group, an aralkyl group, or an aryl group.

Specific examples of the alkyl group include a methyl group, an ethyl group, an n-propyl group, an iso-propyl group, an n-butyl group, a tert-butyl group, an n-pentyl group, a hexyl group, a heptyl group, an octyl group, a nonyl group, and a decyl group. Thereamong, the alkyl group is, for example, preferably a methyl group, an ethyl group, an n-propyl group, an n-butyl group, a tert-butyl group, an n-pentyl group, or a hexyl group, more preferably a methyl group, an ethyl group, an n-propyl group, an n-butyl group, a tert-butyl group, or an n-pentyl group, particularly preferably a methyl group, an ethyl group, an n-butyl group, or a tert-butyl group. When the hydrocarbon group is any of the above-exemplified alkyl groups, the compound according to Formula (A2) tends to be localized in the vicinity of the surface of a positive electrode active material and/or the surface of a negative electrode active material, which is preferred.

Specific examples of the alkenyl group include a vinyl group, an allyl group, a methallyl group, a 2-butenyl group, a 3-methyl-2-butenyl group, a 3-butenyl group, and a 4-pentenyl group. Thereamong, the alkenyl group is, for example, preferably a vinyl group, an allyl group, a methallyl group, or a 2-butenyl group, more preferably a vinyl group, an allyl group, or a methallyl group, particularly preferably a vinyl group or an allyl group. When the hydrocarbon group is any of the above-exemplified alkenyl groups, the compound according to Formula (A2) tends to be localized in the vicinity of the surface of a positive electrode active material and/or the surface of a negative electrode active material, which is preferred.

Specific examples of the alkynyl group include an ethynyl group, a 2-propynyl group, a 2-butynyl group, a 3-butynyl group, a 4-pentynyl group, and 5-hexynyl group. Thereamong, the alkynyl group is, for example, preferably an ethynyl group, a 2-propynyl group, a 2-butynyl group, or a 3-butynyl group, more preferably a 2-propynyl group or a 3-butynyl group, particularly preferably a 2-propynyl group. When the hydrocarbon group is any of the above-exemplified alkynyl groups, the compound according to Formula (A2) tends to be localized in the vicinity of the surface of a positive electrode active material and/or the surface of a negative electrode active material, which is preferred.

Specific examples of the aryl group include a phenyl group and a tolyl group. Thereamong, a phenyl group is preferred since it makes the compound according to Formula (A2) tend to be localized in the vicinity of the surface of a positive electrode active material and/or the surface of a negative electrode active material.

Specific examples of the aralkyl group include a benzyl group and a phenethyl group.

The alkoxy group having 1 to 12 carbon atoms is preferably an alkoxy group having 1 to 6 carbon atoms, more preferably an alkoxy group having 1 to 4 carbon atoms.

Specific examples of the alkoxy group having 1 to 12 carbon atoms include a methoxy group, an ethoxy group, a propoxy group, a butoxy group, and an isopropoxy group. Thereamong, a methoxy group and an ethoxy group are preferred since these groups allow the compound according to Formula (A2) to have a small steric hindrance and be concentrated on the active material surface in a preferred manner.

Examples of the above-described substituent include a cyano group, an isocyanate group, an acyl group (—(C=O)—R$^r$), an acyloxy group (—O(C=O)—R$^r$), an alkoxycarbonyl group (—(C=O)O—R$^r$), a sulfonyl group (—SO$_2$—R$^r$), a sulfonyloxy group (—O(SO$_2$)—R$^r$), an alkoxysulfonyl group (—(SO$_2$)—O—R$^r$), an alkoxysulfonyloxy group (—O—(SO$_2$)—O—R$^r$), an alkoxycarbonyloxy group (—O—(C=O)—O—R$^r$), an ether group (—O—R$^r$), an acryl group, a methacryl group, a halogen atom (preferably a fluorine atom), and a trifluoromethyl group. R$^r$ represents an alkyl group having 1 to 10 carbon atoms, an alkylene group having 1 to 10 carbon atoms, an alkoxy group having 1 to 10 carbon atoms, an alkenyl group having 2 to 10 carbon atoms, or an alkynyl group having 2 to 10 carbon atoms. When R$^r$ is an alkylene group, it may be bound with a portion of the hydrocarbon group being substituted to form a ring.

Among these substituents, a cyano group, an isocyanate group, an acyloxy group (—O(C=O)—R$^r$), a halogen atom (preferably a fluorine atom), and a trifluoromethyl group are preferred; an isocyanate group, an acyloxy group (—O(C=O)—R$^r$), a halogen atom (preferably a fluorine atom), and a trifluoromethyl group are more preferred; and an acyloxy group (—O(C=O)—R$^r$), a halogen atom (preferably a fluorine atom), and a trifluoromethyl group are particularly preferred.

X' according to Formula (A2) represents an optionally substituted hydrocarbon group having 1 to 12 carbon atoms, or a silyl group represented by —SiR$^{o2}$R$^{p2}$R$^{q2}$.

Examples of the hydrocarbon group having 1 to 12 carbon atoms and the alkoxy group having 1 to 12 carbon atoms include the same ones as those described above for R$^1$ to R$^3$.

In the silyl group represented by —SiR$^{o2}$R$^{p2}$R$^{q2}$, R$^{o2}$ to R$^{q2}$ each independently represents a hydrogen atom, a halogen atom, an optionally substituted hydrocarbon group having 1 to 12 carbon atoms, or an optionally substituted alkoxy group having 1 to 12 carbon atoms. Particularly, R$^{o2}$ to R$^{q2}$ are each preferably an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for R$^{12}$ to R$^{14}$. Further, their preferred modes are also the same.

Specific examples of the silyl group represented by —SiR$^{o2}$R$^{p2}$R$^{q2}$ include —Si(CH$_3$)$_3$, —Si(CH$_3$)$_2$ (C$_2$H$_5$), —Si(CH$_3$)$_2$ (CH=CH$_2$), —Si(CH$_3$)$_2$(CH$_2$CH$_2$CH$_3$), —Si(CH$_3$)$_2$(CH$_2$CH=CH$_2$), —Si(CH$_3$)$_2$[CH(CH$_3$)$_2$], —Si(CH$_3$)$_2$[(CH$_2$)$_3$CH$_3$], —Si(CH$_3$)$_2$[CH$_2$CH(CH$_3$)$_2$], —Si(CH$_3$)$_2$[C(CH$_3$)$_3$], —Si(CH$_3$)$_2$(C$_6$H$_5$), —Si(CH$_3$)(C$_6$H$_5$)$_2$, —Si(C$_6$H$_5$)$_3$, —Si(C$_2$H$_5$)$_3$, —Si(CH=CH$_2$)$_3$, —Si(CH$_2$CH$_2$CH$_3$)$_3$, —Si [CH(CH$_3$)$_2$]$_3$, —Si(CH$_2$CH=CH$_2$)$_3$, —Si(CH$_3$)(C$_6$H$_5$)(CH=CH$_2$), —Si(C$_6$H$_5$)$_2$(CH=CH$_2$), and —Si(CF$_3$)$_3$. Thereamong, —Si(CH$_3$)$_3$, —Si(CH$_3$)$_2$(CH=CH$_2$), —Si(CH$_3$)$_2$(CH$_2$CH=CH$_2$), —Si(C$_2$H$_5$)$_3$, —Si(CH$_3$)(C$_6$H$_5$)(CH=CH$_2$), and —Si(C$_6$H$_5$)$_2$(CH=CH$_2$) are preferred, and —Si(CH$_3$)$_2$(CH=CH$_2$) and —Si(CH$_3$)$_2$(CH$_2$CH=CH$_2$) are particularly preferred.

In Formula (A2), n' represents an integer of 0 to 5. From the standpoint of the ease of synthesizing the compound, n' is preferably 0 to 2.

Particularly, a compound represented by Formula (A3) in which n'=0 in Formula (A2) is preferred since it has an excellent effect of inhibiting gas generation during initial conditioning.

(A3)

(wherein, in Formula (A3), R$^{12}$ to R$^{14}$ each independently represents a hydrogen atom, a halogen atom, an optionally substituted hydrocarbon group having 1 to 12 carbon atoms, or an optionally substituted alkoxy group having 1 to 12 carbon atoms; X' represents an optionally substituted hydrocarbon group having 1 to 12 carbon atoms, or —SiR$^{o2}$R$^{p2}$R$^{q2}$, wherein R$^{o2}$ to R$^{q2}$ each independently represents a hydrogen atom, a halogen atom, an optionally substituted hydrocarbon group having 1 to 12 carbon atoms, or an optionally substituted alkoxy group having 1 to 12 carbon atoms; and at least one of R$^{12}$ to R$^{14}$ represents a hydrocarbon group having 2 to 12 carbon atoms and an unsaturated carbon-carbon bond)

In Formula (A3), R$^{12}$ to R$^{14}$, X' and R$^{o2}$ to R$^{q2}$ correspond to R$^{12}$ to R$^{14}$, X' and R$^{o2}$ to R$^{q2}$ of Formula (A2), respectively.

Further, a compound of Formula (A2) in which n'=1 is also preferred since it has an excellent effect of inhibiting gas generation during initial conditioning.

<1-B1-2. Compound Represented by Formula (B2)>

(B2)

(wherein, in Formula (B2), R$^{17}$ and R$^{18}$ each independently represents a hydrogen atom, a halogen atom, an optionally substituted hydrocarbon group having 1 to 12 carbon atoms, or an optionally substituted alkoxy group having 1 to 12 carbon atoms; k' represents an integer of 3 to 6; at least one of R$^{17}$ or R$^{18}$ represents a hydrocarbon group having 2 to 12 carbon atoms and an unsaturated carbon-carbon bond; plural $R^{17}$s in Formula (B2) are the same or different from each other; and plural $R^{18}$s in Formula (B2) are the same or different from each other).

$R^{17}$ and $R^{18}$ according to Formula (B2) each independently represents a hydrogen atom, a halogen atom, an optionally substituted hydrocarbon group having 1 to 12 carbon atoms, or an optionally substituted alkoxy group having 1 to 12 carbon atoms. Further, plural $R^{17}$s ($R^{17}$s existing in repeating units) are optionally the same or different from each other, and plural $R^{18}$s ($R^{18}$s existing in repeating units) are also optionally the same or different from each other. In other words, 3 to 6 $R^{17}$s existing in one molecule are optionally the same or different from each other, and 3 to 6 $R^{18}$s existing in one molecule are optionally the same or different from each other.

$R^{17}$ and $R^{18}$ according to Formula (B2) are optionally the same or different from each other; however, they are preferably the same from the standpoint of the ease of synthesizing the compound.

It is noted here that the halogen atom, the optionally substituted hydrocarbon group having 1 to 12 carbon atoms, and the optionally substituted alkoxy group having 1 to 12 carbon atoms all have the same meanings as those defined above for $R^{12}$ to $R^{14}$.

At least one of $R^{17}$ and $R^{18}$ is preferably a hydrocarbon group having 2 to 12 carbon atoms and an unsaturated carbon-carbon bond since this makes the compound represented by Formula (B2) tend to be localized on the electrode surface in a preferred manner. Examples of the hydrocarbon group having 2 to 12 carbon atoms and an unsaturated carbon-carbon bond include the below-described alkenyl groups having 2 to 12 carbon atoms, alkynyl groups having 2 to 12 carbon atoms, and aryl groups having 6 to 12 carbon atoms, among which an alkenyl group having 2 to 12 carbon atoms or an alkynyl group having 2 to 12 carbon atoms is preferred since it makes the compound represented by Formula (B2) tend to be localized on the electrode surface in a preferred manner. An alkenyl group having 2 to 12 carbon atoms is particularly preferred.

In Formula (B2), k' is usually an integer of 3 to 6, and k' is preferably 3 or 4.

Specific examples of the compound represented by Formula (A2) or (B2) preferably include compounds having the following structures.

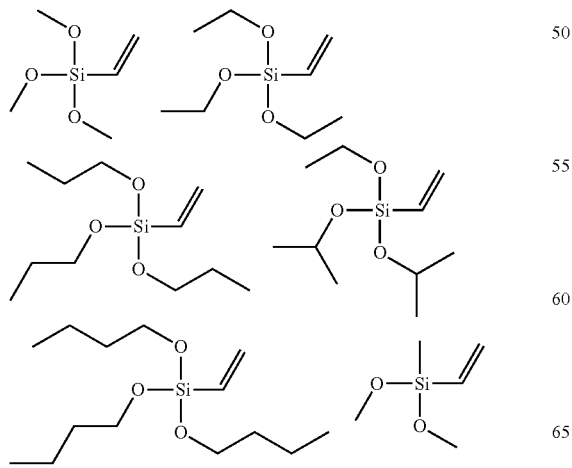

-continued

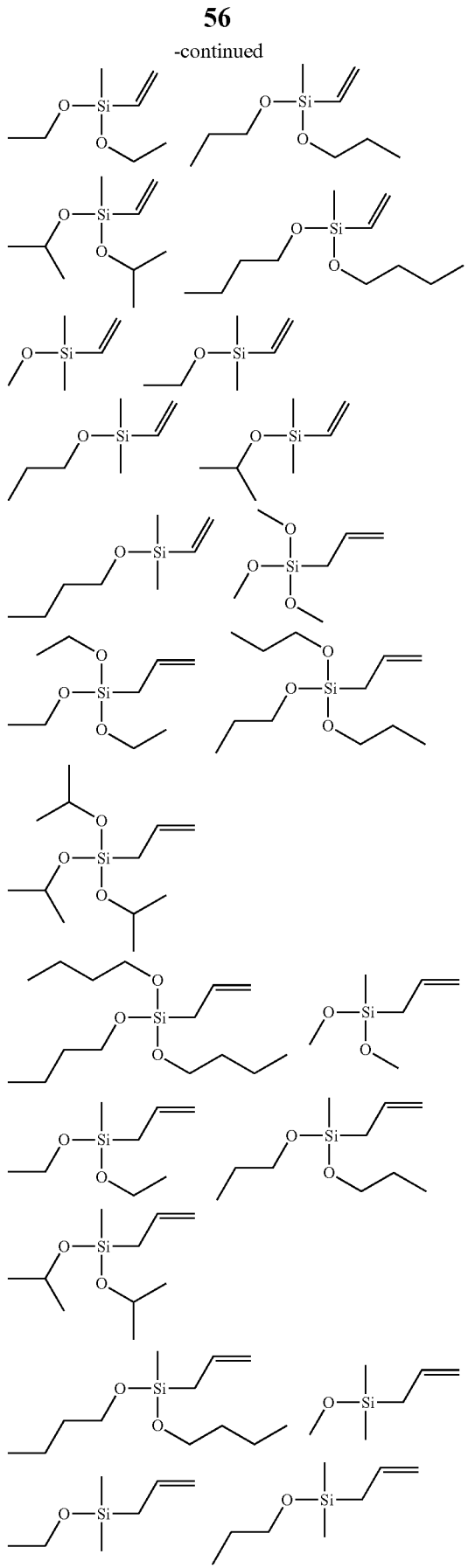

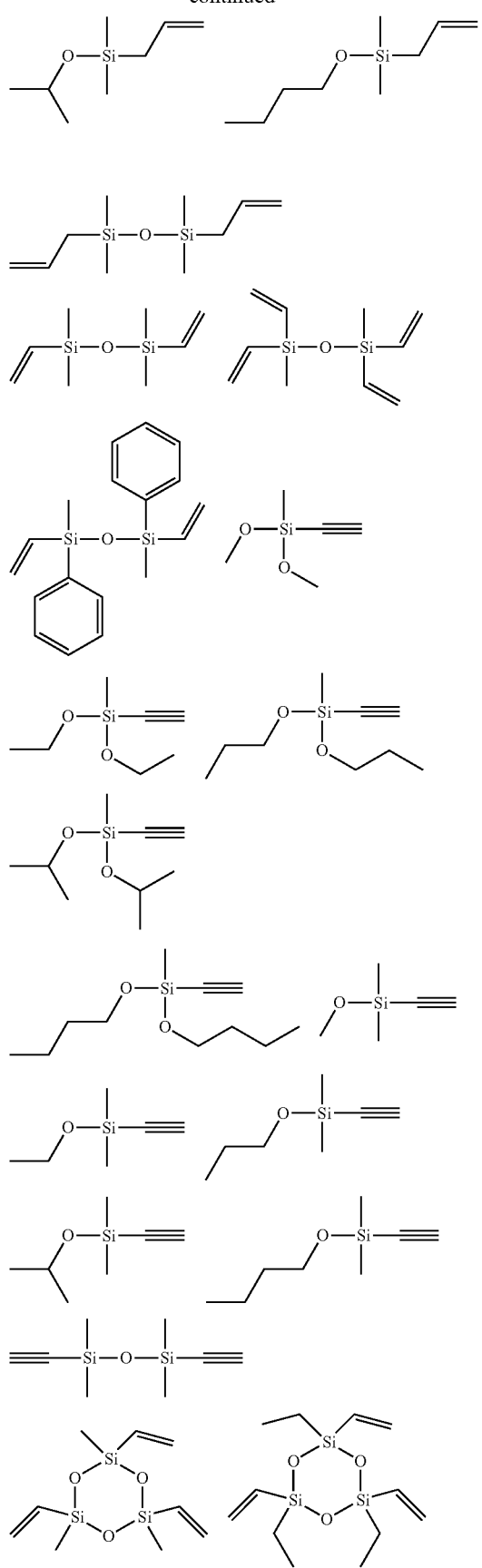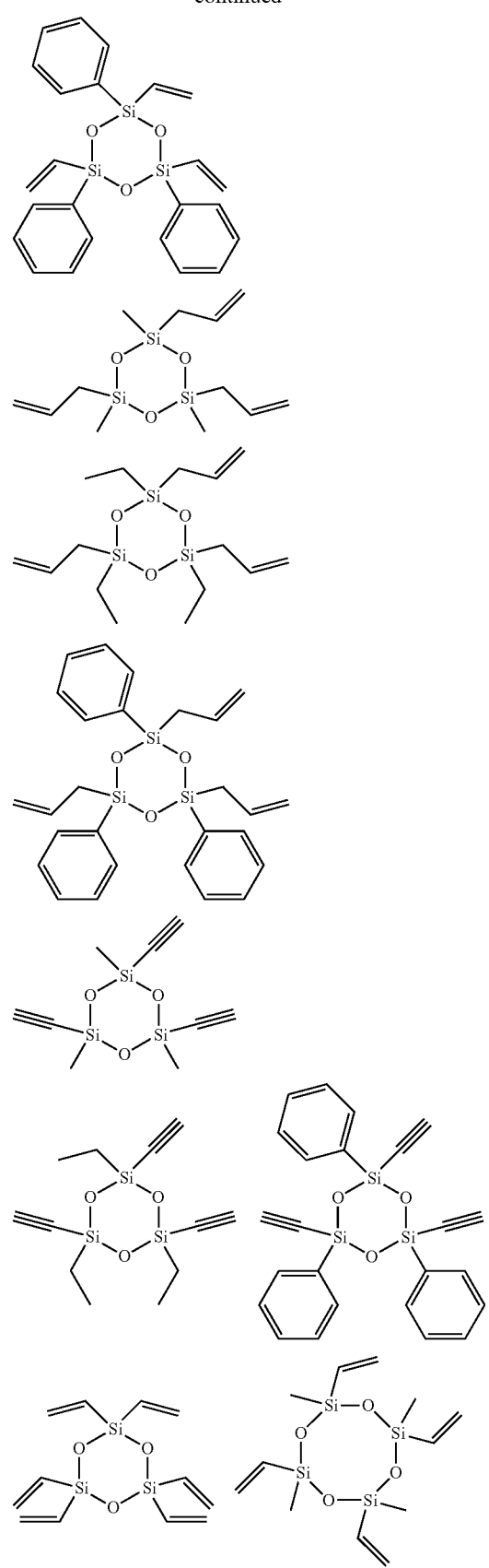

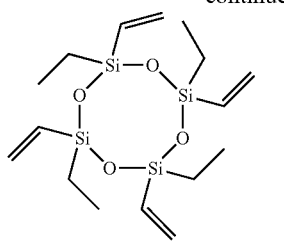
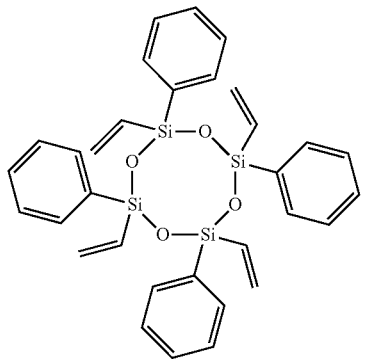
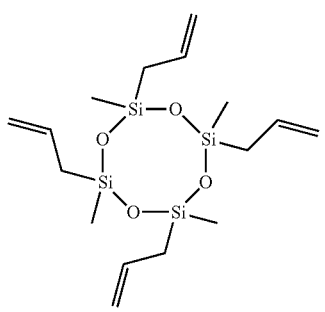
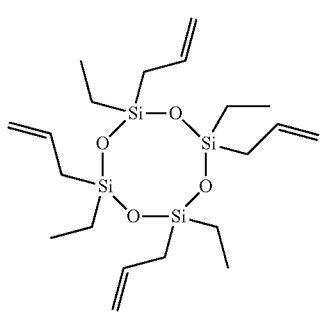
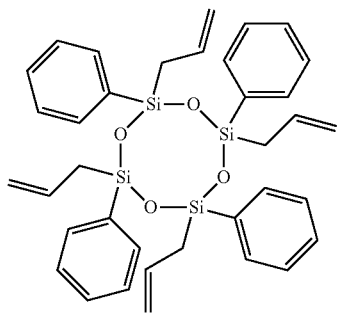
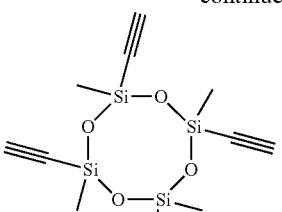
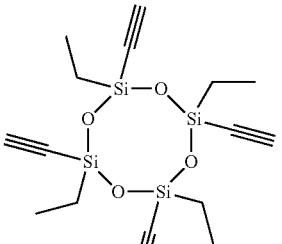
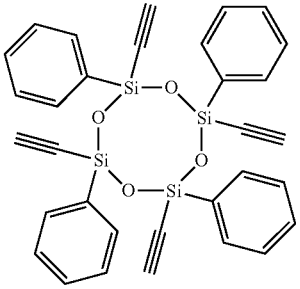
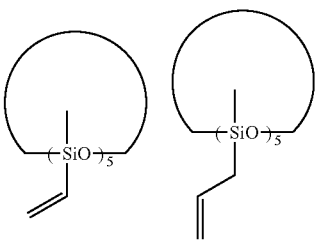
More preferred examples of the compound represented by Formula (A2) or (B2) include the following compounds.
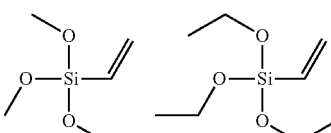
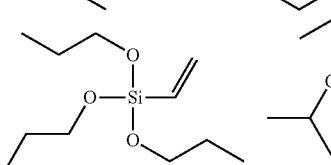
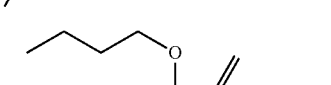
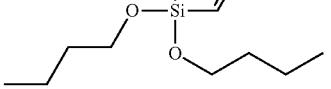

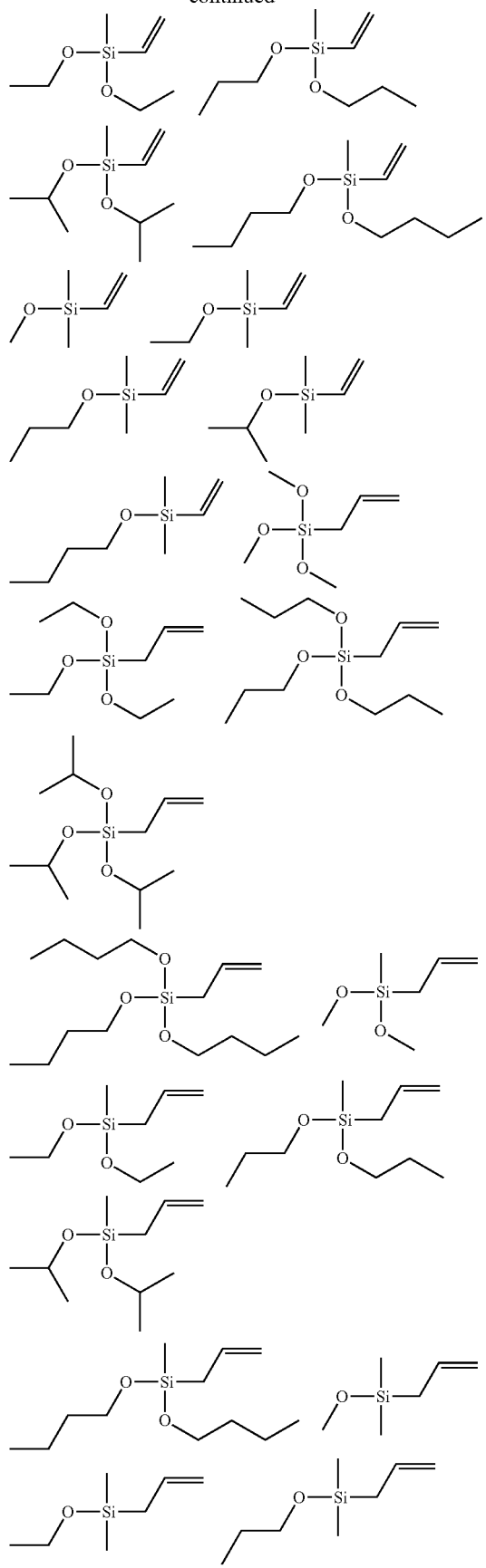
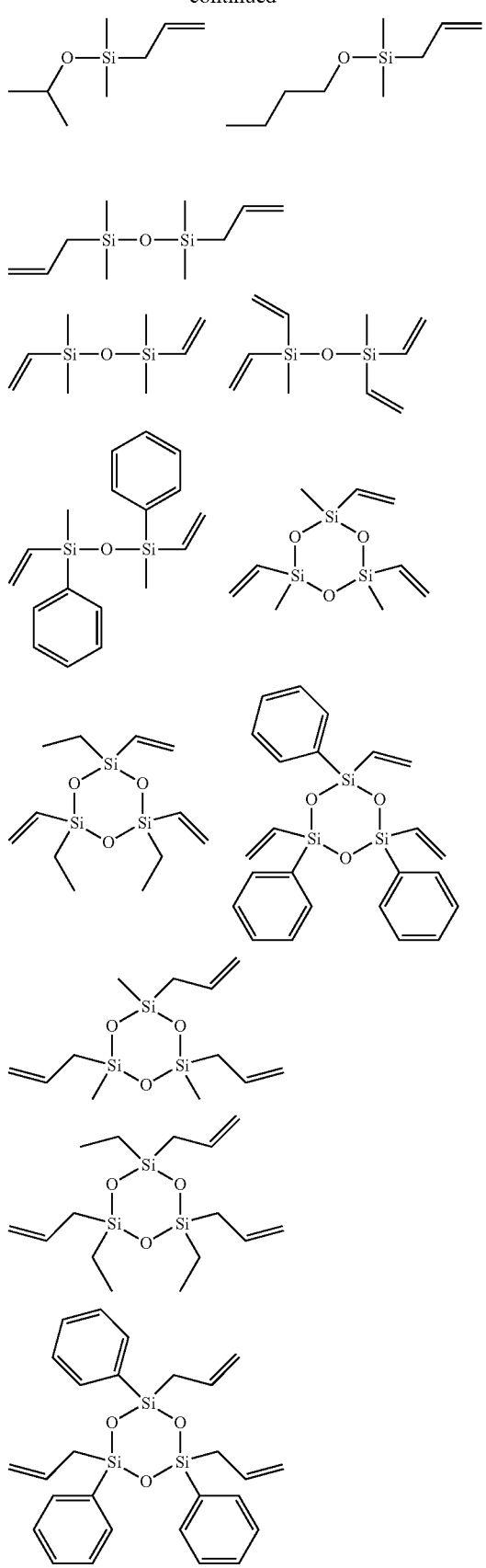

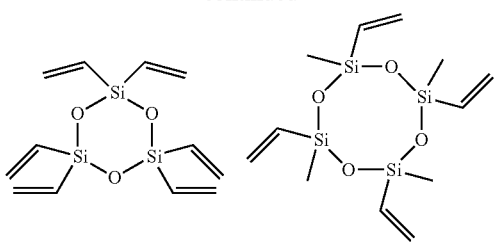
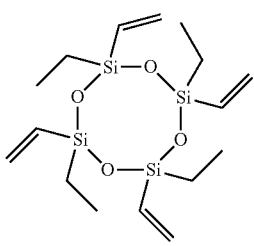
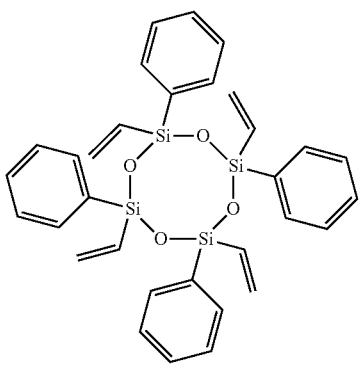
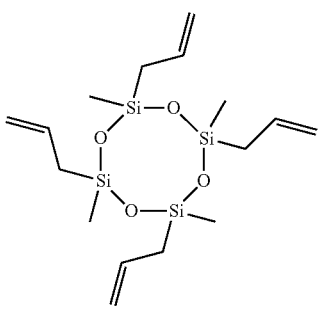
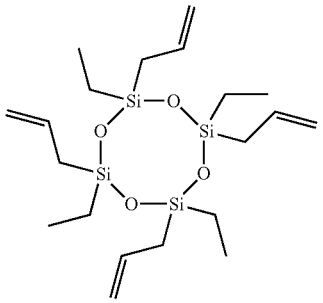
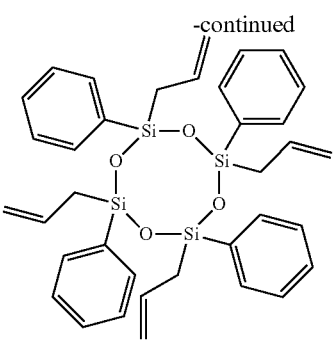
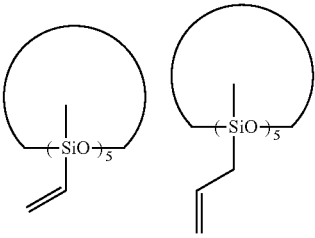
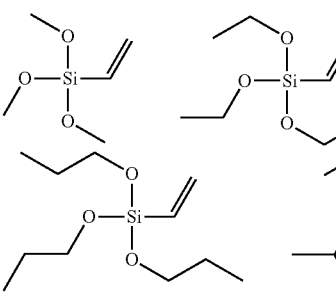
Particularly preferred examples of the compound represented by Formula (A2) or (B2) include the following compounds.
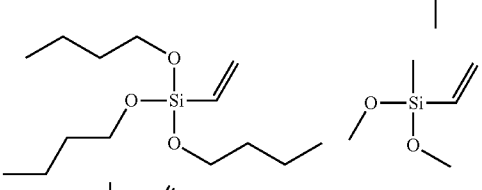
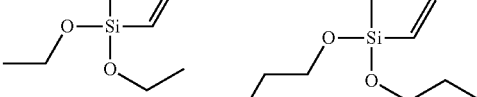
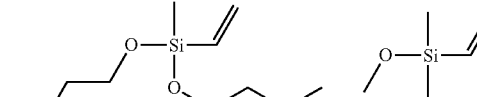
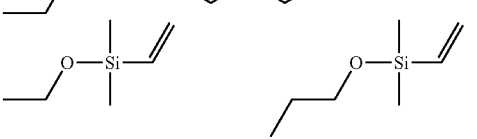

-continued

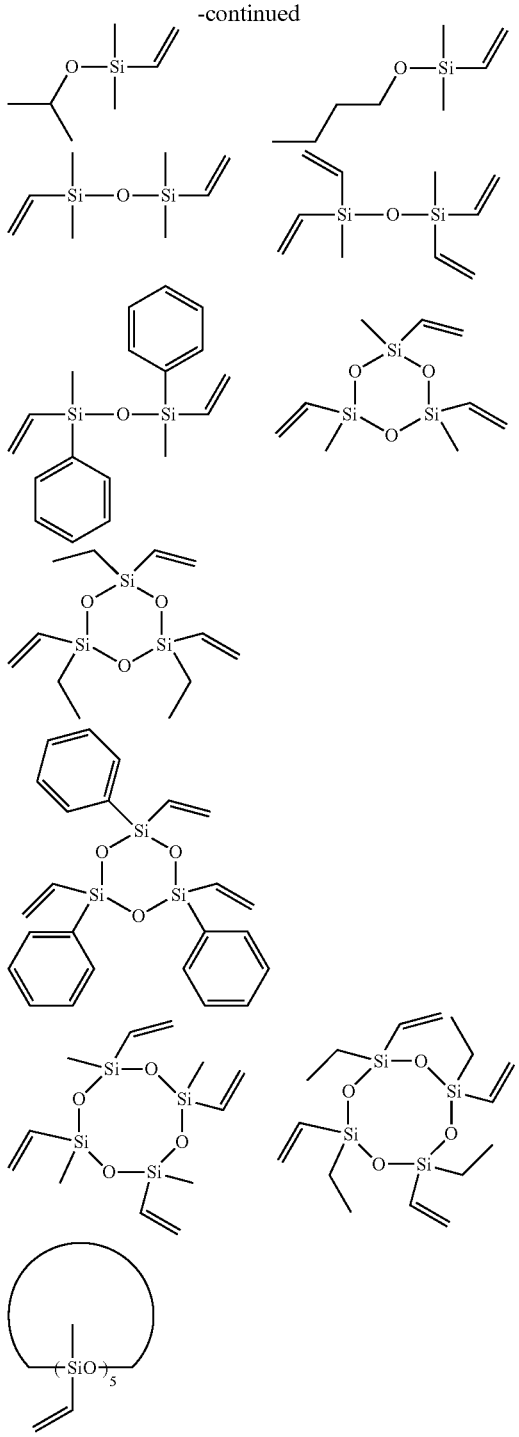

A total content of compounds represented by Formula (A2) or (B2) is usually not less than 0.001% by mass, preferably not less than 0.01% by mass, more preferably not less than 0.1% by mass, still more preferably not less than 0.2% by mass, but usually 10% by mass or less, preferably 8% by mass or less, more preferably 6.0% by mass or less, still more preferably 4.0% by mass or less, especially preferably 3.0% by mass or less, particularly preferably 2.5% by mass or less, most preferably 2.0% by mass or less, with respect to a total amount of the non-aqueous electrolyte solution of the present invention.

When the total content of the compounds represented by Formula (A2) or (B2) with respect to a total amount of the non-aqueous electrolyte solution is in the above-described range, concentration of the compounds into active materials progresses in a preferred manner, so that a battery with reduced gas generation during initial conditioning can be produced.

In the non-aqueous electrolyte solution, the compounds represented by Formula (A2) or (B2) are identified and the content thereof is measured by nuclear magnetic resonance (NMR) spectroscopy.

<1-B2. Compound Having Si—N Structure>
<1-B2-1. Compound Represented by Formula (Z)>

(Z)

(wherein, in Formula (Z), $R^{19}$ to $R^{21}$ each independently represents a hydrogen atom, a halogen atom, an optionally substituted hydrocarbon group having 1 to 12 carbon atoms, or an optionally substituted alkoxy group having 1 to 12 carbon atoms; $R^{22}$ and $R^{23}$ each independently represents a hydrogen atom, a halogen atom, an optionally substituted hydrocarbon group having 1 to 12 carbon atoms, an optionally substituted alkoxy group having 1 to 12 carbon atoms, or a silyl group represented by —$SiR^{x}R^{y}R^{z}$; $R^{x}$ to $R^{z}$ each independently represents a hydrogen atom, a halogen atom, an optionally substituted hydrocarbon group having 1 to 12 carbon atoms, or an optionally substituted alkoxy group having 1 to 12 carbon atoms; and $R^{22}$ and $R^{23}$ are optionally bound with each other to form a ring)

$R^{19}$ to $R^{21}$ according to Formula (Z) each independently represents a hydrogen atom, a halogen atom, an optionally substituted hydrocarbon group having 1 to 12 carbon atoms, or an optionally substituted alkoxy group having 1 to 12 carbon atoms. Particularly, $R^{19}$ to $R^{21}$ are each preferably an optionally substituted hydrocarbon group having 1 to 12 carbon atoms, or an optionally substituted alkoxy group having 1 to 12 carbon atoms, especially preferably an optionally substituted hydrocarbon group having 1 to 12 carbon atoms.

Further, at least one of $R^{19}$ to $R^{21}$ is preferably an alkyl group having 1 to 12 carbon atoms since this allows the compound of Formula (Z) to adsorb to the electrode surface in a preferred manner.

$R^{19}$ to $R^{21}$ according to Formula (Z) are optionally the same or different from each other; however, it is preferred that at least two of $R^{19}$ to $R^{21}$ be the same from the standpoint of the ease of synthesizing the compound, and it is more preferred that all three of $R^{19}$ to $R^{21}$ be the same from the aforementioned standpoint. Examples of the halogen atom include a fluorine atom, a chlorine atom, and a bromine atom. The halogen atom is preferably a fluorine atom since it hardly causes an electrochemical side reaction.

The hydrocarbon group having 1 to 12 carbon atoms is preferably a hydrocarbon group having 1 to 6 carbon atoms, particularly preferably a hydrocarbon group having 1 to 4 carbon atoms.

The hydrocarbon group is specifically, for example, an alkyl group, an alkenyl group, an alkynyl group, an aralkyl group, or an aryl group. Particularly, the hydrocarbon group is preferably an alkyl group, an alkenyl group, or an alkynyl group, especially preferably an alkyl group or an alkenyl group.

Specific examples of the alkyl group include a methyl group, an ethyl group, an n-propyl group, an iso-propyl group, an n-butyl group, a tert-butyl group, an n-pentyl group, a hexyl group, a heptyl group, an octyl group, a nonyl group, and a decyl group. Thereamong, the alkyl group is, for example, preferably a methyl group, an ethyl group, an n-propyl group, an n-butyl group, a tert-butyl group, an n-pentyl group, or a hexyl group, more preferably a methyl group, an ethyl group, an n-propyl group, an n-butyl group, a tert-butyl group, or an n-pentyl group, particularly preferably a methyl group, an ethyl group, an n-butyl group, or a tert-butyl group. When the hydrocarbon group is any of the above-exemplified alkyl groups, the compound represented by Formula (Z) tends to be localized in the vicinity of the surface of a positive electrode active material and/or the surface of a negative electrode active material, which is preferred.

Specific examples of the alkenyl group include a vinyl group, an allyl group, a methallyl group, a 2-butenyl group, a 3-methyl-2-butenyl group, a 3-butenyl group, and a 4-pentenyl group. Thereamong, the alkenyl group is, for example, preferably a vinyl group, an allyl group, a methallyl group, or a 2-butenyl group, more preferably a vinyl group, an allyl group, or a methallyl group, particularly preferably a vinyl group. When the hydrocarbon group is any of the above-exemplified alkenyl groups, the compound represented by Formula (Z) tends to be localized in the vicinity of the surface of a positive electrode active material and/or the surface of a negative electrode active material, which is preferred.

Specific examples of the alkynyl group include an ethynyl group, a 2-propynyl group, a 2-butynyl group, a 3-butynyl group, a 4-pentynyl group, and 5-hexynyl group. Thereamong, the alkynyl group is, for example, preferably an ethynyl group, a 2-propynyl group, a 2-butynyl group, or a 3-butynyl group, more preferably a 2-propynyl group or a 3-butynyl group, particularly preferably a 2-propynyl group. The compound represented by Formula (Z) tends to be localized in the vicinity of the surface of a positive electrode active material and/or the surface of a negative electrode active material, which is preferred.

Specific examples of the aryl group include a phenyl group and a tolyl group. Thereamong, a phenyl group is preferred since it makes the compound represented by Formula (Z) tend to be localized in the vicinity of the surface of a positive electrode active material and/or the surface of a negative electrode active material.

Specific examples of the aralkyl group include a benzyl group and a phenethyl group.

The alkoxy group having 1 to 12 carbon atoms is preferably an alkoxy group having 1 to 6 carbon atoms, more preferably an alkoxy group having 1 to 4 carbon atoms, still more preferably an alkoxy group having 1 to 2 carbon atoms.

Specific examples of the alkoxy group having 1 to 12 carbon atoms include a methoxy group, an ethoxy group, a propoxy group, a butoxy group, and an isopropoxy group. Thereamong, a methoxy group and an ethoxy group are preferred since these groups allow the compound represented by Formula (Z) to have a small steric hindrance and be concentrated on the active material surface in a preferred manner.

Examples of the above-described substituent include a cyano group, an isocyanate group, an acyl group (—(C=O)—$R^u$), an acyloxy group (—O(C=O)—$R^u$), an alkoxycarbonyl group (—(C=O)O—$R^u$), a sulfonyl group (—$SO_2$—$R^u$), a sulfonyloxy group (—O($SO_2$)—$R^u$), an alkoxysulfonyl group (—($SO_2$)—O—$R^u$), an alkoxysulfonyloxy group (—O—($SO_2$)—O—$R^u$), an alkoxycarbonyloxy group (—O—(C=O)—O—$R^u$), an ether group (—O—$R^u$), an acryl group, a methacryl group, a halogen atom (preferably a fluorine atom), and a trifluoromethyl group. $R^u$ represents an alkyl group having 1 to 10 carbon atoms, an alkylene group having 1 to 10 carbon atoms, an alkoxy group having 1 to 10 carbon atoms, an alkenyl group having 2 to 10 carbon atoms, or an alkynyl group having 2 to 10 carbon atoms. When $R^u$ is an alkylene group, it may be bound with a portion of the hydrocarbon group being substituted to form a ring.

$R^{22}$ and $R^{23}$ according to Formula (Z) each represent a hydrogen atom, an optionally substituted hydrocarbon group having 1 to 12 carbon atoms, or a silyl group represented by —$SiR^xR^yR^z$. Particularly, $R^{22}$ and $R^{23}$ are each preferably an optionally substituted hydrocarbon group having 1 to 12 carbon atoms, or a silyl group represented by —$SiR^xR^yR^z$.

Further, at least one of $R^{22}$ or $R^{23}$ is preferably a silyl group represented by —$SiR^xR^yR^z$ since this reduces the polarity of the compound represented by Formula (Z).

It is noted here that the optionally substituted hydrocarbon group having 1 to 12 carbon atoms has the same meaning as the one defined above for $R^{19}$ to $R^{21}$.

In the silyl group represented by —$SiR^xR^yR^z$, $R^x$ to $R^z$ each independently represents a hydrogen atom, a halogen atom, an optionally substituted hydrocarbon group having 1 to 12 carbon atoms, or an optionally substituted alkoxy group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for $R^{19}$ to $R^{21}$.

Specific examples of the compound represented by Formula (Z) which has an Si—N structure include compounds having the following structures.

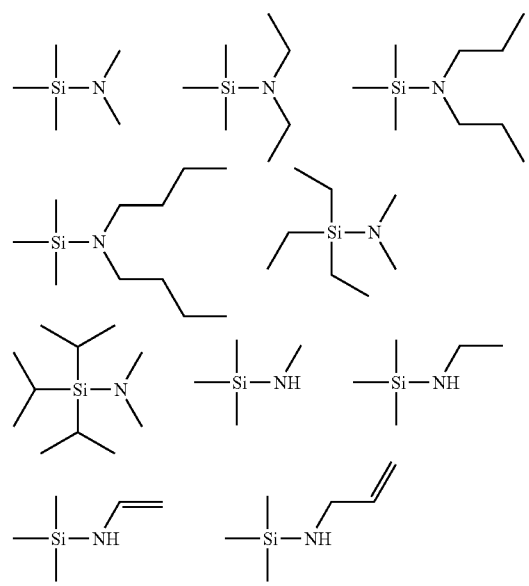

-continued

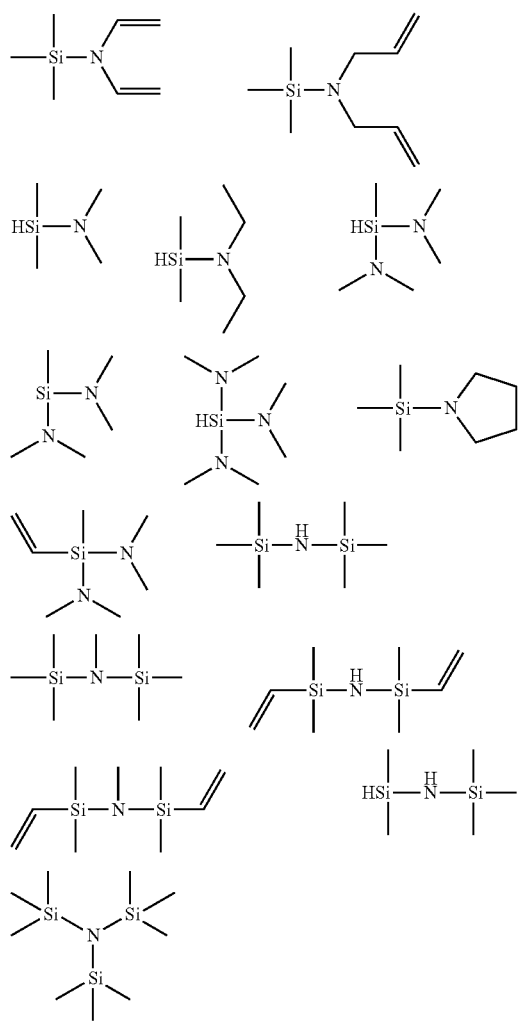

Preferred examples of the compound represented by Formula (Z) include the following compounds.

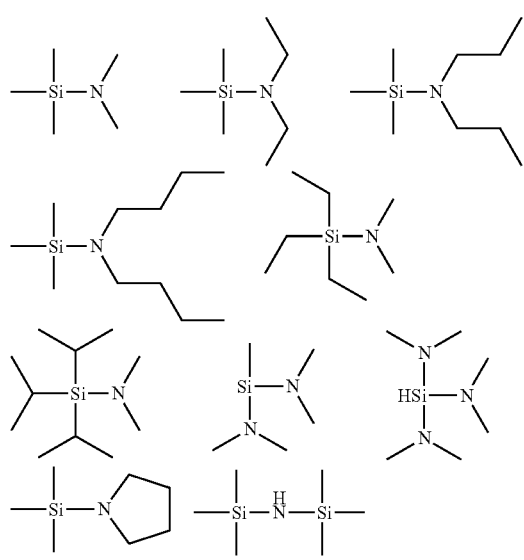

-continued

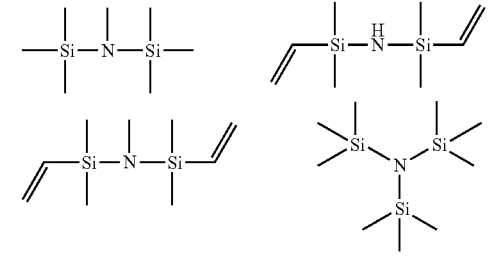

More preferred examples of the compound represented by Formula (Z) include the following compounds.

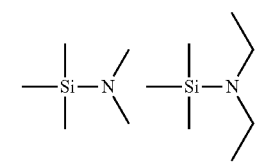

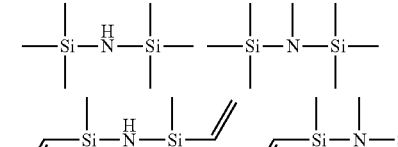

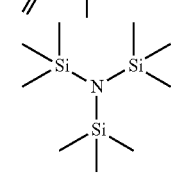

Particularly preferred examples of the compound represented by Formula (Z) include the following compounds.

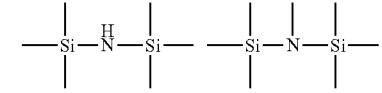

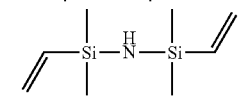

<1-B2-2. Compound Represented by Formula (Y)>

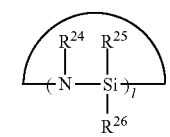

(Y)

(wherein, in Formula (Y), $R^{24}$ represents a hydrogen atom, an optionally substituted hydrocarbon group having 1 to 12 carbon atoms, or a silyl group represented by —SiR$^a$R$^b$R$^c$, wherein R$^a$ to RC each independently represents a hydrogen atom, a halogen atom, an optionally substituted hydrocarbon group having 1 to 12 carbon atoms, or an optionally substituted alkoxy group having 1 to 12 carbon atoms; $R^{25}$ and $R^{26}$ each independently represents a hydrogen atom, a halogen atom, an optionally substituted hydrocarbon group having 1 to 12 carbon atoms, or an optionally substituted alkoxy group having 1 to 12 carbon atoms; 1 represents an integer of 3 to 6; plural $R^{25}$s in Formula (Y) are the same or different from each other; and plural $R^{26}$s in Formula (Y) are the same or different from each other)

$R^{24}$ represents a hydrogen atom, an optionally substituted hydrocarbon group having 1 to 12 carbon atoms, or a silyl group represented by —SiR$^a$R$^b$R$^c$.

It is noted here that the optionally substituted hydrocarbon group having 1 to 12 carbon atoms has the same meaning as the one defined above for $R^{22}$ and $R^{23}$.

The silyl group represented by —SiR$^a$R$^b$R$^c$ has the same meaning as the above-described silyl group represented by —SiR$^x$R$^y$R$^z$.

$R^{25}$ and $R^{26}$ each independently represents a hydrogen atom, a halogen atom, an optionally substituted hydrocarbon group having 1 to 12 carbon atoms, or an optionally substituted alkoxy group having 1 to 12 carbon atoms.

It is noted here that the halogen atom, the optionally substituted hydrocarbon group having 1 to 12 carbon atoms, and the optionally substituted alkoxy group having 1 to 12 carbon atoms all have the same meanings as those defined above for $R^{19}$ to $R^{21}$.

Further, plural $R^{25}$s ($R^{25}$s existing in repeating units) are optionally the same or different from each other, and plural $R^{26}$s ($R^{26}$s existing in repeating units) are also optionally the same or different from each other. In other words, 3 to 6 $R^{25}$s existing in one molecule are optionally the same or different from each other, and 3 to 6 $R^{26}$s existing in one molecule are optionally the same or different from each other.

$R^{25}$ and $R^{26}$ according to Formula (Y) are optionally the same or different from each other; however, they are preferably the same from the standpoint of the ease of synthesizing the compound.

Further, 1 is usually an integer of 3 to 6, preferably 3 or 4.

Specific examples of the compound represented by Formula (Y) which has an Si—N structure include compounds having the following structures.

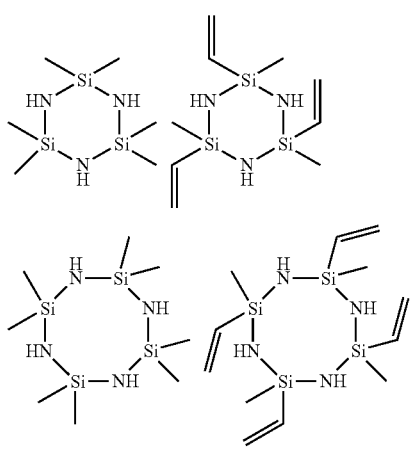

Preferred examples include the following compounds.

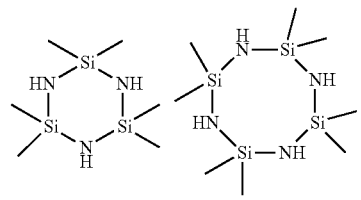

More preferred examples include the following compounds.

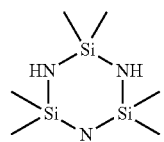

A total content of Si—N structure-containing compounds represented by Formula (Z) or (Y) with respect to a total amount of the non-aqueous electrolyte solution of the present invention is not particularly restricted; however, it is preferably not less than 0.01 ppm by mass, more preferably not less than 0.1 ppm by mass, still more preferably not less than 1.0 ppm by mass, particularly preferably not less than 10 ppm by mass, but preferably less than 0.5% by mass, more preferably 0.4% by mass or less, still more preferably 0.3% by mass or less, especially preferably 0.2% by mass or less, particularly preferably 0.1% by mass or less.

When the total content of the Si—N structure-containing compounds represented by Formula (Z) or (Y) with respect to a total amount of the non-aqueous electrolyte solution is in the above-described range, concentration of the compounds into active materials progresses in a preferred manner, so that a battery with reduced gas generation during initial conditioning can be produced.

In the non-aqueous electrolyte solution, the compounds represented by Formula (Z) or (Y) are identified and the content thereof is measured by nuclear magnetic resonance (NMR) spectroscopy.

In the non-aqueous electrolyte solution, a mass ratio of the content of the compound represented by Formula (A2) or (B2) with respect to the content of the Si—N structure-containing compounds represented by Formula (Z) or (Y) is not particularly restricted; however, it is usually 1.0 or higher, preferably 2.0 or higher, more preferably 3.0 or higher, but usually 10,000 or lower, preferably 7,000 or lower, more preferably 4,000 or lower, still more preferably 2,000 or lower, especially preferably 1,000 or lower, particularly preferably 500 or lower. When the non-aqueous electrolyte solution contains both the compound represented by Formula (A2) and the compound represented by Formula (B2), the above-described ratio indicates a ratio of a total content of the compound represented by Formula (A2) and the compound represented by Formula (B2) with respect to the content of the Si—N structure-containing compound represented by Formula (Z) or (Y). When the non-aqueous electrolyte solution contains both the compound represented by Formula (Z) and the compound represented by Formula (Y), the above-described ratio indicates a ratio of a total content of the compound represented by Formula (A2) and the compound represented by Formula (B2) with respect to a total content of the Si—N structure-containing compound represented by Formula (Z) and the Si—N structure-containing compound represented by Formula (Y).

A method of incorporating the Si—N structure-containing compound represented by Formula (Z) or (Y) and the Si—O structure-containing compound represented by Formula (A2) or (B2) into the electrolyte solution of the present invention is not particularly restricted. Examples thereof include a method of directly adding the respective compounds to the electrolyte solution, and a method of generating the respective compounds in a battery or the electrolyte solution.

In the present specification, "content" of a compound means the content measured at any one of time points when a non-aqueous electrolyte solution is produced, when the non-aqueous electrolyte solution is injected into a battery, and when the battery is shipped out as a product.

[Invention C]

The non-aqueous electrolyte solution according to the present invention C is a non-aqueous electrolyte solution for a non-aqueous electrolyte battery including a positive electrode and a negative electrode which are capable of occluding and releasing metal ions. This non-aqueous electrolyte solution is characterized by containing: an alkali metal salt; a non-aqueous solvent; at least one Si—O structure-containing compound represented by Formula (A2) or (B2); and at least one compound selected from the group consisting of a compound represented by Formula (α), a compound represented by Formula (Z), and a compound represented by Formula (Y).

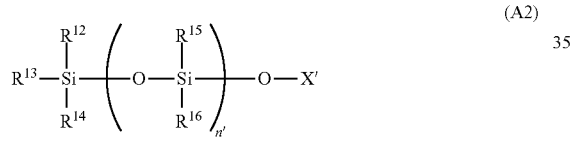
(A2)

(wherein, in Formula (A2), $R^{12}$ to $R^{16}$ each independently represents a hydrogen atom, a halogen atom, an optionally substituted hydrocarbon group having 1 to 12 carbon atoms, or an optionally substituted alkoxy group having 1 to 12 carbon atoms; X' represents an optionally substituted hydrocarbon group having 1 to 12 carbon atoms, or a silyl group represented by —SiR$^{o2}$R$^{p2}$R$^{q2}$, wherein R$^{o2}$ to R$^{q2}$ each independently represents a hydrogen atom, a halogen atom, an optionally substituted hydrocarbon group having 1 to 12 carbon atoms, or an optionally substituted alkoxy group having 1 to 12 carbon atoms; n' represents an integer of 0 to 5; at least one of $R^{12}$ to $R^{14}$ represents a hydrocarbon group having 2 to 12 carbon atoms and an unsaturated carbon-carbon bond; and when n' is 2 or larger, plural $R^{15}$s in Formula (A2) are the same or different from each other, and plural $R^{16}$s in Formula (A2) are the same or different from each other)

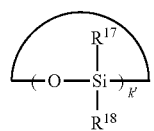
(B2)

(wherein, in Formula (B2), $R^{17}$ and $R^{18}$ each independently represents a hydrogen atom, a halogen atom, an optionally substituted hydrocarbon group having 1 to 12 carbon atoms, or an optionally substituted alkoxy group having 1 to 12 carbon atoms; k' represents an integer of 3 to 6; at least one of $R^{17}$ or $R^{18}$ represents a hydrocarbon group having 2 to 12 carbon atoms and an unsaturated carbon-carbon bond; plural $R^{17}$s in Formula (B2) are the same or different from each other; and plural $R^{18}$s in Formula (B2) are the same or different from each other)

(α)

(wherein, in Formula (α), $R^{89}$ represents a hydrogen atom or a silyl group represented by —SiR$^8$R$^9$R$^{10}$, wherein $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms; $R^{11}$ represents a hydrogen atom, an optionally substituted hydrocarbon group having 1 to 12 carbon atoms, or a silyl group represented by —SiR$^d$R$^e$R$^f$, wherein R$^d$ to R$^f$ each independently represents a hydrogen atom, a halogen atom, an optionally substituted hydrocarbon group having 1 to 12 carbon atoms, or an optionally substituted alkoxy group having 1 to 12 carbon atoms; Y represents a hydrogen atom, a halogen atom, an optionally substituted hydrocarbon group having 1 to 12 carbon atoms, an optionally substituted alkoxy group having 1 to 12 carbon atoms, a group represented by —NR$^g$—SiR$^h$R$^i$R$^j$, or a group represented by —NR$^g$—H, wherein R$^g$ represents a hydrogen atom or an optionally substituted hydrocarbon group having 1 to 12 carbon atoms, and R$^h$ to R$^j$ each independently represents a hydrogen atom, a halogen atom, an optionally substituted hydrocarbon group having 1 to 12 carbon atoms, or an optionally substituted alkoxy group having 1 to 12 carbon atoms; and $R^{11}$ and R$^g$ are optionally bound with each other to form a ring)

(Z)

(wherein, in Formula (Z), $R^{19}$ to $R^{21}$ each independently represents a hydrogen atom, a halogen atom, an optionally substituted hydrocarbon group having 1 to 12 carbon atoms, or an optionally substituted alkoxy group having 1 to 12 carbon atoms; $R^{22}$ and $R^{23}$ each independently represents a hydrogen atom, an optionally substituted hydrocarbon group having 1 to 12 carbon atoms, or a silyl group represented by —SiR$^x$R$^y$R$^z$; R$^x$ to R$^z$ each independently represents a hydrogen atom, a halogen atom, an optionally substituted hydrocarbon group having 1 to 12 carbon atoms, or an optionally substituted alkoxy group having 1 to 12 carbon atoms; and $R^{22}$ and $R^{23}$ are optionally bound with each other to form a ring)

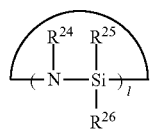

(Y)

(wherein, in Formula (Y), $R^{24}$ represents a hydrogen atom, an optionally substituted hydrocarbon group having 1 to 12 carbon atoms, or a silyl group represented by —$SiR^aR^bR^c$ wherein $R^a$ to $R^c$ each independently represents a hydrogen atom, a halogen atom, an optionally substituted hydrocarbon group having 1 to 12 carbon atoms, or an optionally substituted alkoxy group having 1 to 12 carbon atoms; $R^{25}$ and $R^{26}$ each independently represents a hydrogen atom, a halogen atom, an optionally substituted hydrocarbon group having 1 to 12 carbon atoms, or an optionally substituted alkoxy group having 1 to 12 carbon atoms; 1 represents an integer of 3 to 6; plural $R^{25}$s in Formula (Y) are the same or different from each other; and plural $R^{25}$s in Formula (Y) are the same or different from each other).

With regard to the Si—O structure-containing compound represented by Formula (A2) or (B2), the descriptions of the above section <1-B1. Compound Having Si—O Structure> are applied.

With regard to the compound represented by Formula (α), the descriptions of the above section <1-A2. Compound Represented by Formula (α)> are applied.

With regard to the compound represented by Formula (Z), the descriptions of the above section <1-B2-1. Compound Represented by Formula (Z)> are applied.

With regard to the compound represented by Formula (Y), the descriptions of the above section <1-B2-2. Compound Represented by Formula (Y)> are applied.

<1-3. Electrolyte>

Similarly to a general non-aqueous electrolyte solution, the non-aqueous electrolyte solutions of the present inventions A to C usually each contain an electrolyte as a component. The electrolyte used in the non-aqueous electrolyte solution of the present embodiment is not particularly restricted, and any known electrolyte can be used. Specific examples of the electrolyte will now be described in detail.

<1-3-1. Alkali Metal Salt>

As the electrolyte in the non-aqueous electrolyte solution of the present embodiment, an alkali metal salt such as a lithium salt is usually used. The lithium salt is not particularly restricted as long as it is known to be used in this application, and any one or more lithium salts can be used. Specific examples of the lithium salt include:

inorganic lithium salts, such as $LiBF_4$, $LiClO_4$, $LiAlF_4$, $LiSbF_5$, $LiTaF_5$, and $LiWF_7$;
lithium fluorophosphates, such as $LiPF_6$;
lithium tungstates, such as $LiWOF_5$;
lithium carboxylates, such as $CF_3Co_2Li$;
lithium sulfonates, such as $CH_3SO_3Li$;
lithium imide salts, such as $LiN(FSO_2)_2$ and $LiN(CF_3SO_2)_2$;
lithium methide salts, such as $LiC(FSO_2)_3$; and
fluorine-containing organic lithium salts, such as $LiPF_4(CF_3)_2$.

From the standpoint of further enhancing the effects of improving the charge-discharge rate characteristics and the impedance characteristics in addition to improving the charged storage characteristics under a high-temperature environment that is attained in the present invention, the lithium salt is preferably one selected from inorganic lithium salts, lithium fluorophosphates, lithium sulfonates, lithium imide salts, and lithium oxalate salts. From the standpoint of improving the charge-discharge characteristics, the lithium salt is more preferably a lithium fluorophosphate, an inorganic lithium salt, or a lithium imide salt, still more preferably a lithium fluorophosphate or a lithium imide salt, especially preferably $LiPF_6$ or $LiN(FSO_2)_2$, particularly preferably $LiPF_6$.

A total concentration of these electrolytes in the non-aqueous electrolyte solution is not particularly restricted; however, it is usually 8% by mass or higher, preferably 8.5% by mass or higher, more preferably 9% by mass or higher, with respect to a total amount of the non-aqueous electrolyte solution. An upper limit of the total concentration is usually 18% by mass or lower, preferably 17% by mass or lower, more preferably 16% by mass or lower. When the total concentration of the electrolytes is in this range, the non-aqueous electrolyte solution has an electrical conductivity appropriate for battery operation, so that sufficient output characteristics tend to be obtained.

In the non-aqueous electrolyte solution, a mass ratio of the Si—O structure-containing compound represented by Formula (A) or (B) with respect to the above-described lithium salt is not particularly restricted as long as the effects of the present invention are not markedly impaired; however, it is preferably 0.0001 or higher, more preferably 0.001 or higher, particularly preferably 0.01 or higher. An upper limit value of the mass ratio is preferably 0.5 or lower, more preferably 0.25 or lower, particularly preferably 0.1 or lower. When the mass ratio of these compounds is in this preferred range, the Si—O structure-containing compound represented by Formula (A) or (B) adsorbs to electrode active materials in a favorable manner, which is preferred.

In the non-aqueous electrolyte solution, a mass ratio of the compound represented by Formula (α) with respect to the above-described lithium salt is not particularly restricted as long as the effects of the present invention are not markedly impaired; however, it is preferably 0.0001 or higher, more preferably 0.001 or higher, particularly preferably 0.01 or higher. An upper limit value of the mass ratio is preferably 0.5 or lower, more preferably 0.25 or lower, particularly preferably 0.1 or lower. When the mass ratio of these compounds is in this preferred range, the compound represented by Formula (α) adsorbs to electrode active materials in a favorable manner, which is preferred.

In the non-aqueous electrolyte solution, a mass ratio of the Si—O structure-containing compound represented by Formula (A2) or (B2) with respect to the above-described lithium salt is not particularly restricted as long as the effects of the present invention are not markedly impaired; however, it is preferably 0.0001 or higher, more preferably 0.001 or higher, particularly preferably 0.01 or higher. An upper limit value of the mass ratio is preferably 0.5 or lower, more preferably 0.25 or lower, particularly preferably 0.1 or lower. When the mass ratio of these compounds is in this preferred range, the Si—O structure-containing compound represented by Formula (A2) or (B2) adsorbs to electrode active materials in a favorable manner, which is preferred.

In the non-aqueous electrolyte solution, a mass ratio of the Si—N structure-containing compound represented by Formula (Z) or (Y) with respect to the above-described lithium salt is not particularly restricted as long as the effects of the present invention are not markedly impaired; however, it is preferably 0.0001 or higher, more preferably 0.001 or higher, particularly preferably 0.01 or higher. An upper limit value of the mass ratio is preferably 0.5 or lower, more preferably 0.25 or lower, particularly preferably 0.1 or lower. When the mass ratio of these compounds is in this preferred range, the Si—N structure-containing compound represented by Formula (Z) or (Y) adsorbs to electrode active materials in a favorable manner, which is preferred.

<1-4. Non-Aqueous Solvent>

Similarly to a general non-aqueous electrolyte solution, the non-aqueous electrolyte solution of the present embodiment usually contains, as its main component, a non-aqueous solvent that dissolves the above-described electrolytes. The non-aqueous solvent is not particularly restricted, and any known organic solvent can be used. Examples of the organic solvent include: saturated cyclic carbonates, such as ethylene carbonate, propylene carbonate, and butylene carbonate; linear carbonates, such as dimethyl carbonate, diethyl carbonate, and ethyl methyl carbonate; carboxylic acid esters, such as methyl acetate, ethyl acetate, propyl acetate, and butyl acetate; ether-based compounds, such as dimethoxymethane, diethoxymethane, ethoxymethoxymethane, tetrahydrofuran, 1,3-dioxane, and 1,4-dioxane; and sulfone-based compounds, such as 2-methylsulfolane, 3-methylsulfolane, 2-fluorosulfolane, 3-fluorosulfolane, dimethyl sulfone, ethyl methyl sulfone, and monofluoromethyl methyl sulfone. The organic solvent is preferably a saturated cyclic carbonate, a linear carbonate, or a carboxylic acid ester, more preferably a saturated cyclic carbonate or a linear carbonate. These non-aqueous solvents may be used singly, or in combination of two or more thereof. As a combination of two or more non-aqueous solvents, a combination of two or more selected from the group consisting of saturated cyclic carbonates, linear carbonates, and carboxylic acid esters is preferred, and a combination of a saturated cyclic carbonate and a linear carbonate is more preferred.

<1-5. Auxiliary Agent>

The non-aqueous electrolyte solution of the present embodiment may also contain an auxiliary agent within a range that the effects of the present invention are exerted.

Examples of the auxiliary agent include:

fluorinated salts, such as difluorophosphates, fluorosulfonates, fluoroboron salts, and fluoroimide salts;

unsaturated cyclic carbonates, such as vinylene carbonate, vinylethylene carbonate, and ethynylethylene carbonate;

fluorinated cyclic carbonates, such as monofluoroethylene carbonate, 4,4-difluoroethylene carbonate, 4,5-difluoroethylene carbonate, and 4,5-difluoro-4,5-dimethylethylene carbonate;

oxalate salts, such as lithium bis(oxalato)borate, lithium tetrafluoro(oxalato)phosphate, lithium difluoro-bis(oxalato)phosphate, and lithium tris(oxalato)phosphate;

carbonate compounds, such as methoxyethyl methyl carbonate;

spiro compounds, such as methyl-2-propynyl oxalate;

sulfur-containing compounds, such as ethylene sulfite;

isocyanate compounds, for example, cycloalkylene group-containing diisocyanates such as 1,3-bis(isocyanatomethyl)cyclohexane, trimeric compounds derived from a compound having at least two isocyanate groups in the molecule, such as triallyl isocyanurate, and aliphatic polyisocyanates obtained by adding a polyhydric alcohol to the trimeric compounds;

nitrogen-containing compounds, such as 1-methyl-2-pyrrolidinone;

hydrocarbon compounds, such as cycloheptane;

fluorine-containing aromatic compounds, such as fluorobenzene;

fluorosilane compounds, such as fluorotrimethylsilane, fluorodimethylvinylsilane, difluorodimethylsilane, and difluorovinylmethylsilane;

ester compounds, such as 2-propynyl 2-(methanesulfonyloxy)propionate; and lithium salts, such as lithium ethylmethyloxycarbonyl phosphonate.

These auxiliary agents may be used singly, or in combination of two or more thereof. By adding these auxiliary agents, not only gas generation during initial conditioning can be inhibited, but also the initial resistance can be reduced and the battery characteristics can be improved comprehensively.

Particularly, the non-aqueous electrolyte solution according to one embodiment of the present invention preferably contains at least one selected from a fluorinated salt, a fluorosilane compound, an unsaturated cyclic carbonate, a fluorine atom-containing cyclic carbonate, and an oxalate salt, since this further inhibits gas generation during initial conditioning, so that not only a battery unlikely to be swollen can be obtained but also the battery is provided with a low initial resistance. The non-aqueous electrolyte solution more preferably contains at least an unsaturated cyclic carbonate or a fluorine atom-containing cyclic carbonate, still more preferably an unsaturated cyclic carbonate and a fluorine atom-containing cyclic carbonate.

From the standpoint of further inhibiting gas generation during initial conditioning to not only obtain a battery unlikely to be swollen but also provide the battery with a low initial resistance, it is also preferred that the non-aqueous electrolyte solution contain at least an unsaturated cyclic carbonate or a fluorine atom-containing cyclic carbonate along with at least one selected from a fluorinated salt, a fluorosilane compound and an oxalate salt, and it is more preferred that the non-aqueous electrolyte solution contain an unsaturated cyclic carbonate and a fluorine atom-containing cyclic carbonate along with at least one selected from a fluorinated salt, a fluorosilane compound, and an oxalate salt.

The above-described "fluorinated salt", "fluorosilane compound", "unsaturated cyclic carbonate", "fluorinated cyclic carbonate", and "oxalate salt" will now be described in detail.

(Fluorinated Salt)

The non-aqueous electrolyte solution according to the present embodiment may contain a fluorinated salt. The fluorinated salt is not particularly restricted; however, a difluorophosphate, a fluorosulfonate, a fluoroboron salt, and a fluoroimide salt are preferred since these fluorinated salts contain a highly dissociable fluorine atom in their structures and thus capable of reacting with a decomposition product of the compound represented by Formula (A), (B), (a), (Y), or (Z) in a preferred manner to form a composite coating film and thereby reduce the initial battery resistance. A fluoroboron salt, a fluorosulfonate, and a difluorophosphate are more preferred, and a fluorosulfonate and a difluorophosphate are particularly preferred, since their fluorine atoms are particularly highly dissociable and their reactions with a nucleophile proceed in a preferred manner. A fluorosulfonate is most preferred because of its highly dissociable fluorine atom. Further, the fluorinated salt is preferably a fluorinated lithium salt.

Any of the above-described fluorinated salts may be used singly, or two or more thereof may be used in any combination at any ratio. The content of the fluorinated salt(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually less than 8% by mass, preferably 5% by mass or less, more preferably 3% by mass or less, still more preferably 2% by mass or less, most preferably 1% by mass or less.

These salts will now be described.

<Difluorophosphate>

A counter cation of the difluorophosphate is not particularly restricted, and examples thereof include lithium, sodium, potassium, rubidium, cesium, magnesium, calcium, barium, and ammonium represented by $NR^{27}R^{28}R^{29}R^{30}$ (wherein, $R^{27}$ to $R^{30}$ each independently represents a hydrogen atom or an organic group having 1 to 12 carbon atoms). Thereamong, lithium is preferred.

The organic group having 1 to 12 carbon atoms that is represented by $R^{27}$ to $R^{30}$ of the above-described ammonium is not particularly restricted, and examples thereof include alkyl groups optionally substituted with a halogen atom, cycloalkyl groups optionally substituted with a halogen atom or an alkyl group, aryl groups optionally substituted with a halogen atom or an alkyl group, and nitrogen atom-containing heterocyclic groups optionally having a substituent. Thereamong, $R^{27}$ to $R^{30}$ are preferably each independently a hydrogen atom, an alkyl group, a cycloalkyl group, or a nitrogen atom-containing heterocyclic group.

Specific examples of the difluorophosphate include lithium difluorophosphate, sodium difluorophosphate, and potassium difluorophosphate, among which lithium difluorophosphate is preferred.

Any of these difluorophosphates may be used singly, or two or more thereof may be used in any combination at any ratio. The content of the difluorophosphate(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually less than 8% by mass, preferably 5% by mass or less, more preferably 3% by mass or less, still more preferably 2% by mass or less, most preferably 1% by mass or less.

When the content of the difluorophosphate(s) is in this range, a non-aqueous electrolyte secondary battery is likely to exhibit a sufficient cycle characteristics-improving effect, and a situation where the high-temperature storage characteristics are deteriorated and the amount of gas generation is thereby increased and the discharge capacity retention rate is reduced is likely to be avoided.

<Fluorosulfonate>

A counter cation of the above-described fluorosulfonate is not particularly restricted, and examples thereof include lithium, sodium, potassium, rubidium, cesium, magnesium, calcium, barium, and ammonium represented by $NR^{17}R^{18}R^{19}R^{20}$ (wherein, $R^{17}$ to $R^{20}$ each independently represents a hydrogen atom or an organic group having 1 to 12 carbon atoms). Thereamong, lithium is preferred.

The organic group having 1 to 12 carbon atoms that is represented by $R^{17}$ to $R^{20}$ of the above-described ammonium is not particularly restricted, and examples thereof include alkyl groups optionally substituted with a halogen atom, cycloalkyl groups optionally substituted with a halogen atom or an alkyl group, aryl groups optionally substituted with a halogen atom or an alkyl group, and nitrogen atom-containing heterocyclic groups optionally having a substituent. Thereamong, $R^{17}$ to $R^{20}$ are preferably each independently a hydrogen atom, an alkyl group, a cycloalkyl group, or a nitrogen atom-containing heterocyclic group.

Specific examples of the fluorosulfonate include lithium fluorosulfonate, sodium fluorosulfonate, potassium fluorosulfonate, rubidium fluorosulfonate, and cesium fluorosulfonate, among which lithium fluorosulfonate is preferred.

Any of these fluorosulfonates may be used singly, or two or more thereof may be used in any combination at any ratio. The content of the fluorosulfonate(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually less than 8% by mass, preferably 5% by mass or less, more preferably 3% by mass or less, still more preferably 2% by mass or less, most preferably 1% by mass or less.

When the content of the fluorosulfonate(s) is in this range, a non-aqueous electrolyte secondary battery is likely to exhibit a sufficient cycle characteristics-improving effect, and a situation where the high-temperature storage characteristics are deteriorated and the amount of gas generation is thereby increased and the discharge capacity retention rate is reduced is likely to be avoided.

<Fluoroboron Salt>

A counter cation of the above-described fluoroboron salt is not particularly restricted, and examples thereof include lithium, sodium, potassium, rubidium, cesium, magnesium, calcium, barium, and ammonium represented by $NR^{21}R^{22}R^{23}R^{24}$ (wherein, $R^{21}$ to $R^{24}$ each independently represents a hydrogen atom or an organic group having 1 to 12 carbon atoms). Thereamong, lithium is preferred.

The organic group having 1 to 12 carbon atoms that is represented by $R^{21}$ to $R^{24}$ of the above-described ammonium is not particularly restricted, and examples thereof include alkyl groups optionally substituted with a halogen atom, cycloalkyl groups optionally substituted with a halogen atom or an alkyl group, aryl groups optionally substituted with a halogen atom or an alkyl group, and nitrogen atom-containing heterocyclic groups optionally having a substituent. Thereamong, $R^{21}$ to $R^{24}$ are preferably each independently a hydrogen atom, an alkyl group, a cycloalkyl group, or a nitrogen atom-containing heterocyclic group.

Specific examples of the fluoroboron salt include $LiBF_4$ and $LiB(C_iF_{2i+1})_j(F)_{4-j}$, and $LiBF_4$ is preferred. It is noted here that i represents an integer of 1 to 10, and j represents an integer of 1 to 4.

Any of these fluoroboron salts may be used singly, or two or more thereof may be used in any combination at any ratio. The content of the fluoroboron salt(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually 3% by mass or less, preferably 1% by mass or less, more preferably 0.8% by mass or less, still more preferably 0.5% by mass or less, most preferably 0.3% by mass or less.

When the content of the fluoroboron salt(s) is in this range, a non-aqueous electrolyte secondary battery is likely to exhibit a sufficient cycle characteristics-improving effect, and a situation where the high-temperature storage characteristics are deteriorated and the amount of gas generation is thereby increased and the discharge capacity retention rate is reduced is likely to be avoided.

<Fluoroimide Salt>

A counter cation of the above-described fluoroimide salt is not particularly restricted, and examples thereof include lithium, sodium, potassium, rubidium, cesium, magnesium, calcium, barium, and ammonium represented by $NR^{31}R^{32}R^{33}R^{34}$ (wherein, $R^{31}$ to $R^{34}$ each independently represents a hydrogen atom or an organic group having 1 to 12 carbon atoms). Thereamong, lithium is preferred.

The organic group having 1 to 12 carbon atoms that is represented by $R^{31}$ to $R^{34}$ of the above-described ammonium is not particularly restricted, and examples thereof include alkyl groups optionally substituted with a halogen atom, cycloalkyl groups optionally substituted with a halogen atom or an alkyl group, aryl groups optionally substituted with a halogen atom or an alkyl group, and nitrogen atom-containing heterocyclic groups optionally having a substituent. Thereamong, $R^{31}$ to $R^{34}$ are preferably each independently a hydrogen atom, an alkyl group, a cycloalkyl group, or a nitrogen atom-containing heterocyclic group.

Specific examples of the fluoroimide salt include $LiN(FCC)_2$, $LiN(FCC)(FSO_2)$ $LiN(FSO_2)_2$, $LiN(FSO_2)(CF_3SO_2)$ $LiN(CF_3SO_2)_2$, $LiN(C_2F_5SO_2)_2$, lithium cyclic 1,2-perfluoroethane disulfonylimide, lithium cyclic 1,3-perfluoropropane disulfonylimide, and $LiN(CF_3SO_2)(C_4F_9SO_2)$, among which $LiN(FSO_2)_2$, $LiN(CF_3SO_2)_2$, and $LiN(C_2F_5SO_2)_2$ are preferred.

Any of these fluoroimide salts may be used singly, or two or more thereof may be used in any combination at any ratio. The content of the fluoroimide salt(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually less than 8% by mass, preferably 5% by mass or less, more preferably 3% by mass or less, still more preferably 2% by mass or less, most preferably 1% by mass or less.

When the content of the fluoroimide salt(s) is in this range, a non-aqueous electrolyte secondary battery is likely to exhibit a sufficient cycle characteristics-improving effect, and a situation where the high-temperature storage characteristics are deteriorated and the amount of gas generation is thereby increased and the discharge capacity retention rate is reduced is likely to be avoided.

(Oxalate Salt)

An oxalate salt is preferred since it is capable of reacting with a decomposition product of the compound represented by Formula (A), (B), (a), (Y), or (Z) in a preferred manner to form a composite coating film and thereby reduce the initial battery resistance.

A counter cation of the above-described oxalate salt is not particularly restricted, and examples thereof include lithium, sodium, potassium, rubidium, cesium, magnesium, calcium, barium, and ammonium represented by $NR^{35}R^{36}R^{37}R^{38}$ (wherein, $R^{35}$ to $R^{38}$ each independently represents a hydrogen atom or an organic group having 1 to 12 carbon atoms). Thereamong, lithium is preferred.

The organic group having 1 to 12 carbon atoms that is represented by $R^{35}$ to $R^{38}$ of the above-described ammonium is not particularly restricted, and examples thereof include alkyl groups optionally substituted with a halogen atom, cycloalkyl groups optionally substituted with a halogen atom or an alkyl group, aryl groups optionally substituted with a halogen atom or an alkyl group, and nitrogen atom-containing heterocyclic groups optionally having a substituent. Thereamong, $R^{35}$ to $R^{38}$ are preferably each independently a hydrogen atom, an alkyl group, a cycloalkyl group, or a nitrogen atom-containing heterocyclic group.

Specific examples of the oxalate salt include lithium bis(oxalato)borate, lithium tetrafluoro(oxalato)phosphate, lithium difluorobis(oxalato)phosphate, and lithium tris(oxalato)phosphate, among which lithium bis(oxalato)borate and lithium difluorobis(oxalato)phosphate are preferred, and lithium bis(oxalato)borate is particularly preferred.

Any of these oxalate salts may be used singly, or two or more thereof may be used in any combination at any ratio. The content of the oxalate salt(s) with respect to a total amount of the non-aqueous electrolyte solution is not particularly restricted and may be set arbitrarily as long as the effects of the present invention are not markedly impaired; however, it is usually not less than 0.001% by mass, preferably not less than 0.01% by mass, more preferably not less than 0.1% by mass, but usually less than 8% by mass, preferably 5% by mass or less, more preferably 3% by mass or less, still more preferably 2% by mass or less, most preferably 1% by mass or less.

When the content of the oxalate salt(s) is in this range, not only the effect of reducing the initial battery resistance is enhanced and a non-aqueous electrolyte secondary battery is likely to exhibit a sufficient cycle characteristics-improving effect, but also a situation where the high-temperature storage characteristics are deteriorated and the amount of gas generation is thereby increased and the discharge capacity retention rate is reduced is likely to be avoided.

(Fluorosilane Compound)

A fluorosilane compound is preferred since it is capable of reacting with a decomposition product of the compound represented by Formula (A), (B), (a), (Y), or (Z) in a preferred manner to form a composite coating film and thereby reduce the initial battery resistance.

The non-aqueous electrolyte solution according to the present embodiment may also contain a fluorosilane compound. The fluorosilane compound is not particularly restricted as long as it is a compound having at least one silicon-fluorine bond (Si—F bond) in the molecule.

Examples of the fluorosilane compound include fluorotrimethylsilane, dimethyl(fluoro)(vinyl)silane, (allyl)dimethyl(fluoro)silane, dimethyl(fluoro)(propargyl)silane, divinylfluoro(methyl)silane, fluorotrivinylsilane, ethynyldimethylfluorosilane, difluorodimethylsilane, difluorodivinylsilane, methyltrifluorosilane, trifluorovinylsilane, fluorotriethylsilane, diethyl(fluoro)(methyl)silane, diethyl(fluoro)(vinyl)silane, ethyldivinylfluorosilane, diethyl(fluoro)(ethynyl)silane, (allyl)diethyl(fluoro)silane, diethyl(fluoro)(propargyl)silane, difluorodiethylsilane, ethyldifluorovinylsilane, trifluoroethylsilane, fluorotripropylsilane, trifluoropropylsilane, fluorotributylsilane, trifluorobutylsilane, fluorotripentylsilane, trifluoropentylsilane, fluorotrihexylsilane, trifluorohexylsilane, fluorotricyclohexylsilane, trifluorocyclohexylsilane, fluorotriphenylsilane, fluorotritoluylsilane, fluorotribenzylsilane, difluorodinaphthylsilane, naphthyltrifluorosilane, dibiphenyldifluorosilane, biphenyltrifluorosilane, (cyclohexylphenyl)trifluorosilane, di(cyclohexylphenyl)difluorosilane, fluorotri(biphenyl)silane, and fluorotri(cyclohexylphenyl)silane.

Thereamong, fluorotrimethylsilane, dimethyl(fluoro)(vinyl)silane, dimethyldifluorosilane, and methyl(difluoro)(vinyl)silane are preferred.

Any of these fluorosilane compounds may be used singly, or two or more thereof may be used in any combination at any ratio. The content of the fluorosilane compound (a total content when two or more fluorosilane compounds are used) with respect to a total amount of the non-aqueous electrolyte solution is usually not less than 0.001% by mass, preferably not less than 0.01% by mass, more preferably not less than 0.1% by mass, but usually 3% by mass or less, preferably 1% by mass or less, more preferably 0.5% by mass or less. When the content of the fluorosilane compound is in this range, the effect of reducing the initial battery resistance is enhanced, and it is easy to control the output characteristics, the load characteristics, the low-temperature characteristics, the cyclic characteristics, and the high-temperature storage characteristics, and the like.

(Unsaturated Cyclic Carbonate)

The term "unsaturated cyclic carbonate" used herein refers to a cyclic carbonate having an unsaturated carbon-carbon bond. The unsaturated cyclic carbonate is not particularly restricted as long as it is a carbonate that has a unsaturated carbon-carbon bond, such as a carbon-carbon double bond or a carbon-carbon triple bond, and any such unsaturated cyclic carbonate can be used.

The unsaturated cyclic carbonate may be, for example, a vinylene carbonate, or an ethylene carbonate substituted with a substituent having a unsaturated carbon-carbon bond.

Specific examples of the vinylene carbonate include vinylene carbonate, methylvinylene carbonate, and 4,5-dimethylvinylene carbonate.

Specific examples of the ethylene carbonate substituted with a substituent having a unsaturated carbon-carbon bond include vinylethylene carbonate, 4,5-divinylethylene carbonate, ethynylethylene carbonate, and propargylethylene carbonate.

Thereamong, vinylene carbonate, vinylethylene carbonate and ethynylethylene carbonate are preferred and, particularly, vinylene carbonate can contribute to the formation of a stable film-like structure and is thus more preferably used.

The molecular weight of the unsaturated cyclic carbonate is not particularly restricted and may be set arbitrarily as long as the effects of the present invention are not markedly impaired; however, it is usually 50 or higher, preferably 80 or higher, but preferably 250 or lower, preferably 150 or lower. When the molecular weight is in this range, a solubility of the unsaturated cyclic carbonate in the non-aqueous electrolyte solution is likely to be ensured, so that the effects of the present invention are likely to be expressed sufficiently.

Any of the above-described unsaturated cyclic carbonates may be used singly, or two or more thereof may be used in any combination at any ratio. The content of the unsaturated cyclic carbonate(s) is not particularly restricted and may be set arbitrarily as long as the effects of the present invention are not markedly impaired; however, it is usually not less than 0.001% by mass, preferably not less than 0.01% by mass, more preferably not less than 0.1% by mass, still more preferably not less than 0.2% by mass, but usually 10% by mass or less, preferably 8% by mass or less, more preferably 5% by mass or less, with respect to a total amount of the non-aqueous electrolyte solution. When the content of the unsaturated cyclic carbonate(s) is in this range, the effect of reducing the initial resistance of a non-aqueous electrolyte secondary battery is enhanced, and sufficient high-temperature storage characteristics and an effect of improving the cycle characteristics are likely to be expressed.

(Fluorinated Cyclic Carbonate)

The term "fluorinated cyclic carbonate" used herein refers to a cyclic carbonate having a fluorine atom.

Examples of the fluorinated cyclic carbonate include derivatives of a cyclic carbonate having an alkylene group having 2 to 6 carbon atoms, such as ethylene carbonate derivatives. Examples of the ethylene carbonate derivatives include fluorinated products of ethylene carbonate or ethylene carbonate substituted with an alkyl group (e.g., an alkyl group having 1 to 4 carbon atoms), among which those having 1 to 8 fluorine atoms are preferred.

Specific examples thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

Thereamong, at least one selected from the group consisting of monofluoroethylene carbonate, 4,4-difluoroethylene carbonate, 4,5-difluoroethylene carbonate, and 4,5-difluoro-4,5-dimethylethylene carbonate is preferred from the standpoints of imparting the non-aqueous electrolyte solution with a high ionic conductivity and forming an interface protective film in a preferred manner.

Any of the above-described fluorinated cyclic carbonates may be used singly, or two or more thereof may be used in any combination at any ratio.

It is noted here that the fluorinated cyclic carbonate may be used as an auxiliary agent or a non-aqueous solvent of the non-aqueous electrolyte solution. When the fluorinated cyclic carbonate used as a non-aqueous solvent, the content thereof is usually not less than 8% by mass, preferably not less than 10% by mass, more preferably not less than 12% by mass, but usually 85% by mass or less, preferably 80% by mass or less, more preferably 75% by mass or less, with respect to a total amount of the non-aqueous electrolyte solution. When the content of the fluorinated cyclic carbonate is in this range, not only the effect of reducing the initial resistance of a non-aqueous electrolyte secondary battery is enhanced, but also a sufficient effect of improving the cycle characteristics is likely to be expressed and a reduction in the discharge capacity retention rate is likely to be avoided.

In the non-aqueous electrolyte solution according to one embodiment of the present invention, the above-described unsaturated cyclic carbonate or fluorinated cyclic carbonate is preferably at least one selected from the group consisting of vinylene carbonate, vinylethylene carbonate, ethynylethylene carbonate, and fluoroethylene carbonate.

As the fluorinated cyclic carbonate, a cyclic carbonate having an unsaturated bond and a fluorine atom (hereinafter, may be simply referred to as "fluorinated unsaturated cyclic carbonate") can be used. The fluorinated unsaturated cyclic carbonate is not particularly restricted. Particularly, one having 1 or 2 fluorine atoms is preferred. A method of producing the fluorinated unsaturated cyclic carbonate is not particularly restricted, and any known method can be selected to produce the fluorinated unsaturated cyclic carbonate.

The fluorinated unsaturated cyclic carbonate is, for example, a vinylene carbonate derivative, or an ethylene carbonate derivative substituted with a substituent having an aromatic ring or an unsaturated carbon-carbon bond.

Examples of the vinylene carbonate derivative include 4-fluorovinylene carbonate, 4-fluoro-5-methylvinylene carbonate, 4-fluoro-5-phenylvinylene carbonate, and 4,5-difluorovinylene carbonate.

Examples of the ethylene carbonate derivative substituted with a substituent having an aromatic ring or a unsaturated carbon-carbon bond include 4-fluoro-4-vinylethylene carbonate, 4-fluoro-5-vinylethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

The molecular weight of the fluorinated unsaturated cyclic carbonate is not particularly restricted and may be set arbitrarily as long as the effects of the present invention are not markedly impaired; however, it is usually 50 or higher, preferably 80 or higher, but preferably 250 or lower, preferably 150 or lower. When the molecular weight is in this range, a solubility of the fluorinated cyclic carbonate in the non-aqueous electrolyte solution is likely to be ensured, so that the effects of the present invention are likely to be expressed.

Any of the above-described fluorinated unsaturated cyclic carbonates may be used singly, or two or more thereof may be used in any combination at any ratio. The amount of the fluorinated unsaturated cyclic carbonate(s) to be incorporated is not particularly restricted and may be set arbitrarily as long as the effects of the present invention are not markedly impaired; however, it is usually not less than 0.01% by mass, preferably not less than 0.1% by mass, more preferably not less than 0.2% by mass, but usually 5% by mass or less, preferably 4% by mass or less, more preferably 3% by mass or less, with respect to a total amount of the non-aqueous electrolyte solution. When the content of the fluorinated unsaturated cyclic carbonate(s) is in this range, the effect of reducing the initial resistance of a non-aqueous electrolyte secondary battery is enhanced, and a sufficient effect of improving the cycle characteristics is likely to be expressed.

The content of an auxiliary agent other than the above-described fluorinated salt, fluorosilane compound, unsaturated cyclic carbonate, fluorinated cyclic carbonate, and oxalate salt (other auxiliary agent) is not particularly restricted and may be set arbitrarily as long as the effects of the present invention are not markedly impaired; however, it is usually not less than 0.01% by mass, preferably not less than 0.1% by mass, more preferably not less than 0.2% by mass, but usually 5% by mass or less, preferably 3% by mass or less, more preferably 1% by mass or less, with respect to a total amount of the non-aqueous electrolyte solution. When the content of the other auxiliary agent is in this range, the effects of the other auxiliary agent are likely to be expressed sufficiently, so that the high-temperature storage stability tends to be improved. When two or more other auxiliary agents are used in combination, a total amount thereof should satisfy the above-described range.

<2. Non-aqueous Electrolyte Battery>

The non-aqueous electrolyte battery according to one embodiment of the present invention A is a non-aqueous electrolyte battery that includes: a positive electrode; a negative electrode; and a non-aqueous electrolyte solution, wherein the non-aqueous electrolyte solution is the above-described non-aqueous electrolyte solution according to one embodiment of the present invention A. More specifically, the non-aqueous electrolyte battery according to one embodiment of the present invention A includes: a positive electrode which includes a current collector and a positive electrode active material layer arranged on the current collector, and is capable of occluding and releasing metal ions; a negative electrode which includes a current collector and a negative electrode active material layer arranged on the current collector, and is capable of occluding and releasing metal ions; and a non-aqueous electrolyte solution which contains the above-described at least one Si—O structure-containing compound represented by Formula (A) or (B), and the above-described compound represented by Formula (α), along with an alkali metal salt and a non-aqueous solvent.

The non-aqueous electrolyte battery according to one embodiment of the present invention B is a non-aqueous electrolyte battery that includes: a positive electrode; a negative electrode; and a non-aqueous electrolyte solution, wherein the non-aqueous electrolyte solution is the above-described non-aqueous electrolyte solution according to one embodiment of the present invention B. More specifically, the non-aqueous electrolyte battery according to one embodiment of the present invention B includes: a positive electrode which includes a current collector and a positive electrode active material layer arranged on the current collector, and is capable of occluding and releasing metal ions; a negative electrode which includes a current collector and a negative electrode active material layer arranged on the current collector, and is capable of occluding and releasing metal ions; and a non-aqueous electrolyte solution which contains the above-described at least one Si—O structure-containing compound represented by Formula (A2) or (B2) and the above-described at least one Si—N structure-containing compound represented by Formula (Z) or (Y) along with an alkali metal salt and a non-aqueous solvent.

The non-aqueous electrolyte battery according to one embodiment of the present invention C is a non-aqueous electrolyte battery that includes: a positive electrode; a negative electrode; and a non-aqueous electrolyte solution, wherein the non-aqueous electrolyte solution is the above-described non-aqueous electrolyte solution according to one embodiment of the present invention C. More specifically, the non-aqueous electrolyte battery according to one embodiment of the present invention C includes: a positive electrode which includes a current collector and a positive electrode active material layer arranged on the current collector, and is capable of occluding and releasing metal ions; a negative electrode which includes a current collector and a negative electrode active material layer arranged on the current collector, and is capable of occluding and releasing metal ions; and a non-aqueous electrolyte solution which contains the above-described at least one Si—O structure-containing compound represented by Formula (A2) or (B2) and at least one selected from the group consisting of the above-described compound represented by Formula (α) and compound represented by Formula (Z) or (Y), along with an alkali metal salt and a non-aqueous solvent.

The following descriptions are applied to the inventions A to C.

<2-1. Battery Configuration>

The non-aqueous electrolyte battery of the present embodiment has the same configuration as that of a conventionally known non-aqueous electrolyte battery, except for the above-described non-aqueous electrolyte solution. The non-aqueous electrolyte battery usually has a form in which the positive electrode and the negative electrode are laminated via a porous membrane (separator) impregnated with the above-described non-aqueous electrolyte solution, and these components are housed in a casing (outer package). The shape of the non-aqueous electrolyte battery of the present embodiment is not particularly restricted and may be any of, for example, a cylindrical shape, a prismatic shape, a laminated shape, a coin shape, and a large-sized shape.

<2-2. Non-Aqueous Electrolyte Solution>

As the non-aqueous electrolyte solution, the above-described non-aqueous electrolyte solution according to one embodiment of the present invention is used. It is noted here that the above-described non-aqueous electrolyte solution can also be blended with other non-aqueous electrolyte solution within a range that does not depart from the gist of the present invention.

<2-3. Positive Electrode>

In one embodiment of the present invention, the positive electrode includes: a current collector; and a positive electrode active material layer arranged on the current collector. As for other constitutions, conventionally known constitutions can be employed.

The positive electrode used in the non-aqueous electrolyte battery of the present embodiment will now be described in detail.

<2-3-1. Positive Electrode Active Material>

First, a positive electrode active material used in the positive electrode will be described.

(1) Composition

The positive electrode active material is not particularly restricted as long as it is lithium cobaltate, or a transition metal oxide containing at least Ni and Co in which Ni and Co account for not less than 50% by mole of transition metals and which is capable of electrochemically occluding and releasing metal ions, and the positive electrode active material is preferably, for example, a transition metal oxide which is capable of electrochemically occluding and releasing lithium ions and contains lithium along with at least Ni and Co and in which Ni and Co account for not less than 60% by mole of transition metals. Ni and Co have a redox potential suitable for the use as positive electrode materials of a secondary battery, and are thus appropriate for high-capacity applications.

Among transition metal oxides, the positive electrode active material is preferably a transition metal oxide represented by the following composition formula (1):

$$Li_{a1}Ni_{b1}Co_{c1}M_{d1}O_2 \quad (1)$$

(wherein, in formula (1), a1, b1, c1, and d1 represent numerical values of $0.9 \leq a1 \leq 1.1$, $0.3 \leq b1 \leq 0.95$, $0.025 \leq c1 \leq 0.5$ and $0.025 \leq d1 \leq 0.5$, satisfying $0.5 \leq b1+c1$ and $b1+c1+d1=1$; and M represents at least one element selected from the group consisting of Mn, Al, Mg, Zr, Fe, Ti, and Er).

The reason for this is because, by controlling the composition ratios of Ni, Co and other metal species in the transition metal oxide used as the positive electrode active material to be prescribed above, the transition metals are made unlikely to elute out of the positive electrode and, even if they did, Ni and Co would have only a small adverse effect in the non-aqueous secondary battery.

Specific examples of the transition metal oxide represented by the composition formula (1) include $LiNi_{0.6}Co_{0.2}Mn_{0.2}O_2$, and $LiNi_{0.8}Co_{0.1}Mn_{0.1}O_2$.

The positive electrode active material is more preferably a transition metal oxide represented by the following composition formula (2):

$$Li_{a2}Ni_{b2}Co_{c2}M_{d2}O_2 \quad (2)$$

(wherein, in formula (2), a2, b2, c2, and d2 represent numerical values of $0.9 \leq a2 \leq 1.1$, $0.3 \leq b2 \leq 0.9$, $0.025 \leq c2 \leq 0.5$ and $0.025 \leq d2 \leq 0.5$, satisfying $c2 \leq b2$, $0.6 \leq b2+c2$, and $b2+c2+d2=1$; and M represents at least one element selected from the group consisting of Mn, Al, Mg, Zr, Fe, Ti, and Er).

The reason for this is because the transition metal oxide represented by composition formula (2) contains Ni and Co as main components and has the same or a higher composition ratio of Ni with respect to that of Co, so that a good stability can be attained and a high capacity can be extracted when this transition metal oxide is used as the positive electrode of the non-aqueous secondary battery.

The positive electrode active material is still more preferably a transition metal oxide represented by the following composition formula (3):

(wherein, in formula (3), a3, b3, c3, and d3 represent numerical values of $0.9 \leq a3 \leq 1.1$, $0.5 \leq b3 \leq 0.9$, $0.025 \leq c3 \leq 0.5$ and $0.025 \leq d3 \leq 0.5$, satisfying $c3 < b3$, $0.6 \leq b3+c3$, and $b3+c3+d3=1$; and M represents at least one element selected from the group consisting of Mn, Al, Mg, Zr, Fe, Ti, and Er).

It is advantageous to control the composition ratios of Ni, Co and other metal species in the transition metal oxide used as the positive electrode active material to be in the above-described respective ranges since this makes the transition metals unlikely to elute out of the positive electrode and, even if they did, Ni and Co would have only a small adverse effect in the non-aqueous secondary battery.

<2-4. Negative Electrode>

In one embodiment of the present invention, the negative electrode includes: a current collector; and a negative electrode active material layer arranged on the current collector. As for other constitutions, conventionally known constitutions can be employed.

A negative electrode active material used in the negative electrode will now be described.

<2-4-1. Negative Electrode Active Material>

The negative electrode active material is not particularly restricted as long as it is capable of electrochemically occluding and releasing metal ions. Specific examples of the negative electrode active material include: carbonaceous materials; metal compound-based materials, such as particles containing a metal alloyable with Li, and lithium-containing metal composite oxide materials; and mixtures thereof. Any of these materials may be used singly, or two or more thereof may be used in any combination. It is preferred to use a carbonaceous material, metal particles alloyable with Li, or a mixture of metal particles alloyable with Li and graphite particles, since this provides good cycle characteristics and good safety as well as excellent continuous charging characteristics.

As described above, the negative electrode active material is, for example, a carbonaceous material, or a metal compound-based material such as particles containing a metal alloyable with Li.

Examples of the carbonaceous material include natural graphite, artificial graphite, amorphous carbon, carbon-coated graphite, graphite-coated graphite, and resin-coated graphite. Thereamong, natural graphite is preferred.

Examples of natural graphite include scaly graphite, flake graphite, earthy graphite, and graphite particles obtained by performing a treatment, such as spheronization or densification, on any of these graphites. Thereamong, a spherical or ellipsoidal graphite obtained by a spheronization treatment is particularly preferred from the standpoints of the packing property of its particles and the charge-discharge rate characteristics.

The metal compound-based material to be used as the negative electrode active material is not particularly restricted as long as it is capable of occluding and releasing lithium ions, and the metal compound-based material may be simple lithium, a lithium alloy-forming simple metal or alloy thereof, or any compound thereof such as an oxide, a carbide, a nitride, a silicide, a sulfide, or a phosphide. The lithium alloy-forming simple metal or alloy thereof is preferably a material containing a metal or metalloid element of the periodic table Group 13 or 14 (i.e. excluding carbon), more preferably a simple metal of aluminum, silicon or tin, or an alloy or compound that contains these atoms, still more preferably a compound containing silicon or tin as a constituent element, such as a simple metal of silicon or tin, or an alloy or compound that contains these atoms. Silicon is most preferred since amorphous Si or nano-sized Si crystals facilitate migration of alkali metal ions such as lithium ions, so that a high capacity can be obtained.

Any of the above-described materials may be used singly, or two or more thereof may be used in any combination at any ratio.

<Particles Containing Metal Alloyable with Li>

When a simple metal forming an alloy with lithium or an alloy thereof, or any compound thereof such as an oxide, a carbide, a nitride, a silicide, a sulfide, or a phosphide is used as the negative electrode active material, the metal alloyable with Li is in the form of particles.

As the particles containing a metal alloyable with Li, any conventionally known such particles can be used; however, from the standpoints of the capacity and the cycle life of the non-aqueous electrolyte battery, the particles are preferably particles of, for example, a metal selected from the group consisting of Fe, Co, Sb, Bi, Pb, Ni, Ag, Si, Sn, Al, Zr, Cr, P, S, V, Mn, As, Nb, Mo, Cu, Zn, Ge, In, Ti and W, or a compound thereof. Further, when the particles containing a metal alloyable with Li contain two or more metals, the particles may be alloy particles formed of an alloy of these metals. Among these particles, the particles containing a metal alloyable with Li are preferably particles of a metal selected from the group consisting of Si, Sn, As, Sb, Al, Zn and W, or a metal compound thereof.

Examples of a compound of a metal alloyable with Li include metal oxides, metal nitrides, and metal carbides. The compound may contain two or more metals alloyable with Li.

Among these compounds, from the standpoint of increasing the battery capacity, Si metal (hereinafter, may be referred to as "Si") or an Si metal oxide is preferred. In the present specification, Si and an Si metal compound are collectively referred to as "Si compound". Specific examples of an Si compound include $SiO_x$, $SiN_x$, $SiC_x$, and $SiZ_xO_y$ (wherein, Z=C or N). The Si compound is preferably an Si metal oxide ($SiO_x$) since it has a higher theoretical capacity than graphite, or amorphous Si or nano-sized Si crystals from the standpoint of facilitating the migration of alkali metal ions such as lithium ions to obtain a high capacity. This $SiO_x$ is obtained using silicon dioxide ($SiO_2$) and Si as raw materials, and the value of x is usually 0<x<2.

<Negative Electrode Active Material that Contain Particles Containing Metal Alloyable with Li and Graphite Particles>

The negative electrode active material may contain particles containing a metal alloyable with Li, and graphite particles. This negative electrode active material may be a mixture in which the particles containing a metal alloyable with Li and the graphite particles are mixed in a state of mutually independent particles, or may be a composite in which the particles containing a metal alloyable with Li exist on the surface of the graphite particles and/or inside the graphite particles.

<Content Ratio of Particles Containing Metal Alloyable with Li>

The content ratio of the particles containing a metal alloyable with Li is usually 0.1% by mass or higher, preferably 0.5% by mass or higher, more preferably 1.0% by mass or higher, still more preferably 2.0% by mass or higher, but usually 99% by mass or lower, preferably 50% by mass or lower, more preferably 40% by mass or lower, still more preferably 30% by mass or lower, yet still more preferably 25% by mass or lower, yet still more preferably 20% by mass or lower, particularly preferably 15% by mass or lower, most preferably 10% by mass or lower, with respect to a total amount of the particles containing a metal alloyable with Li and the graphite particles. When the content ratio is in this range, side reactions on the Si surface can be controlled, so that the non-aqueous electrolyte battery can attain a sufficient capacity, which is preferred.

<2-5. Separator>

A separator is usually arranged between the positive electrode and the negative electrode for the purpose of inhibiting a short circuit. In this case, the separator is usually impregnated with the non-aqueous electrolyte solution according to one embodiment of the present invention. As the separator, any conventionally known separator can be used.

EXAMPLES

The present invention will now be described more concretely by way of Examples and Comparative Examples; however, the present invention is not restricted to the below-described Examples within the gist of the present invention.

Example A1

Compounds used in the following Examples and Comparative Examples are shown below.

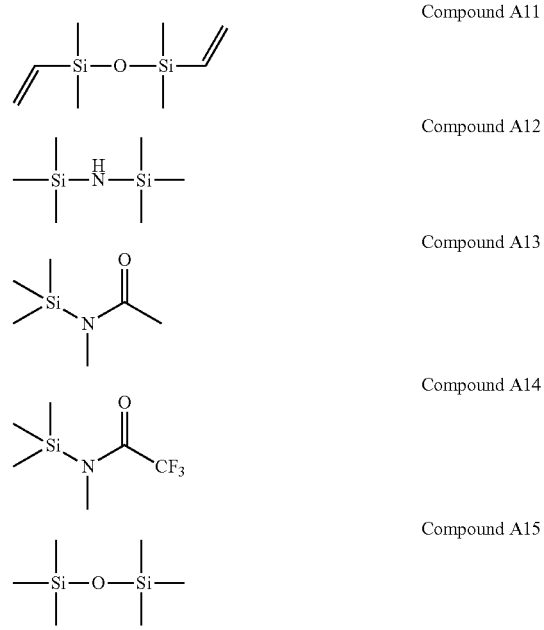

Compound A11

Compound A12

Compound A13

Compound A14

Compound A15

-continued

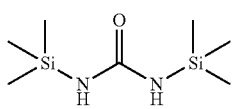
Compound A16

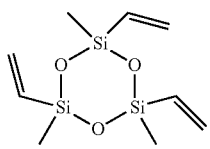
Compound A17

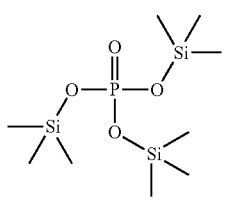
Compound A18

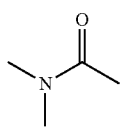
Compound A19

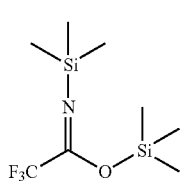
Compound A110

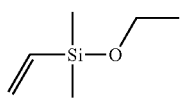
Compound A111

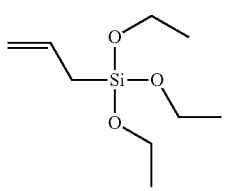
Compound A112

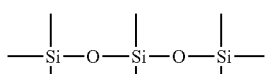
Compound A113

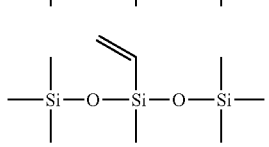
Compound A114

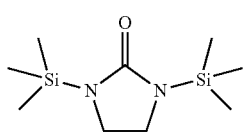
Compound A115

Examples A1-1 to A1-18 and Comparative Examples A1-1 to A1-19

[Production of Positive Electrode]

A slurry was prepared by mixing 90 parts by mass of lithium-nickel-cobalt-manganese composite oxide ($Li_{1.0}Ni_{0.5}Co_{0.2}Mn_{0.3}O_2$) as a positive electrode active material, 7 parts by mass of acetylene black as a conductive material, and 3 parts by mass of polyvinylidene fluoride (PVdF) as a binder in an N-methylpyrrolidone solvent using a disperser. This slurry was uniformly coated and dried onto both sides of a 15 μm-thick aluminum foil, which was subsequently pressed to produce a positive electrode.

[Production of Negative Electrode]

To 98 parts by mass of natural graphite, 1 part by mass of an aqueous dispersion of sodium carboxymethyl cellulose (concentration of sodium carboxymethyl cellulose=1% by mass) and 1 part by mass of an aqueous dispersion of styrene-butadiene rubber (concentration of styrene-butadiene rubber=50% by mass) were added as a thickening agent and a binder, respectively, and these materials were mixed using a disperser to prepare a slurry. The thus obtained slurry was coated and dried onto one side of a 10 μm-thick copper foil, which was subsequently pressed to produce a negative electrode.

[Preparation of Non-Aqueous Electrolyte Solutions]

Under a dry argon atmosphere, thoroughly dried $LiPF_6$ was dissolved as an electrolyte in an amount of 1.2 mol/L (14.8% by mass in terms of the concentration in the resulting non-aqueous electrolyte solution) in a mixture of ethylene carbonate (EC), diethyl carbonate (DEC) and ethyl methyl carbonate (EMC) (volume ratio EC:DEC:EMC=3:3:4), and vinylene carbonate (VC) and fluoroethylene carbonate (FEC) were further added thereto each in an amount of 2.0% by mass (in terms of the concentration in the resulting non-aqueous electrolyte solution) (the resultant is hereinafter referred to as "reference electrolyte solution A1-1"). To the thus obtained reference electrolyte solution A1-1, the compounds A11 to A115 were each added in accordance with the respective amounts shown in Table 1 below to prepare non-aqueous electrolyte solutions. It is noted here that, in Table 1, "Content (% by mass)" indicates an amount contained in a total of 100% by mass of each non-aqueous electrolyte solution.

[Production of Non-Aqueous Electrolyte Batteries]

A battery element was prepared by laminating the above-obtained positive electrode and negative electrode along with a polyethylene separator in the order of the negative electrode, the separator, and the positive electrode. This battery element was inserted into a pouch made of a laminated film obtained by coating both sides of an aluminum sheet (thickness: 40 μm) with a resin layer, with the terminals of the positive and negative electrodes protruding out of the pouch. Thereafter, each of the above-prepared non-aqueous electrolyte solutions was injected into the pouch, and the pouch was subsequently vacuum-sealed, whereby a laminate-type non-aqueous electrolyte battery was produced.

<Evaluation of Non-Aqueous Electrolyte Batteries>

[Measurement of OCV after Injection]

In a 25° C. thermostat chamber, the OCV of each non-aqueous electrolyte battery produced by the above-described method was measured.

[Initial Conditioning]

In a 25° C. thermostat chamber, each non-aqueous electrolyte battery was charged for 6 hours with a constant current equivalent to 0.05 C and subsequently discharged to 3.0 V at 0.2 C. The battery was then subjected to CC-CV charging up to 4.1 V at 0.2 C, followed by aging at 45° C. for 72 hours. Thereafter, this laminate-type battery was discharged to 3.0 V at 0.2 C and stabilized. The battery was further subjected to CC-CV charging up to 4.4 V at 0.2 C and then discharged to 3.0 V at 0.2 C, whereby initial conditioning was completed.

[Measurement of Amount of Gas Generated During Initial Conditioning]

After the initial conditioning, each battery was immersed in an ethanol bath to measure the volume, and the amount of generated gas was determined from the volume change before and after the initial conditioning and defined as "initial gas amount".

Table 1 below shows ΔOCV, which is a difference from the OCV of Comparative Example A1-1, and the initial gas amount taking that of Comparative Example A1-1 as 100. In Table 1, the initial gas amount is indicated as "Initial Gas".

parative Example A1-1 with Comparative Examples A1-3 to A1-9 and A1-16, in those cases where a non-aqueous electrolyte solution containing only a compound represented by Formula (α) without containing an Si—O structure-containing compound represented by Formula (A) or (B) was used, the ΔOCV was substantially the same as in Comparative Example A1-1, and the initial gas amount tended to be larger than that in Comparative Example A1-1.

From the results of Comparative Examples A1-1, A1-2 and A1-4, the initial gas amount is expected to be increased when the non-aqueous electrolyte solution of Example A1-1 is used. On the contrary, according to the results of Example

TABLE 1

|  | Compound (A) or (B) | Content (% by mass) | Compound (α) | Content (% by mass) | Other Compound | Content (% by mass) | Δ OCV [V] | Initial Gas |
|---|---|---|---|---|---|---|---|---|
| Example A1-1 | Compound A11 | 1 | Compound A13 | 0.05 | — | — | 0.23 | 62 |
| Example A1-2 | Compound A11 | 1 | Compound A14 | 0.05 | — | — | 0.26 | 64 |
| Example A1-3 | Compound A11 | 1 | Compound A13 | 0.1 | — | — | 0.21 | 64 |
| Example A1-4 | Compound A11 | 1 | Compound A14 | 0.1 | — | — | 0.23 | 57 |
| Example A1-5 | Compound A11 | 1 | Compound A16 | 0.1 | — | — | 0.09 | 42 |
| Example A1-6 | Compound A17 | 1 | Compound A14 | 0.1 | — | — | 0.11 | 25 |
| Example A1-7 | Compound A15 | 1 | Compound A14 | 0.1 | — | — | 0.06 | 95 |
| Example A1-8 | Compound A111 | 1 | Compound A14 | 0.1 | — | — | 0.11 | 44 |
| Example A1-9 | Compound A112 | 1 | Compound A14 | 0.1 | — | — | 0.09 | 56 |
| Example A1-10 | Compound A113 | 1 | Compound A13 | 0.1 | — | — | 0.04 | 80 |
| Example A1-11 | Compound A113 | 1 | Compound A16 | 0.1 | — | — | 0.06 | 45 |
| Example A1-12 | Compound A114 | 1 | Compound A13 | 0.1 | — | — | 0.04 | 45 |
| Example A1-13 | Compound A114 | 1 | Compound A16 | 0.1 | — | — | 0.06 | 82 |
| Example A1-14 | Compound A11 | 1 | Compound A13 | 0.25 | — | — | 0.1 | 71 |
| Example A1-15 | Compound A11 | 1 | Compound A13 | 0.5 | — | — | 0.08 | 86 |
| Example A1-16 | Compound A11 | 1 | Compound A16 | 0.25 | — | — | 0.06 | 76 |
| Example A1-17 | Compound A11 | 1 | Compound A16 | 0.5 | — | — | 0.03 | 89 |
| Example A1-18 | Compound A11 | 1 | Compound A115 | 0.1 | — | — | 0.08 | 59 |
|  | Compound (A) or (B) | Content (% by mass) | Compound (α) | Content (% by mass) | Other Compound | Content (% by mass) | Δ OCV [V] | Initial Gas |
| Comparative Example A1-1 | — | — | — | — | — | — | 0.00 | 100 |
| Comparative Example A1-2 | Compound A11 | 1 | — | — | — | — | 0.03 | 103 |
| Comparative Example A1-3 | — | — | Compound A16 | 0.1 | — | — | 0.01 | 206 |
| Comparative Example A1-4 | — | — | Compound A13 | 0.05 | — | — | 0.01 | 125 |
| Comparative Example A1-5 | — | — | Compound A14 | 0.05 | — | — | 0.00 | 113 |
| Comparative Example A1-6 | — | — | Compound A13 | 0.1 | — | — | 0.00 | 103 |
| Comparative Example A1-7 | — | — | Compound A14 | 0.1 | — | — | 0.00 | 107 |
| Comparative Example A1-8 | — | — | Compound A13 | 0.5 | — | — | 0.00 | 142 |
| Comparative Example A1-9 | — | — | Compound A14 | 0.5 | — | — | 0.00 | 102 |
| Comparative Example A1-10 | — | — | Compound A14 | 0.1 | Compound A18 | 1 | −0.02 | 176 |
| Comparative Example A1-11 | — | — | Compound A14 | 0.1 | Compound A19 | 1 | 0.00 | 139 |
| Comparative Example A1-12 | — | — | Compound A14 | 0.1 | Compound A110 | 1 | 0.00 | 127 |
| Comparative Example A1-13 | Compound A15 | 1 | — | — | Compound A12 | 0.1 | 0.01 | 169 |
| Comparative Example A1-14 | Compound A111 | 1 | — | — | — | — | 0.00 | 122 |
| Comparative Example A1-15 | Compound A112 | 1 | — | — | — | — | −0.01 | 167 |
| Comparative Example A1-16 | — | — | Compound A115 | 0.1 | — | — | 0.00 | 118 |
| Comparative Example A1-17 | Compound A113 | 1 | — | — | — | — | 0.00 | 122 |
| Comparative Example A1-18 | Compound A114 | 1 | — | — | — | — | 0.00 | 123 |
| Comparative Example A1-19 | Compound A15 | 1 | — | — | — | — | 0.01 | 206 |

As apparent from Table 1, it is seen that the batteries produced in Examples A1-1 to A1-18 had a larger ΔOCV and consequently had a smaller initial gas amount than the batteries produced in Comparative Examples A1-1 to A1-19.

Comparing Comparative Example A1-1 with Comparative Examples A1-2, A1-13 to A1-15, and A1-17 to A1-19, in those cases where a non-aqueous electrolyte solution containing only an Si—O structure-containing compound represented by Formula (A) or (B) without containing a compound represented by Formula (α) was used, the ΔOCV was substantially the same as in Comparative Example A1-1, and the initial gas amount tended to be larger than that in Comparative Example A1-1. Further, comparing Com- A1-1, the ΔOCV was large, and the initial gas amount was markedly reduced to 62% relative to Comparative Example A1-1.

From the results of Comparative Examples A1-1, A1-2 and A1-5, the initial gas amount is expected to be increased when the non-aqueous electrolyte solution of Example A1-2 is used. On the contrary, according to the results of Example A1-2, the ΔOCV was large, and the initial gas amount was markedly reduced to 64% relative to Comparative Example A1-1.

From the results of Comparative Examples A1-1, A1-2 and A1-6, the initial gas amount is expected to be increased when the non-aqueous electrolyte solution of Example A1-3 is used. On the contrary, according to the results of Example A1-3, the ΔOCV was large, and the initial gas amount was markedly reduced to 64% relative to Comparative Example A1-1.

From the results of Comparative Examples A1-1, A1-2 and A1-7, the initial gas amount is expected to be increased when the non-aqueous electrolyte solution of Example A1-4 is used. On the contrary, according to the results of Example A1-4, the ΔOCV was large, and the initial gas amount was markedly reduced to 57% relative to Comparative Example A1-1.

From the results of Comparative Examples A1-1, A1-2 and A1-3, the initial gas amount is expected to be greatly increased when the non-aqueous electrolyte solution of Example A1-5 is used. On the contrary, according to the results of Example A1-5, the ΔOCV was large, and the initial gas amount was markedly reduced to 42% relative to Comparative Example A1-1.

From the results of Comparative Examples A1-1, A1-2 and A1-14, the initial gas amount is expected to be increased when the non-aqueous electrolyte solution of Example A1-8 is used. On the contrary, according to the results of Example A1-8, the ΔOCV was large, and the initial gas amount was markedly reduced to 44% relative to Comparative Example A1-1.

From the results of Comparative Examples A1-1, A1-2 and A1-15, the initial gas amount is expected to be increased when the non-aqueous electrolyte solution of Example A1-9 is used. On the contrary, according to the results of Example A1-9, the ΔOCV was large, and the initial gas amount was markedly reduced to 56% relative to Comparative Example A1-1.

From the results of Comparative Examples A1-1, A1-6 and A1-17, the initial gas amount is expected to be increased when the non-aqueous electrolyte solution of Example A1-10 is used. On the contrary, according to the results of Example A1-10, the ΔOCV was large, and the initial gas amount was reduced to 80% relative to Comparative Example A1-1.

From the results of Comparative Examples A1-1, A1-3 and A1-17, the initial gas amount is expected to be increased when the non-aqueous electrolyte solution of Example A1-11 is used. On the contrary, according to the results of Example A1-11, the ΔOCV was large, and the initial gas amount was markedly reduced to 45% relative to Comparative Example A1-1.

From the results of Comparative Examples A1-1, A1-6 and A1-18, the initial gas amount is expected to be increased when the non-aqueous electrolyte solution of Example A1-12 is used. On the contrary, according to the results of Example A1-12, the ΔOCV was large, and the initial gas amount was markedly reduced to 45% relative to Comparative Example A1-1.

From the results of Comparative Examples A1-1, A1-3 and A1-18, the initial gas amount is expected to be increased when the non-aqueous electrolyte solution of Example A1-13 is used. On the contrary, according to the results of Example A1-13, the ΔOCV was large, and the initial gas amount was reduced to 82% relative to Comparative Example A1-1.

From the results of Comparative Examples A1-1, A1-2, A1-4, A1-6 and A1-8, the initial gas amount is expected to be increased when the non-aqueous electrolyte solution of Example A1-14 is used. On the contrary, according to the results of Example A1-14, the ΔOCV was large, and the initial gas amount was reduced to 71% relative to Comparative Example A1-1.

From the results of Comparative Examples A1-1, A1-2 and A1-8, the initial gas amount is expected to be increased when the non-aqueous electrolyte solution of Example A1-15 is used. On the contrary, according to the results of Example A1-15, the ΔOCV was large, and the initial gas amount was reduced to 86% relative to Comparative Example A1-1.

From the results of Comparative Examples A1-1, A1-2 and A1-16, the initial gas amount is expected to be increased when the non-aqueous electrolyte solution of Example A1-16 is used. On the contrary, according to the results of Example A1-16, the ΔOCV was large, and the initial gas amount was reduced to 76% relative to Comparative Example A1-1.

From the results of Examples A1-1, A1-14 and A1-15, it is seen that, in those cases where an Si—O structure-containing compound represented by Formula (A) and a compound represented by Formula (α) were used in combination, the initial gas amount was reduced with a lower content of the compound represented by Formula (α).

Also from the results of Examples A1-5, A1-16 and A1-17, it is seen that, in those cases where an Si—O structure-containing compound represented by Formula (A) and a compound represented by Formula (α) were used in combination, the initial gas amount was reduced with a lower content of the compound represented by Formula (α).

From the results of Comparative Examples A1-1, A1-2 and A1-16, the initial gas amount is expected to be increased when the non-aqueous electrolyte solution of Example A1-18 is used. On the contrary, according to the results of Example A1-18, the ΔOCV was large, and the initial gas amount was markedly reduced to 59% relative to Comparative Example A1-1.

Further, in Example A1-6, the initial gas amount was markedly reduced to 25% relative to Comparative Example A1-1.

Moreover, in Comparative Examples A1-10 to A1-12 where a compound represented by Formula (α) and a compound having an Si—O structure but not corresponding to a compound represented by Formula (A) or (B) were used in combination, the ΔOCV was substantially the same as in Comparative Example A1-1, and the initial gas amount was increased to a range of 127% to 176% relative to Comparative Example A1-1.

Furthermore, in Comparative Example A1-13 where an Si—O structure-containing compound represented by Formula (A) and a compound having an Si—N structure but not corresponding to a compound represented by Formula (α) were used in combination, the ΔOCV was substantially the same as in Comparative Example A1-1, and the initial gas amount was increased to 169% relative to Comparative Example A1-1.

In the batteries of these Examples, a compound represented by Formula (α) and an Si—O structure-containing compound represented by Formula (A) or (B) adsorb to the positive electrode active material and/or the negative electrode active material in large amounts after the injection; therefore, it is presumed that the compounds localized on the electrode(s) are electrochemically degraded during initial charging to form a composite insulating coating film on the surface of the positive electrode active material and/or the surface of the negative electrode active material. Consequently, by using a combination of a compound represented by Formula (α) and an Si—O structure-containing compound represented by Formula (A) or (B), adsorption of these compounds to electrodes can be controlled and the amount of initial gas generation can be reduced in a preferred manner.

Example A2

Compounds used in the following Examples and Comparative Examples are shown below.

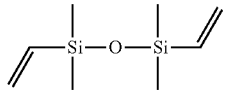

Compound A21

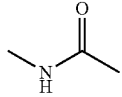

Compound A22

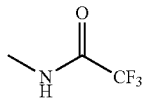

Compound A23

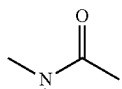

Compound A24

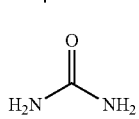

Compound A25

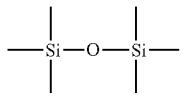

Compound A26

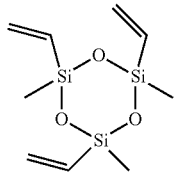

Compound A27

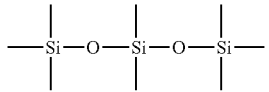

Compound A28

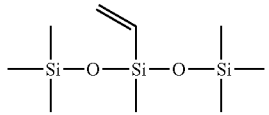

Compound A29

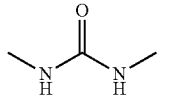

Compound A210

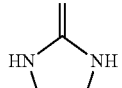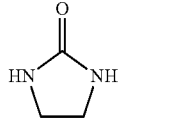

Compound A211

Compound A212

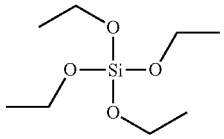

Compound A213

Examples A2-1 to A2-20 and Comparative Examples A2-1 to A2-16

[Production of Positive Electrode]

A slurry was prepared by mixing 90 parts by mass of lithium-nickel-cobalt-manganese composite oxide ($Li_{1.0}Ni_{0.5}Co_{0.2}Mn_{0.3}O_2$) as a positive electrode active material, 7 parts by mass of acetylene black as a conductive material, and 3 parts by mass of polyvinylidene fluoride (PVdF) as a binder in an N-methylpyrrolidone solvent using a disperser. This slurry was uniformly coated and dried onto both sides of a 15 μm-thick aluminum foil, which was subsequently pressed to produce a positive electrode.

[Production of Negative Electrode]

To 98 parts by mass of natural graphite, 1 part by mass of an aqueous dispersion of sodium carboxymethyl cellulose (concentration of sodium carboxymethyl cellulose=1% by mass) and 1 part by mass of an aqueous dispersion of styrene-butadiene rubber (concentration of styrene-butadiene rubber=50% by mass) were added as a thickening agent and a binder, respectively, and these materials were mixed using a disperser to prepare a slurry. The thus obtained slurry was coated and dried onto one side of a 10 μm-thick copper foil, which was subsequently pressed to produce a negative electrode.

[Preparation of Non-aqueous Electrolyte Solutions]

Under a dry argon atmosphere, thoroughly dried $LiPF_6$ was dissolved as an electrolyte in an amount of 1.2 mol/L (14.8% by mass in terms of the concentration in the resulting non-aqueous electrolyte solution) in a mixture of ethylene carbonate (EC), diethyl carbonate (DEC) and ethyl methyl carbonate (EMC) (volume ratio EC:DEC:EMC=3:3:4), and vinylene carbonate (VC) and fluoroethylene carbonate (FEC) were further added thereto each in an amount of 2.0% by mass (in terms of the concentration in the resulting non-aqueous electrolyte solution) (the resultant is hereinafter referred to as "reference electrolyte solution A2-1"). To the thus obtained reference electrolyte solution A2-1, the compounds A21 to A213 were each added in accordance with the respective amounts shown in Table 2 below to prepare non-aqueous electrolyte solutions of Examples A2-1 to A2-20 and Comparative Examples A2-2 to A2-16. It is noted here that, in the table below, "Content (% by mass)" indicates an amount contained in a total of 100% by mass of each non-aqueous electrolyte solution. Further, in Comparative Example A2-1, the reference electrolyte solution A2-1 was used.

[Production of Non-Aqueous Electrolyte Batteries]

A battery element was prepared by laminating the above-obtained positive electrode and negative electrode along with a polyethylene separator in the order of the negative electrode, the separator, and the positive electrode. This battery element was inserted into a pouch made of a laminated film obtained by coating both sides of an aluminum sheet (thickness: 40 μm) with a resin layer, such that the terminals of the positive and negative electrodes protruded out of the pouch. Thereafter, each of the above-prepared non-aqueous electrolyte solutions was injected into the pouch, and the pouch was subsequently vacuum-sealed, whereby a laminate-type non-aqueous electrolyte battery was produced.

generated gas was determined from the volume change before and after the initial conditioning and defined as "initial gas amount".

Table 2 below shows ΔOCV, which is a difference from the OCV of Comparative Example A2-1, and the initial gas amount taking that of Comparative Example A2-1 as 100. In Table 2, the initial gas amount is indicated as "Initial Gas".

TABLE 2

|  | Compound (A) or (B) | Content (% by mass) | Compound (α) | Content (% by mass) | Other Compound | Content (% by mass) | ∠ OCV [V] | Initial Gas |
|---|---|---|---|---|---|---|---|---|
| Example A2-1 | Compound A21 | 1.00 | Compound A22 | 0.05 | — | — | 0.11 | 98 |
| Example A2-2 | Compound A21 | 1.00 | Compound A23 | 0.05 | — | — | 0.12 | 91 |
| Example A2-3 | Compound A21 | 1.00 | Compound A22 | 0.10 | — | — | 0.10 | 83 |
| Example A2-4 | Compound A21 | 1.00 | Compound A23 | 0.10 | — | — | 0.08 | 68 |
| Example A2-5 | Compound A21 | 1.00 | Compound A22 | 0.50 | — | — | 0.12 | 93 |
| Example A2-6 | Compound A21 | 1.00 | Compound A23 | 0.50 | — | — | 0.10 | 73 |
| Example A2-7 | Compound A21 | 1.00 | Compound A25 | 0.03 | — | — | 0.11 | 80 |
| Example A2-8 | Compound A21 | 1.00 | Compound A25 | 0.05 | — | — | 0.14 | 89 |
| Example A2-9 | Compound A26 | 1.00 | Compound A22 | 0.05 | — | — | 0.04 | 83 |
| Example A2-10 | Compound A27 | 1.00 | Compound A22 | 0.05 | — | — | 0.09 | 42 |
| Example A2-11 | Compound A26 | 1.00 | Compound A25 | 0.05 | — | — | 0.06 | 81 |
| Example A2-12 | Compound A27 | 1.00 | Compound A25 | 0.05 | — | — | 0.10 | 50 |
| Example A2-13 | Compound A21 | 1.00 | Compound A210 | 0.10 | — | — | 0.11 | 47 |
| Example A2-14 | Compound A21 | 1.00 | Compound A211 | 0.10 | — | — | 0.09 | 79 |
| Example A2-15 | Compound A26 | 1.00 | Compound A210 | 0.10 | — | — | 0.04 | 86 |
| Example A2-16 | Compound A28 | 1.00 | Compound A22 | 0.10 | — | — | 0.06 | 73 |
| Example A2-17 | Compound A29 | 1.00 | Compound A22 | 0.10 | — | — | 0.05 | 59 |
| Example A2-18 | Compound A21 | 1.00 | Compound A22 | 0.05 | Compound A212 | 0.05 | 0.12 | 87 |
| Example A2-19 | Compound A21 | 1.00 | Compound A25 | 0.05 | Compound A212 | 0.05 | 0.11 | 86 |
| Example A2-20 | Compound A213 | 1.00 | Compound A22 | 0.05 | — | — | 0.03 | 92 |
|  | Compound (A) or (B) | Content (% by mass) | Compound (α) | Content (% by mass) | Other Compound | Content (% by mass) | ∠ OCV [V] | Initial Gas |
| Comparative Example A2-1 | — | — | — | — | — | — | 0.00 | 100 |
| Comparative Example A2-2 | Compound A21 | 1.00 | — | — | — | — | 0.03 | 103 |
| Comparative Example A2-3 | — | — | Compound A22 | 0.05 | — | — | 0.02 | 145 |
| Comparative Example A2-4 | — | — | Compound A23 | 0.05 | — | — | 0.00 | 133 |
| Comparative Example A2-5 | — | — | Compound A22 | 0.10 | — | — | 0.00 | 113 |
| Comparative Example A2-6 | — | — | Compound A23 | 0.10 | — | — | 0.01 | 106 |
| Comparative Example A2-7 | — | — | Compound A22 | 0.50 | — | — | 0.00 | 175 |
| Comparative Example A2-8 | — | — | Compound A23 | 0.50 | — | — | 0.00 | 155 |
| Comparative Example A2-9 | — | — | — | — | Compound A24 | 0.10 | 0.00 | 142 |
| Comparative Example A2-10 | Compound A21 | 1.00 | — | — | Compound A24 | 0.10 | 0.05 | 125 |
| Comparative Example A2-11 | — | — | Compound A25 | 0.10 | — | — | 0.00 | 215 |
| Comparative Example A2-12 | Compound A26 | 1.00 | — | — | — | — | 0.01 | 206 |
| Comparative Example A2-13 | — | — | Compound A210 | 0.10 | — | — | 0.00 | 119 |
| Comparative Example A2-14 | — | — | Compound A211 | 0.10 | — | — | 0.01 | 135 |
| Comparative Example A2-15 | Compound A28 | 1.00 | — | — | — | — | 0.00 | 122 |
| Comparative Example A2-16 | Compound A29 | 1.00 | — | — | — | — | 0.00 | 123 |

<Evaluation of Non-Aqueous Electrolyte Batteries>
[Measurement of OCV after Injection]
In a 25° C. thermostat chamber, the OCV of each non-aqueous electrolyte battery produced by the above-described method was measured.
[Initial Conditioning]
In a 25° C. thermostat chamber, each non-aqueous electrolyte battery was charged for 6 hours with a constant current equivalent to 0.05 C and subsequently discharged to 3.0 V at 0.2 C. The battery was then subjected to CC-CV charging up to 4.1 V at 0.2 C, followed by aging at 45° C. for 72 hours. Thereafter, this laminate-type battery was discharged to 3.0 V at 0.2 C and stabilized. The battery was further subjected to CC-CV charging up to 4.4 V at 0.2 C and then discharged to 3.0 V at 0.2 C, whereby initial conditioning was completed.
[Measurement of Amount of Gas Generated During Initial Conditioning]
After the initial conditioning, each battery was immersed in an ethanol bath to measure the volume, and the amount of Comparing Comparative Example A2-1 with Comparative Examples A2-2, 12, 15 and 16, it is seen that, in those cases where a non-aqueous electrolyte solution containing only an Si—O structure-containing compound represented by Formula (A) or (B) without containing a compound represented by Formula (α) was used, the ΔOCV was substantially the same as in Comparative Example A2-1, and the initial gas amount tended to be larger than that in Comparative Example A2-1. In addition, comparing Comparative Example A2-1 with Comparative Examples A2-3 to 8, 11, 13 and 14, it is seen that, in those cases where a non-aqueous electrolyte solution containing only a compound represented by Formula (α) without containing an Si—O structure-containing compound represented by Formula (A) or (B) was used, the ΔOCV was substantially the same as in Comparative Example A2-1, and the initial gas amount tended to be larger than that in Comparative Example A2-1. From these results, when a non-aqueous electrolyte solution containing both an Si—O structure-containing compound represented by Formula (A) or (B) and a compound represented by Formula (α) is used, the initial gas amount of a non-aqueous electrolyte battery is expected to be increased as compared to a case where the non-aqueous electrolyte solution contains neither or one of these compounds. However, as apparent from Table 2, the non-aqueous electrolyte batteries produced in Examples A2-1 to A2-20 had a larger ΔOCV and consequently had a smaller initial gas amount than the batteries produced in Comparative Examples A2-1 to A2-10, and it is thus seen that the gas generation during initial conditioning was reduced in the non-aqueous electrolyte batteries by using a non-aqueous electrolyte solution containing both an Si—O structure-containing compound represented by Formula (A) or (B) and a compound represented by Formula (α).

Particularly, from the results of Comparative Examples A2-1, A2-3 and A2-16, the initial gas amount is expected to be increased when the non-aqueous electrolyte solution of Example A2-17 is used. On the contrary, according to the results of Example A2-17, the ΔOCV was large, and the initial gas amount was markedly reduced to 59% relative to Comparative Example A2-1.

Further, comparing Examples A2-3 and A2-4 with Comparative Example A2-10, it is seen that, even if a non-aqueous electrolyte solution containing an Si—O structure-containing compound represented by Formula (A) or (B) and an amide compound having a structure similar to that of a compound represented by Formula (α) was used, the ΔOCV was not increased and the initial gas amount was large when the amide compound did not have an Si—N—H structure.

In addition, in Comparative Example A2-9 where a non-aqueous electrolyte solution containing only an N—H structure-containing compound represented by Formula (α2) without containing an Si—O structure-containing compound represented by Formula (A) or (B) was used, the ΔOCV was the same as in Comparative Example A2-1, and the initial gas amount was markedly increased.

Moreover, in Comparative Example A2-12 where a non-aqueous electrolyte solution containing only an Si—O structure-containing compound represented by Formula (A) or (B) without containing a compound represented by Formula (α) was used, the ΔOCV was substantially the same as in Comparative Example A2-1, and the initial gas amount was markedly increased.

Example A3

Compounds used in the following Examples and Comparative Examples are shown below.

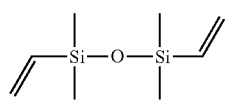

Compound A31

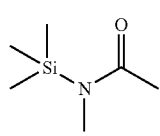

Compound A32

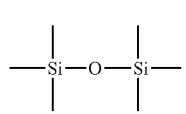

Compound A33

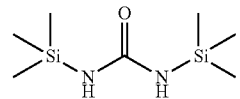

Compound A34

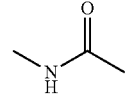

Compound A35

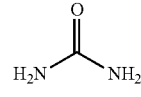

Compound A36

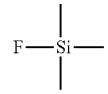

Compound A37

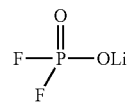

Compound A38

Compound A39

Compound A310

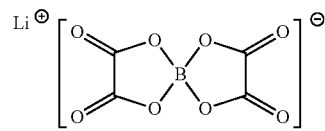

Compound A311

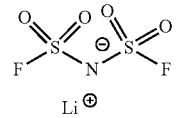

Examples A3-1 to A3-12 and Comparative Examples A3-1 to A3-5

[Production of Positive Electrode]

A slurry was prepared by mixing 90 parts by mass of lithium-nickel-cobalt-manganese composite oxide ($Li_{1.0}Ni_{0.5}Co_{0.2}Mn_{0.3}O_2$) as a positive electrode active material, 7 parts by mass of acetylene black as a conductive material, and 3 parts by mass of polyvinylidene fluoride (PVdF) as a binder in an N-methylpyrrolidone solvent using a disperser. This slurry was uniformly coated and dried onto both sides of a 15 μm-thick aluminum foil, which was subsequently pressed to produce a positive electrode.

[Production of Negative Electrode]

To 98 parts by mass of natural graphite, 1 part by mass of an aqueous dispersion of sodium carboxymethyl cellulose (concentration of sodium carboxymethyl cellulose=1% by mass) and 1 part by mass of an aqueous dispersion of styrene-butadiene rubber (concentration of styrene-butadiene rubber=50% by mass) were added as a thickening agent and a binder, respectively, and these materials were mixed using a disperser to prepare a slurry. The thus obtained slurry was coated and dried onto one side of a 10 μm-thick copper foil, which was subsequently pressed to produce a negative electrode.

[Preparation of Non-Aqueous Electrolyte Solutions]

Under a dry argon atmosphere, thoroughly dried $LiPF_6$ was dissolved as an electrolyte in an amount of 1.2 mol/L (14.8% by mass in terms of the concentration in the resulting non-aqueous electrolyte solution) in a mixture of ethylene carbonate (EC), diethyl carbonate (DEC) and ethyl methyl carbonate (EMC) (volume ratio EC:DEC:EMC=3:3:4), and vinylene carbonate (VC) and fluoroethylene carbonate (FEC) were further added thereto each in an amount of 2.0% by mass (in terms of the concentration in the resulting non-aqueous electrolyte solution) (the resultant is hereinafter referred to as "reference electrolyte solution A3-1"). To the thus obtained reference electrolyte solution A3-1, the compounds A31 to A311 were each added in accordance with the respective amounts shown in Table 3 below to prepare non-aqueous electrolyte solutions of Examples A3-1 to A3-12 and Comparative Examples A3-1 to A3-5. It is noted here that, in Table 3, "Content (% by mass)" indicates an amount contained in a total of 100% by mass of each non-aqueous electrolyte solution. Further, in Comparative Example A3-1, the reference electrolyte solution A3-1 was used.

[Production of Non-Aqueous Electrolyte Batteries]

A battery element was prepared by laminating the above-obtained positive electrode and negative electrode along with a polyethylene separator in the order of the negative electrode, the separator, and the positive electrode. This battery element was inserted into a pouch made of a laminated film obtained by coating both sides of an aluminum sheet (thickness: 40 μm) with a resin layer, such that the terminals of the positive and negative electrodes protruded out of the pouch. Thereafter, each of the above-prepared non-aqueous electrolyte solutions was injected into the pouch, and the pouch was subsequently vacuum-sealed, whereby a laminate-type non-aqueous electrolyte battery was produced.

<Evaluation of Non-Aqueous Electrolyte Batteries>
[Measurement of OCV after Injection]

In a 25° C. thermostat chamber, the OCV of each non-aqueous electrolyte battery produced by the above-described method was measured.

[Initial Conditioning]

In a 25° C. thermostat chamber, each non-aqueous electrolyte battery was charged for 6 hours with a constant current equivalent to 0.05 C and subsequently discharged to 3.0 V at 0.2 C. The battery was then subjected to CC-CV charging up to 4.1 V at 0.2 C, followed by aging at 45° C. for 72 hours. Thereafter, this laminate-type battery was discharged to 3.0 V at 0.2 C and stabilized. The battery was further subjected to CC-CV charging up to 4.4 V at 0.2 C and then discharged to 3.0 V at 0.2 C, whereby initial conditioning was completed.

[Measurement of Amount of Gas Generated During Initial Conditioning]

After the initial conditioning, each battery was immersed in an ethanol bath to measure the volume, and the amount of generated gas was determined from the volume change before and after the initial conditioning and defined as "initial gas amount".

[Measurement of Initial Resistance]

After the initial conditioning, each battery was CC-CV charged at 0.2 C such that the battery had a half of the initial discharge capacity. This battery was discharged at each current value of 1.0 C, 2.0 C and 3.0 C at 25° C., and the voltage was measured at a point of 5 seconds into each discharging process. An average value of the slopes of the thus obtained current-voltage straight lines at 1.0 C, 2.0 C and 3.0 C was defined as "initial resistance".

Table 3 below shows ΔOCV, which is a difference from the OCV of Comparative Example A3-1, the initial gas amount taking that of Comparative Example A3-1 as 100, and the initial resistance value taking that of Comparative Example A3-1 as 100. In Table 3, the initial gas amount is indicated as "Initial Gas".

TABLE 3

| | | | Compound (α) | | | | Other | | | | |
|---|---|---|---|---|---|---|---|---|---|---|---|
| | Compound (A) or (B) | Content (% by mass) | Compound (α1) | Content (% by mass) | Compound (α2) | Content (% by mass) | Compound (Auxiliary Agent) | Content (% by mass) | Δ OCV [V] | Initial Gas | Initial Resistance |
| Example A3-1 | Compound A31 | 1 | Compound A32 | 0.05 | — | — | — | — | 0.23 | 62 | 99 |
| Example A3-2 | Compound A31 | 1 | Compound A34 | 0.1 | — | — | — | — | 0.09 | 42 | 98 |
| Example A3-3 | Compound A31 | 1 | Compound A32 | 0.05 | Compound A35 | 0.05 | — | — | 0.11 | 54 | 97 |
| Example A3-4 | Compound A31 | 1 | Compound A34 | 0.05 | Compound A36 | 0.05 | — | — | 0.13 | 79 | 96 |
| Example A3-5 | Compound A33 | 1 | Compound A32 | 0.05 | Compound A35 | 0.05 | — | — | 0.04 | 76 | 98 |
| Example A3-6 | Compound A31 | 1 | Compound A32 | 0.05 | Compound A35 | 0.05 | Compound A37 | 0.05 | 0.11 | 62 | 96 |
| Example A3-7 | Compound A31 | 1 | Compound A34 | 0.05 | Compound A36 | 0.05 | Compound A37 | 0.05 | 0.10 | 64 | 91 |
| Example A3-8 | Compound A31 | 1 | Compound A32 | 0.05 | Compound A35 | 0.05 | Compound A38 | 1 | 0.13 | 63 | 89 |
| Example A3-9 | Compound A31 | 1 | Compound A32 | 0.05 | Compound A35 | 0.05 | Compound A39 | 1 | 0.14 | 68 | 88 |
| Example A3-10 | Compound A31 | 1 | Compound A32 | 0.05 | Compound A35 | 0.05 | Compound A310 | 1 | 0.14 | 53 | 96 |
| Example A3-11 | Compound A31 | 1 | Compound A34 | 0.05 | Compound A36 | 0.05 | Compound A38 | 1 | 0.12 | 83 | 89 |
| Example A3-12 | Compound A31 | 1 | Compound A34 | 0.05 | Compound A36 | 0.05 | Compound A311 | 1 | 0.12 | 79 | 95 |
| Comparative Example A3-1 | — | — | — | — | — | — | — | — | 0.00 | 100 | 100 |

TABLE 3-continued

| | Compound (A) or (B) | Content (% by mass) | Compound (α1) | Content (% by mass) | Compound (α2) | Content (% by mass) | Compound (Auxiliary Agent) | Content (% by mass) | Δ OCV [V] | Initial Gas | Initial Resistance |
|---|---|---|---|---|---|---|---|---|---|---|---|
| | | | Compound (α) | | | | Other | | | | |
| Comparative Example A3-2 | Compound A31 | 1 | — | — | — | — | — | — | 0.03 | 103 | 100 |
| Comparative Example A3-3 | Compound A33 | 1 | — | — | — | — | — | — | 0.01 | 206 | 100 |
| Comparative Example A3-4 | — | — | Compound A34 | 0.1 | — | — | — | — | 0.01 | 206 | 101 |
| Comparative Example A3-5 | — | — | Compound A32 | 0.05 | — | — | — | — | 0.01 | 125 | 104 |

As apparent from Table 3, it is seen that the batteries produced in Examples A3-1 to A3-12 had a reduced initial gas amount and a lower initial resistance than the batteries produced in Comparative Examples A3-1 to A3-5.

It is also seen that the initial resistance is reduced by using a compound represented by Formula (α1) and a compound represented by Formula (α2) in combination as compounds represented by Formula (α). Particularly, it is seen that not only the initial resistance but also the initial gas was reduced in Example A3-3 as compared to Example A3-1.

Further, it is seen that the use of any of the compounds A37 to A312 that are auxiliary agents results in a further reduction in the initial resistance.

Example B

Compounds used in the following Examples and Comparative Examples are shown below.

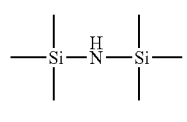

Compound B1

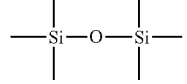

Compound B2

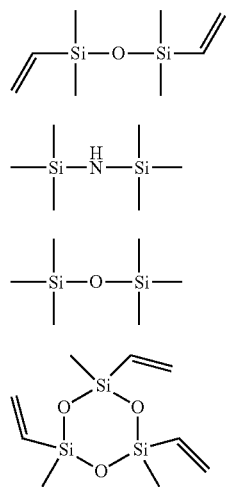

Compound B3

Compound B4

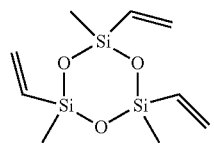

Compound B5

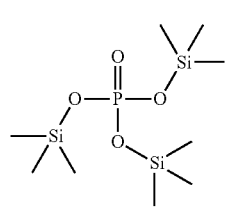

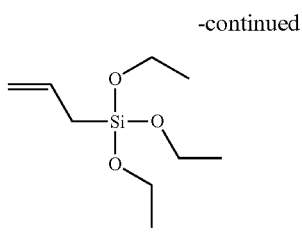

Compound B6

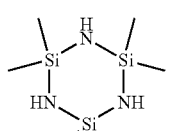

Compound B7

Compound B8

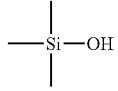

Compound B9

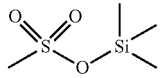

Compound B10

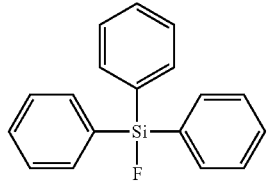

Compound B11

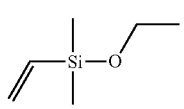

Examples B1 to B6 and Comparative Examples B1 to B11

[Production of Positive Electrode]

A slurry was prepared by mixing 90 parts by mass of lithium-nickel-cobalt-manganese composite oxide ($Li_{1.0}Ni_{0.5}Co_{0.2}Mn_{0.3}O_2$) as a positive electrode active material, 7 parts by mass of acetylene black as a conductive material, and 3 parts by mass of polyvinylidene fluoride (PVdF) as a binder in an N-methylpyrrolidone solvent using a disperser. This slurry was uniformly coated and dried onto both sides of a 15 μm-thick aluminum foil, which was subsequently pressed to produce a positive electrode.
[Production of Negative Electrode]

To 98 parts by mass of natural graphite, 1 part by mass of an aqueous dispersion of sodium carboxymethyl cellulose (concentration of sodium carboxymethyl cellulose=1% by mass) and 1 part by mass of an aqueous dispersion of styrene-butadiene rubber (concentration of styrene-butadiene rubber=50% by mass) were added as a thickening agent and a binder, respectively, and these materials were mixed using a disperser to prepare a slurry. The thus obtained slurry was coated and dried onto one side of a 10 μm-thick copper foil, which was subsequently pressed to produce a negative electrode.
[Preparation of Non-aqueous Electrolyte Solutions]

Under a dry argon atmosphere, thoroughly dried $LiPF_6$ was dissolved as an electrolyte in an amount of 1.2 mol/L (14.8% by mass in terms of the concentration in the resulting non-aqueous electrolyte solution) in a mixture of ethylene carbonate (EC), diethyl carbonate (DEC) and ethyl methyl carbonate (EMC) (volume ratio EC:DEC:EMC=3:3:4), and vinylene carbonate (VC) and fluoroethylene carbonate (FEC) were further added thereto each in an amount of 2.0% by mass (in terms of the concentration in the resulting non-aqueous electrolyte solution) (the resultant is hereinafter referred to as "reference electrolyte solution B1"). To the thus obtained reference electrolyte solution B1, the compounds B1 to B11 were each added in accordance with the respective amounts shown in Table 4 below to prepare non-aqueous electrolyte solutions. It is noted here that, in Table 4, "Content (% by mass)" indicates an amount contained in a total of 100% by mass of each non-aqueous electrolyte solution.

[Production of Non-aqueous Electrolyte Batteries]

A battery element was prepared by laminating the above-obtained positive electrode and negative electrode along with a polyethylene separator in the order of the negative electrode, the separator, and the positive electrode. This battery element was inserted into a pouch made of a laminated film obtained by coating both sides of an aluminum sheet (thickness: 40 μm) with a resin layer, with the terminals of the positive and negative electrodes protruding out of the pouch. Thereafter, each of the above-prepared non-aqueous electrolyte solutions was injected into the pouch, and the pouch was subsequently vacuum-sealed, whereby a laminate-type non-aqueous electrolyte battery was produced.

<Evaluation of Non-Aqueous Electrolyte Batteries>
[Measurement of OCV after Injection]

In a 25° C. thermostat chamber, the OCV of each non-aqueous electrolyte battery produced by the above-described method was measured. [Initial Conditioning]

In a 25° C. thermostat chamber, each non-aqueous electrolyte battery was charged for 6 hours with a constant current equivalent to 0.05 C and subsequently discharged to 3.0 V at 0.2 C. The battery was then subjected to CC-CV charging up to 4.1 V at 0.2 C, followed by aging at 45° C. for 72 hours. Thereafter, this laminate-type battery was discharged to 3.0 V at 0.2 C and stabilized. The battery was further subjected to CC-CV charging up to 4.4 V at 0.2 C and then discharged to 3.0 V at 0.2 C, whereby initial conditioning was completed.
[Measurement of Amount of Gas Generated During Initial Conditioning]

After the initial conditioning, each battery was immersed in an ethanol bath to measure the volume, and the amount of generated gas was determined from the volume change before and after the initial conditioning and defined as "initial gas amount".

Table 4 below shows ΔOCV, which is a difference from the OCV of Comparative Example B1, and the value of initial gas amount taking that of Comparative Example B1 as 100. In Table 4, the initial gas amount is indicated as "Initial Gas".

TABLE 4

| | Compound (A2) or (B2) | Content (% by mass) | Compound (Y) or (Z) | Content (% by mass) | Other Compound | Content (% by mass) | ∠ OCV [V] | Initial Gas |
|---|---|---|---|---|---|---|---|---|
| Example B1 | Compound B1 | 1 | Compound B2 | 0.05 | — | — | 0.29 | 47 |
| Example B2 | Compound B1 | 1 | Compound B2 | 0.1 | — | — | 0.24 | 75 |
| Example B3 | Compound B4 | 1 | Compound B2 | 0.1 | — | — | 0.14 | 48 |
| Example B4 | Compound B6 | 1 | Compound B2 | 0.1 | — | — | 0.14 | 89 |
| Example B5 | Compound B11 | 1 | Compound B2 | 0.1 | — | — | 0.08 | 74 |
| Example B6 | Compound B1 | 1 | Compound B7 | 0.1 | — | — | 0.08 | 89 |
| Comparative Example B1 | — | — | — | — | — | — | 0 | 100 |
| Comparative Example B2 | Compound B1 | 1 | — | — | — | — | 0.03 | 103 |
| Comparative Example B3 | — | — | — | — | Compound B3 | 1 | 0.01 | 206 |
| Comparative Example B4 | — | — | Compound B2 | 0.05 | — | — | 0.01 | 136 |
| Comparative Example B5 | — | — | Compound B2 | 0.1 | — | — | 0.01 | 115 |
| Comparative Example B6 | — | — | Compound B2 | 0.5 | — | — | 0 | 282 |
| Comparative Example B7 | — | — | Compound B2 | 0.1 | Compound B3 | 1 | 0.01 | 169 |
| Comparative Example B8 | — | — | Compound B2 | 0.1 | Compound B5 | 1 | 0.01 | 146 |
| Comparative Example B9 | — | — | Compound B2 | 0.1 | Compound B8 | 1 | 0.01 | 146 |
| Comparative Example B10 | — | — | Compound B2 | 0.1 | Compound B9 | 1 | 0 | 107 |
| Comparative Example B11 | — | — | Compound B2 | 0.1 | Compound B10 | 1 | 0.01 | 131 |

As apparent from Table 4, it is seen that the batteries produced in Examples B1 to B6 had a larger ΔOCV and consequently had a smaller initial gas amount than the batteries produced in Comparative Examples B1 to B11.

Comparing Comparative Example B1 with Comparative Example B2, when a non-aqueous electrolyte solution containing only an Si—O structure-containing compound represented by Formula (A2) or (B2) without containing an Si—N structure-containing compound represented by Formula (Y) or (Z) was used, the ΔOCV was slightly higher than that in Comparative Example B1 but the initial gas amount was increased by 3% from Comparative Example B1. Further, comparing Comparative Example B1 with Comparative Examples B4, B5 and B6, in those cases where a non-aqueous electrolyte solution containing only an Si—N structure-containing compound represented by Formula (Y) or (Z) without containing an Si—O structure-containing compound represented by Formula (A2) or (B2) was used, the ΔOCV was substantially the same as in Comparative Example B1, and the initial gas amount tended to be larger than that in Comparative Example B1.

From the results of Comparative Examples B1, B2 and B4, the initial gas amount is expected to be increased when the non-aqueous electrolyte solution of Example B1 is used. On the contrary, according to the results of Example B1, the ΔOCV was large, and the initial gas amount was markedly reduced to 47% relative to Comparative Example B1.

Further, from the results of Comparative Examples B1, B2 and B5, the initial gas amount is expected to be increased when the non-aqueous electrolyte solution of Example B2 is used. On the contrary, according to the results of Example B2, the ΔOCV was large, and the initial gas amount was markedly reduced to 75% relative to Comparative Example B1.

Moreover, in those cases where an Si—N structure-containing compound represented by Formula (Y) or (Z) and a compound having an Si—O structure but not corresponding to an Si—O structure-containing compound represented by Formula (A2) or (B2) were used in combination, the ΔOCV was substantially the same as in Comparative Example B1, and the initial gas amount was increased to 146% in Comparative Examples B8 and B9 relative to Comparative Example B1, and 169% in Comparative Example B7 relative to Comparative Example B1.

In the batteries of these Examples, an Si—N structure-containing compound represented by Formula (Y) or (Z) and an Si—O structure-containing compound represented by Formula (A2) or (B2) adsorb to the positive electrode active material and/or the negative electrode active material in large amounts after the injection; therefore, it is presumed that the compounds localized on the electrode(s) are electrochemically degraded during initial charging to form a composite insulating coating film on the surface of the positive electrode active material and/or the surface of the negative electrode active material. Further, according to Comparative Examples B4 to B6, the ΔOCV after the injection was small when the content of an Si—N structure-containing was high, and it is thus believed that the amount of such a compound adsorbing to electrodes was small. Therefore, it is presumed that an effect of reducing the initial gas amount was not obtained since an insulating coating film was not formed in a preferred manner during the charging. From these, it was demonstrated that, by using a combination of an Si—N structure-containing compound represented by Formula (Y) or (Z) and an Si—O structure-containing compound represented by Formula (A2) or (B2), adsorption of these compounds to electrodes can be controlled and the initial gas can be reduced in a preferred manner.

This application is based on Japanese patent applications filed on Aug. 8, 2019 (Japanese Patent Application Nos. 2019-146414 and 2019-146415) and a Japanese patent application filed on Nov. 28, 2019 (Japanese Patent Application No. 2019-215635), the entirety of which is hereby incorporated by reference.

While the invention has been described in detail and with reference to specific embodiments thereof, it will be apparent to one skilled in the art that various changes and modifications can be made therein without departing from the spirit and scope thereof.

What is claimed is:
1. A non-aqueous electrolyte solution comprising:
an alkali metal salt; a non-aqueous solvent; at least one Si—O structure-containing compound represented by Formula (A) or (B); and a compound represented by Formula (α):

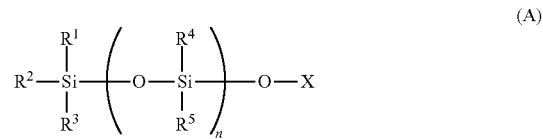

wherein, in Formula (A),
$R^1$ to $R^5$ each independently represents a hydrogen atom, a halogen atom, an optionally substituted hydrocarbon group having 1 to 12 carbon atoms, or an optionally substituted alkoxy group having 1 to 12 carbon atoms;
X represents an optionally substituted hydrocarbon group having 1 to 12 carbon atoms, or a silyl group represented by —$SiR^oR^pR^q$, wherein $R^o$ to $R^q$ each independently represents a hydrogen atom, a halogen atom, an optionally substituted hydrocarbon group having 1 to 12 carbon atoms, or an optionally substituted alkoxy group having 1 to 12 carbon atoms;
n represents an integer of 0 to 5; and
when n is 2 or larger, plural $R^4$s in Formula (A) are the same or different from each other, and plural $R^5$s in Formula (A) are the same or different from each other

wherein, in Formula (B),
$R^6$ and $R^7$ each independently represents a hydrogen atom, a halogen atom, an optionally substituted hydrocarbon group having 1 to 12 carbon atoms, or an optionally substituted alkoxy group having 1 to 12 carbon atoms;
k represents an integer of 3 to 6;
plural $R^6$s in Formula (B) are the same or different from each other; and
plural $R^7$s in Formula (B) are the same or different from each other,

wherein, in Formula (α),
$R^{89}$ represents a hydrogen atom or a silyl group represented by —$SiR^8R^9R^{10}$, wherein $R^8$ to $R^{10}$ each independently represents a hydrogen atom, a halogen atom, an optionally substituted hydrocarbon group having 1 to 12 carbon atoms, or an optionally substituted alkoxy group having 1 to 12 carbon atoms;

$R^{11}$ represents a hydrogen atom, an optionally substituted hydrocarbon group having 1 to 12 carbon atoms, or a silyl group represented by —SiR$^d$R$^e$R$^f$, wherein R$^d$ to R$^f$ each independently represents a hydrogen atom, a halogen atom, an optionally substituted hydrocarbon group having 1 to 12 carbon atoms, or an optionally substituted alkoxy group having 1 to 12 carbon atoms;

Y represents a hydrogen atom, a halogen atom, an optionally substituted hydrocarbon group having 1 to 12 carbon atoms, an optionally substituted alkoxy group having 1 to 12 carbon atoms, a group represented by —NR$^g$—SiR$^h$R$^i$R$^j$, or a group represented by —NR$^g$—H, wherein R$^g$ represents a hydrogen atom or an optionally substituted hydrocarbon group having 1 to 12 carbon atoms, and R$^h$ to R$^j$ each independently represents a hydrogen atom, a halogen atom, an optionally substituted hydrocarbon group having 1 to 12 carbon atoms, or an optionally substituted alkoxy group having 1 to 12 carbon atoms; and $R^{11}$ and R$^g$ are optionally bound with each other to form a ring.

2. The non-aqueous electrolyte solution according to claim 1, wherein a content of the Si—O structure-containing compound represented by Formula (A) or (B) is 0.001% by mass to 10% by mass with respect to a total amount of the non-aqueous electrolyte solution.

3. The non-aqueous electrolyte solution according to claim 1, wherein a content of the compound represented by Formula (α), which has an Si—N structure, is 0.01 ppm by mass to 0.5% by mass with respect to the total amount of the non-aqueous electrolyte solution.

4. The non-aqueous electrolyte solution according to claim 1, wherein a mass ratio of a content of the Si—O structure-containing compound represented by Formula (A) or (B) with respect to a content of the compound represented by Formula (α) is 1.0 to 10,000.

5. The non-aqueous electrolyte solution according to claim 1, wherein at least one of $R^1$ to $R^3$ is a hydrocarbon group having 2 to 12 carbon atoms and an unsaturated carbon-carbon bond.

6. The non-aqueous electrolyte solution according to claim 1, further comprising at least one selected from a fluorinated salt, a fluorosilane compound, an unsaturated cyclic carbonate, a fluorine atom-containing cyclic carbonate, and an oxalate salt.

7. A non-aqueous electrolyte battery, comprising:
a positive electrode and a negative electrode which are capable of occluding and releasing metal ions; and
the non-aqueous electrolyte solution according to claim 1.

8. The non-aqueous electrolyte solution according to claim 1, wherein a content of the Si—O structure-containing compound represented by Formula (A) or (B) is 0.01% by mass to 8% by mass with respect to a total amount of the non-aqueous electrolyte solution.

9. The non-aqueous electrolyte solution according to claim 1, wherein a content of the Si—O structure-containing compound represented by Formula (A) or (B) is 0.1% by mass to 6% by mass with respect to a total amount of the non-aqueous electrolyte solution.

10. The non-aqueous electrolyte solution according to claim 1, wherein the compound represented by Formula (α) is a compound represented by Formula (α1):

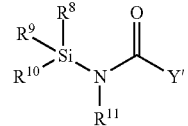

(α1)

wherein, in Formula (α1),
R8 to R10 each independently represents a hydrogen atom, a halogen atom, an optionally substituted hydrocarbon group having 1 to 12 carbon atoms, or an optionally substituted alkoxy group having 1 to 12 carbon atoms.

11. The non-aqueous electrolyte solution according to claim 1, wherein the compound represented by Formula (α) is a compound represented by Formula (α2):

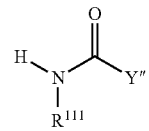

(α2)

wherein, in Formula (α2),
$R^{111}$ represents a hydrogen atom, an optionally substituted hydrocarbon group having 1 to 12 carbon atoms; and
Y″ represents a hydrogen atom, a halogen atom, an optionally substituted hydrocarbon group having 1 to 12 carbon atoms, an optionally substituted alkoxy group having 1 to 12 carbon atoms, or a group represented by —NRg—H, wherein Rg represents a hydrogen atom, an optionally substituted hydrocarbon group having 1 to 12 carbon atoms.

12. The non-aqueous electrolyte solution according to claim 1, wherein a content of the Si—O structure-containing compound represented by Formula (A) or (B) is 0.01% by mass to 8% by mass with respect to a total amount of the non-aqueous electrolyte solution.

13. The non-aqueous electrolyte solution according to claim 1, wherein a content of the Si—O structure-containing compound represented by Formula (A) or (B) is 0.1% by mass to 6.0% by mass with respect to a total amount of the non-aqueous electrolyte solution.

14. The non-aqueous electrolyte solution according to claim 1, wherein a content of the Si—O structure-containing compound represented by Formula (A) or (B) is 0.2% by mass to 4.0% by mass with respect to a total amount of the non-aqueous electrolyte solution.

15. The non-aqueous electrolyte solution according to claim 1, wherein a content of the Si—O structure-containing compound represented by Formula (A) or (B) is 0.01% by mass to 8% by mass with respect to a total amount of the non-aqueous electrolyte solution.

16. The non-aqueous electrolyte solution according to claim 1, wherein a content of the Si—O structure-containing compound represented by Formula (A) or (B) is 0.1% by mass to 6.0% by mass with respect to a total amount of the non-aqueous electrolyte solution.

17. The non-aqueous electrolyte solution according to claim 1, wherein a content of the Si—O structure-containing compound represented by Formula (A) or (B) is 0.2% by mass to 4.0% by mass with respect to a total amount of the non-aqueous electrolyte solution.

18. The non-aqueous electrolyte solution according to claim 1, wherein a mass ratio of a content of the Si—O structure-containing compound represented by Formula (A) or (B) with respect to a content of the compound represented by Formula ($\alpha$) is 2.0 to 7,000.

19. The non-aqueous electrolyte solution according to claim 1, wherein a mass ratio of a content of the Si—O structure-containing compound represented by Formula (A) or (B) with respect to a content of the compound represented by Formula ($\alpha$) is 3.0 to 4,000.

\* \* \* \* \*